(12) United States Patent
Suzuki et al.

(10) Patent No.: US 6,331,851 B1
(45) Date of Patent: Dec. 18, 2001

(54) GRAPHIC DISPLAY APPARATUS, SYNCHRONOUS REPRODUCTION METHOD, AND AV SYNCHRONOUS REPRODUCTION APPARATUS

(75) Inventors: Seiichi Suzuki, Katano; Yutaka Shirai, Izumiotsu; Masashi Tokunaga, Higashiosaka; Haruyo Ohkubo, Moriguchi; Kenjirou Tsuda, Hirakata; Tetsuya Imamura, Osaka, all of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/142,813
(22) PCT Filed: May 15, 1998
(86) PCT No.: PCT/JP09/02175
   § 371 Date: Oct. 8, 1998
   § 102(e) Date: Oct. 8, 1998
(87) PCT Pub. No.: WO98/53443
   PCT Pub. Date: Nov. 26, 1998

(51) Int. Cl.$^7$ .................................. G06F 15/00
(52) U.S. Cl. ............................. 345/419
(58) Field of Search .................. 345/419, 473, 345/474, 418, 420, 427, 428

(56) References Cited

U.S. PATENT DOCUMENTS

| | | | |
|---|---|---|---|
| 5,933,150 | * 8/1999 | Ngo et al. | 345/473 |
| 5,982,390 | * 5/2000 | Stoneking et al. | 345/474 |
| 6,040,842 | * 3/2000 | Wavish et al. | 345/473 |
| 6,058,397 | * 5/2000 | Barrus et al. | 345/473 |

FOREIGN PATENT DOCUMENTS

| | | |
|---|---|---|
| 8-30807 | 2/1996 | (JP) . |
| 8-212388 | 8/1996 | (JP) . |

* cited by examiner

*Primary Examiner*—Phu K. Nguyen
(74) *Attorney, Agent, or Firm*—Parkhurst & Wendel, L.L.P.

(57) ABSTRACT

It is an object of this invention to provide a graphic display apparatus that reduces the amount of CG data transferred from a server through a network and that allows three-dimensional characters displayed at a terminal to move smoothly. It is another object of this invention to provide an AV synchronous reproduction apparatus that can synchronize an image with a score the tempo of which is changed during reproduction. According to this invention, when a server instructs a terminal to graphically display three-dimensional characters, the terminal provides a plurality of motion patterns. The server then transmits scenario data to the terminal, and the terminal operates based on the scenario data to switch scenes for graphical displays. The terminal switches the scenes for graphical displays with a timing for a home position which is common or substantially common to a motion pattern being executed and a motion pattern to be executed next.

18 Claims, 40 Drawing Sheets

FIG 3

| TIME | X-AXIS ROTATING ANGLE | Y-AXIS ROTATING ANGLE |
|---|---|---|
| 0 | 0 | 0 |
| 10 | 5 | 90 |
| 20 | 20 | 180 |
| 30 | 45 | 180 |
| 40 | 80 | 255 |
| 50 | 125 | 345 |
| 60 | 180 | 360 |

FIG 9

| CURRENT MOTION | |
|---|---|
| ID | FRAME TIME |
| Ma | 60 |

| SUBSEQUENT MOTION | |
|---|---|
| ID | FRAME TIME |
| Mb | 0 |

| KEY FRAME | |
|---|---|
| X-AXIS ROTATING ANGLE | Y-AXIS ROTATING ANGLE |
| 160 | 340 |

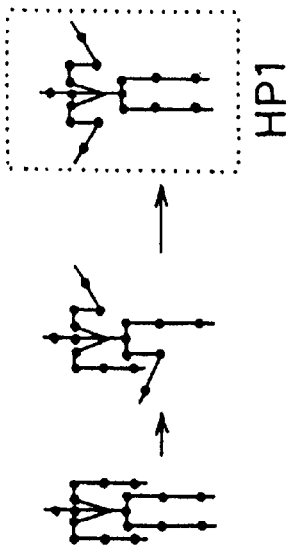
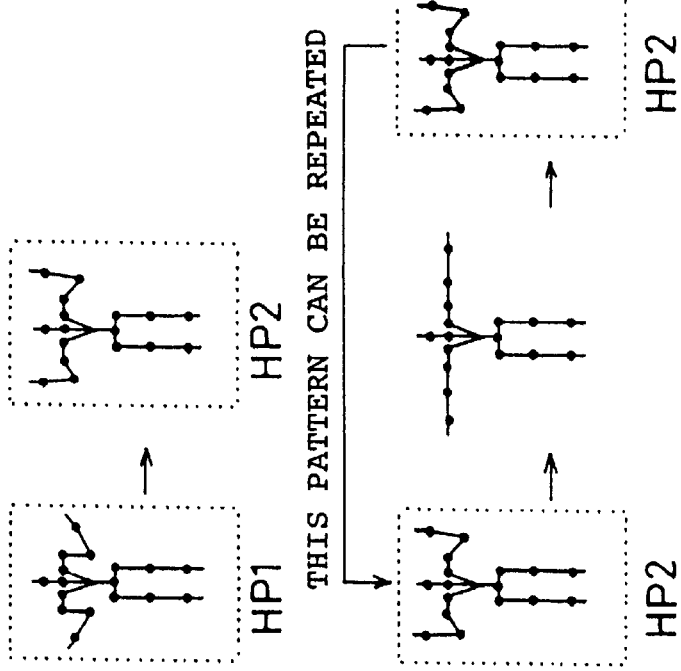
FIG. 12(a) MOTION M 1
FIG. 12(b) MOTION M 2
FIG. 12(c) MOTION M 3

FIG 13

STRUCTURE OF SCENARIO DATA

| SHAPE DATA IDENTIFICATION INFORMATION | | MOTION SPECIFICATION INFORMATION | | | | |
|---|---|---|---|---|---|---|
| SKELETON MODEL IDENTIFICATION INFORMATION | THREE-DIMENSIONAL-CHARACTER POLYGON IDENTIFICATION INFORMATION | THREE-DIMENSIONAL-CHARACTER TEXTURE IDENTIFICATION INFORMATION | SCENE NUMBER | S1 | S2 | S3 | ......... | Si |
| | | | TIME INTERVAL | T1 | T2 | T3 | ......... | Ti |
| | | | MOTION | M1 | M2 | M3 | ......... | Mi |

GRAPHIC DISPLAY APPARATUS, SYNCHRONOUS REPRODUCTION METHOD, AND AV SYNCHRONOUS REPRODUCTION APPARATUS

TECHNICAL FIELD

The present invention relates to an apparatus displaying computer graphics (hereafter referred to as "CG"). Specifically, this invention relates to a graphic display apparatus that is used during communication between a server and a terminal to synchronously reproduce audio and video data at the terminal, and to an AV synchronous reproduction apparatus in an independent apparatus.

BACKGROUND ART

CG is commonly used in fields such as movies and television games.

For example, in three-dimensional CG, three-dimensional characters often have a skeleton model consisting of bones and joints. FIG. 40 shows an example of a skeleton model of a human body.

As is well known, a three-dimensional character is displayed by adding to the periphery of the skeleton model, sites of the character such as arms and legs which are composed of polygons and sticking texture to the surface of the polygons. Each site composed of a polygon and the texture are collectively referred to as shape data herein.

The three-dimensional character is moved by providing to a microcomputer an instruction (that is, motion data) to move any joint of the skeleton model.

Due to the recent spread of Internet, CG animations are commonly distributed via the network. "Virtual Reality Modeling Language" (hereafter referred to as "VRML") is popular as a language representing CG animations using Internet.

Displaying CG animations requires shape data required to display three-dimensional three-dimensional characters and motion data required to display them as animations. In VRML, shape and motion data is transferred from a server to a terminal using Internet.

The terminal displays the received data using a VRML browser. Since, however, shape and motion data is transferred from the server to the terminal, this method increases the amount of data transferred and thus the time required to transfer the data.

CG is commonly used in fields such as movies and television games. Many CG works now reproduce not only images but also matching music. A technique for associating CG with sounds is shown in Japanese Patent Application Laid Open No. 8-212388 as a three-dimensional image processing apparatus.

This image processing apparatus reproduces CG and audio data for which starting and ending times are defined, after associating the data with each other. The starting and end times of the CG data are designated as Cs and Ce, respectively. The starting and end times of the audio data are denoted as As and Ae, respectively. The reproduction time (Ae−As) for the sound is compared with the reproduction time (Ce−Cs) for the CG. If they are not equal, a tempo used to reproduce the sound is calculated as follows and the sound is reproduced based on the result of the calculation.

Tempo=Original tempo×(Ae−As)/(Ce−Cs)

In this manner, the tempo of sound is adjusted by relative comparison with the reproduction time of CG so as to reproduce CG and sound having different reproduction times while mutually synchronizing them.

This conventional technique, however, can reproduce audio data having a constant tempo but cannot synchronize CG with music data having a tempo changed in the middle of the music. Furthermore, if the tempo of Karaoke music is suddenly changed using a pitch control operation before that music ends, the synchronization may fail. Furthermore, the synchronization may also fail when special reproduction such as fast forwarding or rewinding is executed.

DISCLOSURE OF THE INVENTION

In view of these problems, it is an object of this invention to provide a graphic display apparatus that reduces the amount of data transferred when CG data is transferred from a server through a network and that allows three-dimensional characters displayed on a terminal to move smoothly.

It is another object of this invention to provide an AV synchronous reproduction apparatus that can synchronize, prior to reproduction, an image with music having its tempo changed in its middle and that can synchronize, prior to reproduction, music with an image even if the tempo of the music is suddenly changed or during special reproduction.

A graphic display apparatus of this invention is characterized in that a server comprises a data transmission means for transmitting scenario data describing a combination order of motions, to a terminal through a network, and in that a terminal comprises a data reception means for receiving scenario data transmitted by said data transmission means, a shape database required to display a three-dimensional character or characters, a motion database required to move the three-dimensional character or characters, a motion switching and drawing means for switching the motions of the three-dimensional character or characters in the order described in the scenario data received from said data reception means, and an automatic motion correcting means operative, when the switching and drawing means switches motions, to correct the current and subsequent motions in order to smoothly display the motions. Therefore, even if each motion does not have a home position, the motions can be connected naturally to display CG animations.

A graphic display apparatus of this invention is characterized in that, the server includes a correction data transmission means for transmitting through a network, motion correction data that corrects the connections between the motions described in the scenario data transmitted by the data transmission means, and in that the terminal includes, instead of the automatic motion correcting means, a correction data reception means for receiving the correction data transmitted by the correction data transmission means, and a motion correcting means for correcting the current and subsequent motions based on the motion correction data received from the correction data reception means in order to smoothly display the motions while the switching and drawing means switches the motions, so that calculated correction data can be transmitted by the server to save the computer resources of the terminal.

A graphic display apparatus of this invention is characterized in that, the server includes a motion database and a correction scenario calculating means for calculating motion correction data used to correct the connections between the motions described in the scenario data transmitted by the data transmission means from the motion database and transmitting the calculated data through the network using the correction data transmission means, so that the correction data can be calculated in real time to save the memory resources of the server.

A graphic display method set forth in claim 4 of this invention is characterized in that when a server instructs a terminal to graphically display three-dimensional characters, the terminal provides a plurality of motion patterns describing the patterns of the three-dimensional characters' motions, in that the server then transmits to the terminal, scenario data describing the order of combining the motion patterns with a time series, and in that the terminal, which detects the scenario data from the server and executes graphical display based on the scenario data, switches the scene by combining the motion patterns with the time series with such a timing that a home position previously provided for a motion pattern being displayed and a home position previously provided for a motion pattern to be displayed next are common or substantially common to each other.

This configuration enables it to execute natural graphic display using a small amount of data transmitted from the server to the terminal while smoothly switching scenes.

A graphic display apparatus of this invention is characterized in that the apparatus has motion groups describing a plurality of patterns of motions, a scenario database describing which pattern of the motion group a three-dimensional character is based for motions, in such a way that the motions correspond to scenes, and a character pose control means for controlling the three-dimensional character's motion displayed based on the scenario database and motion groups, and in that the character pose control means is configured to switch the scene by combining said motion patterns with a time series with such a timing that a home position previously provided for a motion pattern being displayed and a home position previously provided for a motion pattern to be displayed next are common or substantially common to each other.

This configuration enables the graphic display method to be realized.

This invention provides a graphic display apparatus having a server and a terminal on a network to provide graphic display at the terminal, characterized in that the server comprises a character data database defining the shapes of three-dimensional characters, a motion database defining the characters' motions, and scenario data specifying said character data and a time series combination with one or more of said motions, and in that the terminal comprises a character database in which the character data is stored, a motion database in which the motions are stored, a data retrieving means for determining whether any character data specified by the scenario data is present in the character database, and a data request means for requesting the server for character data that is not present in the character database.

This configuration requests the server for only character data that is not present in the character database of the terminal in order to obtain required character data before generating character animations at the terminal. Thus, data is transferred through the network if character data required to draw any three-dimensional character is absent from the terminal, and only such character data that lacks at the terminal is transferred through the network. Consequently, all data required to display three-dimensional characters can be supplied to the terminal in a short communication time.

This invention provides a graphic display apparatus having a server and a terminal on a network to provide graphic display at the terminal, characterized in that the server comprises a character data database defining the shapes of three-dimensional characters, a motion database defining the characters' motions, and scenario data specifying the character data and a time-series combination of the character data and one or more of the motions, and in that the terminal comprises a character database in which the character data is stored, a motion database in which the motions are stored, a data retrieving means for determining whether any motion specified by the scenario data is present in the motion database, and a data request means for requesting the server for a motion that is not present in the character database.

This configuration requests the server for only motion data that is not present in the motion database of the terminal in order to obtain required motion data before generating character animations at the terminal. Thus, data is transferred through the network if motion data required to draw any three-dimensional character is absent from the terminal, and only motion data that lacks at the terminal is transferred through the network. Consequently, all data required to display three-dimensional characters can be supplied to the terminal in a short communication time.

An AV synchronous reproduction apparatus of this invention is characterized in that the apparatus comprises a score reproducing means for reproducing a score based on score data, a synchronizing-information table that temporarily stores a score position information that specifies a position on a score, tempo information on which the reproduction tempo is based, and a time at which the score position and tempo information are updated, after associating them together, a synchronizing-information update means for updating the synchronizing-information table based on the reproduction by the score reproducing means, a score position calculating means for calculating from the current time and the contents of the synchronizing-information table the score position being currently reproduced by the score reproducing means, a frame buffer that temporarily stores frame data, a frame output means for calculating frame data that synchronizes with the reproduction by the score reproducing means based on the score position calculated by the score position calculating means from the CG data associated with the score data and outputting the frame data to the frame buffer, and an image display means for displaying as animations the frame data stored in the frame buffer. Thereby, the image can be synchronized for reproduction even if score data in which the tempo is dynamically changes in the middle of the score or if the tempo information is suddenly changed, in contrast to the conventional technique that can only synchronize the image with score data at a constant tempo.

AV synchronous reproduction apparatus of this invention is characterized in that, the synchronous-information update means is configured so that the score reproduction means updates the synchronizing-information table each time the score position or tempo information changes, thereby enabling the same effect as in claim 8 to be obtained while minimizing the number of times to update synchronizing information.

An AV synchronous reproduction apparatus according to claim 10 of this invention is characterized in that, in claim 8, the synchronizing-information update means is configured to update the synchronizing-information table during a particular cycle, thereby enabling the same effect as in claim 8 to be obtained while reducing the number of times to update synchronizing information.

An AV synchronous reproduction apparatus of this invention is characterized in that, the apparatus further includes a calculation time predicting means for predicting from the amount of CG data the calculation time required by the frame data output means, and in that the frame output means is configured to output to the frame buffer, frame data that synchronizes with a score position determined by delaying the score position calculated by the score position calculating means by the time predicted by the calculation time predicting means. Thus, in addition to the effect of claim 8, this apparatus can provide the effect of synchronizing an image with score data for reproduction without delay caused by frame operations.

An AV synchronous reproduction apparatus of this invention is characterized in that, the apparatus further includes a reproduction delay predicting means for predicting from score data the time until the sound at the current score position is output as an actual sound, and in that the synchronizing-information update means is configured to output to the synchronizing-information table, the tempo information, the update time, and the score position delayed by the synchronizing-information update means by the time predicted by the reproduction delay predicting means. Thus, in addition to the effect of claim 8, this apparatus can provide the effect of synchronizing an image with score data for reproduction without delay.

An AV synchronous reproduction apparatus of this invention is characterized in that, the apparatus further includes an image display delay predicting means for predicting from the amount of CG data the display delay time required before the image display means can actually display data from the frame buffer, and in that the frame output means is configured to output to the frame buffer, the frame data that synchronizes with the score position obtained by delaying the score position calculated by the score position calculating means by the time predicted by the image display delay predicting means. Thus, in addition to the effect of claim 8, this apparatus can provide the effect of synchronizing an image with score data without delay caused by image display.

An AV synchronous reproduction apparatus of this invention is characterized in that, the apparatus has a special-reproduction start signaling means for generating a special-reproduction start signal when the score reproducing means starts special reproduction, a special-reproduction end signaling means for generating a special-reproduction end signal when the score reproducing means ends special reproduction, and a special-reproduction synchronizing-information update means for outputting a score position to the synchronizing-information table in real time during special reproduction, and in that the frame output means is configured to output frame data to the frame buffer, during special reproduction, based on the synchronizing-information table updated by the special-reproduction synchronizing-information update means. Thus, this apparatus can provide the effect of synchronizing an image with score data even during special reproduction, in contrast to the conventional technique with which synchronization between score data and an image may fail during such reproduction.

This invention provides an AV synchronous reproduction apparatus for synchronizing score data with animation data for reproduction, characterized in that the apparatus comprises a beat generating circuit that is operative, during the reproduction of score data, to output as synchronizing message a score position information identifying the current position on a score and tempo information on which the reproduction tempo is based, each time the score progresses for a specified amount of notes, an AV synchronization instruction data generating circuit that generates AV synchronization instruction data in which the progress of the score data is associated with the progress of the animation data using the specified amount of notes as reference, and a display frame determining circuit that determines animation data to be written in a frame buffer, when the time interval during which the frame buffer outputs an image to an image display circuit is designated as $\Delta T$, based on tempo information contained in a synchronizing message input from the beat generating circuit, the frame time of animation data being written in the frame buffer at the time of the input of the synchronizing message; the frame time of animation data specified by said the AV synchronization instruction data when the next synchronizing message is input, and said time interval$\Delta T$.

This invention provides an AV synchronous reproduction apparatus for synchronizing score data with motion data for a CG character for reproduction, characterized in that the apparatus comprises a beat generating circuit that is operative, during the reproduction of score data, to output as a synchronizing message, score position information identifying the current position on a score and tempo information on which the reproduction tempo is based, each time the score progresses for a specified amount of notes, an AV synchronization instruction data generating circuit that generates AV synchronization instruction data in which the progress of the score data is associated with the progress of the motion data for the CG character using the specified amount of notes as reference, and a character pose calculating circuit that determines the pose of the CG character to be written in the fame buffer, when the time interval during which the frame buffer outputs an image to an image display circuit is designated as $\Delta T$, based on tempo information contained in a synchronizing message input from the beat generating circuit, the frame time of the motion data for the CG character being written in the frame buffer at the time of the input of the synchronizing message, the frame time of the motion data for the CG character specified by the AV synchronization instruction data when the next'synchronizing message is input, and said time interval $\Delta T$.

An AV synchronous reproduction apparatus of this invention is characterized in that, the apparatus includes a tempo change input circuit that inputs a change in the tempo information.

An AV synchronous reproduction apparatus of this invention is characterized in that to synchronize a score with an image, a score position information identifying a position on the score using specified notes as reference and tempo information on the score are communicated from a score sound generating section to an image generating section, each time the score progresses for the amount of said specified notes.

This invention provides an AV synchronous reproduction method comprising the steps of outputting as synchronizing message, during the reproduction of score data, score position information identifying the current position on a score and tempo information on which the reproduction tempo is based, each time the score progresses for a specified amount of notes, generating AV synchronization instruction data in which the progress of the score data is associated with the progress of animation data using the specified amount of notes as reference, and determining animation data to be written in the frame buffer, when the time interval during which the frame buffer outputs an image to an image display circuit is designated as $\Delta T$, based on the tempo information contained in the synchronizing message input from the beat generating circuit, the frame time of the animation data being written in the frame buffer at the time of the input of the synchronizing message, the frame time of the animation data specified by said AV synchronization instruction data when the next synchronizing message is input, and the time interval ΔT.

This invention provides an AV synchronous reproduction method comprising the steps of outputting as synchronizing message, during the reproduction of score data, score position information identifying the current position on a score and tempo information on which the reproduction tempo is based, each time the score progresses for a specified amount of notes, generating AV synchronization instruction data in which the progress of the score data is associated with the progress of motion data for a CG character using the specified amount of notes as reference, and determining the pose of the CG character to be written in the frame buffer, when the time interval during which the frame buffer outputs an image to an image display circuit is designated as ΔT, based on the tempo information contained in the synchronizing message input from the beat generating circuit, the frame time of the motion data for the CG character being written in the frame buffer at the time of the input of the synchronizing message, the frame time of the motion data for the CG character specified by the AV synchronization instruction data when the next synchronizing message is input, and the time interval ΔT.

An AV synchronous reproduction method of this invention is characterized in that, the method comprises the steps of inputting a change in the tempo information and changing the tempo information in the synchronizing message to the input tempo information.

A recording medium is characterized in that a computer program that realizes the AV synchronous reproduction method has been recorded on said medium.

BRIEF DESCRIPTION OF THE DRAWINGS

FIG. 3 is an explanatory drawing of changes in the coordinates of a motion Ma over time.

FIG. 9 is an explanatory drawing of correction data according to Embodiment 2.

FIGS. 12(a), 12(b) and 12(c) are explanatory drawings showing an example of a motion according to Embodiment 4.

FIG. 13 shows the structure of scenario data according to Embodiment 4.

BEST MODE FOR CARRYING OUT THE INVENTION (Embodiment 1)

FIGS. 1 to 7 show Embodiment 1.

Figure 1:
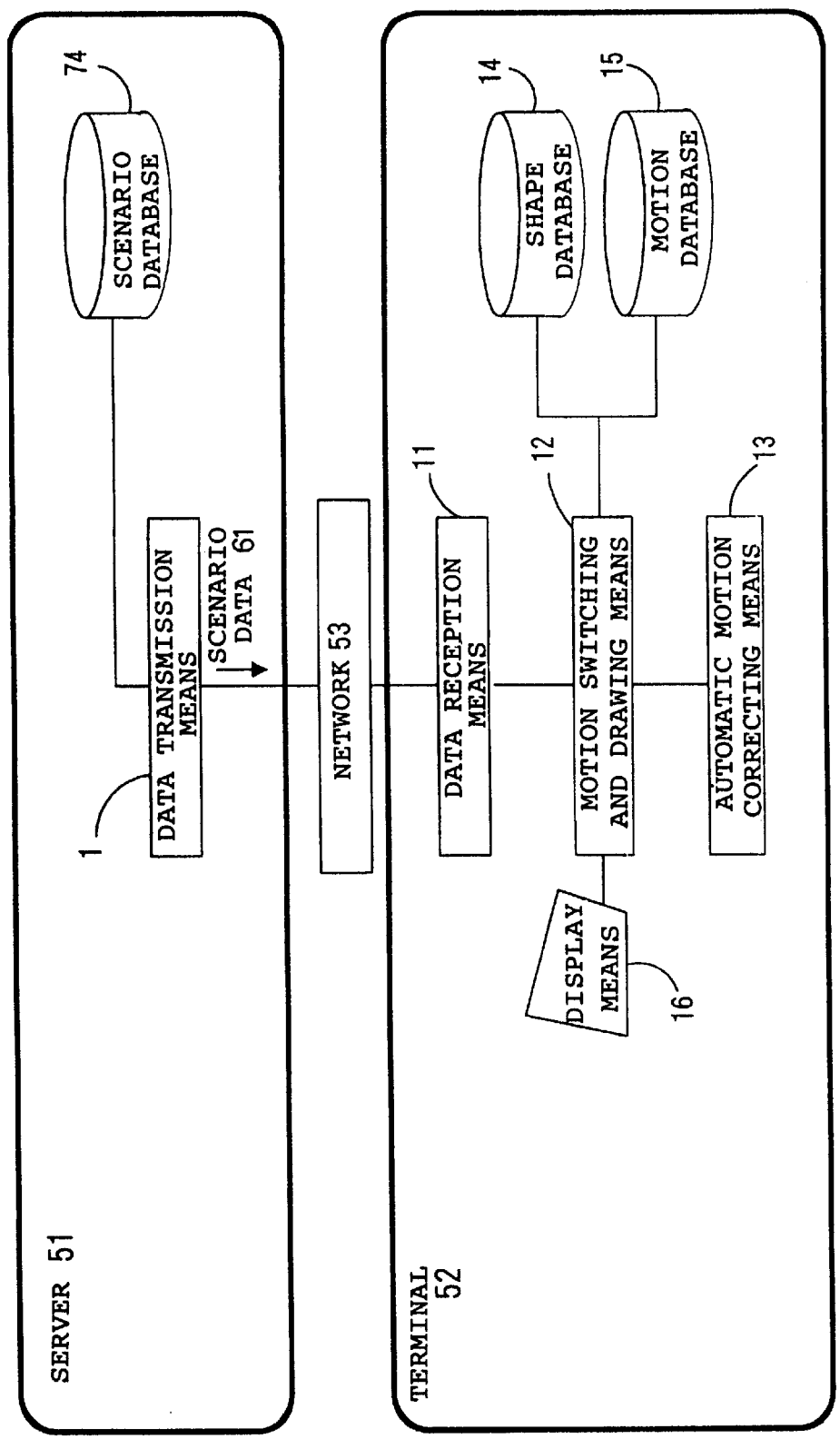
FIG. 1 is a block diagram showing Embodiment 1 of this invention.

In FIG. 1, a server 51 and a terminal 52 are connected through a network 53. The server 51 includes a data transmission means 1 and a scenario database 74.

The terminal 52 is composed of a data reception means 11, a motion switching and drawing means 12, an automatic motion correcting means 13, a shape database 14, a motion database 15, and a display means 16.

A data transmission means 1 transmits via the network 53 those 61 of a plurality of scenario data stored in the scenario database 74 which are to be displayed at the terminal 52.

The scenario data 61 specifies a three-dimensional character to display and defines a combination order of motions required to move the three-dimensional character. Specifically, the scenario data is a list of motion IDs that specifies motions.

The motions corresponding to the motion IDs are supplied beforehand to the terminal through a recording medium such as a CD-ROM or a floppy disc or the network 53, and are stored in the motion database 15 in the terminal 52.

If, for example, the motions corresponding to motion IDs {Ma, Mb, Mc, Md, Me} are stored in the motion database 15, a scenario [Ma, Mc, Ma, Me] (indicating that the items in the list are sequentially switched and displayed starting from the beginning of the list) can be defined. A scenario [Ma, Mf, Ma, Me], however, is not stored in the motion database 14, so it cannot be defined. An arbitrary combination of motions stored in the motion database 15 can be defined as scenario data.

The data reception means 11 can receive via the network 53 scenario data transmitted by the data transmission means 1.

The shape database 14 stores shape data. The shape data consists of a set of polygons each composed of two or more three-dimensional (x, y, z) coordinates.

The motion database 15 stores motions. The motion defines the amount of changes in shape data based on the time sequence.

Figure 2:
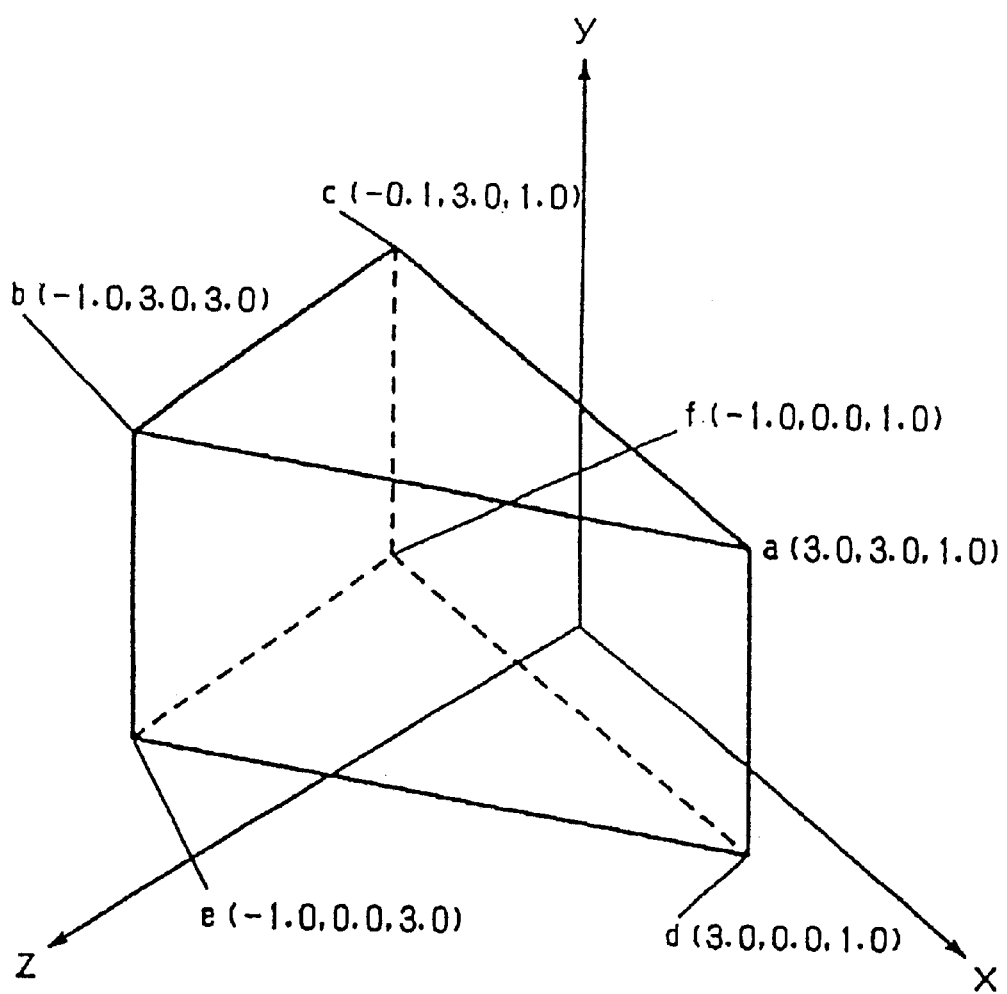
FIG. 2 is an explanatory drawing of shape data according to Embodiment 1.

For example, shape data on a triangle pole such as that shown in FIG. 2 can be defined by five polygon surfaces composed of five subsets {a, b, c}, {d, e, f}, {a, b, d, e}, {a, c, d, f}, and {b, c, e, f} of six vertexes (a), (b), (c), (d), (e), and (f) (this is referred to as an "object A"). A motion that rotates the object A through 180° around the X axis and through 360° around the Y axis in 60 seconds can be described as in FIG. 3 (this motion is referred to as a "motion Ma").

The rotating angle need not be defined for all displayed frames. A rotating angle is defined for a particular time (this is referred to as a "key frame"), and an interpolation algorithm is used to calculate the other rotating angles. Several general algorithms have been proposed as the key frame interpolation algorithm, but the following description relates to a one-dimensional linear interpolation algorithm. The one-dimensional linear interpolation algorithm is used to calculate a rotating angle relative to the X axis 45 seconds after the start.

$$100° = [((45-40)/(50-40)) \times (120-80) + 80]$$

Figure 4:
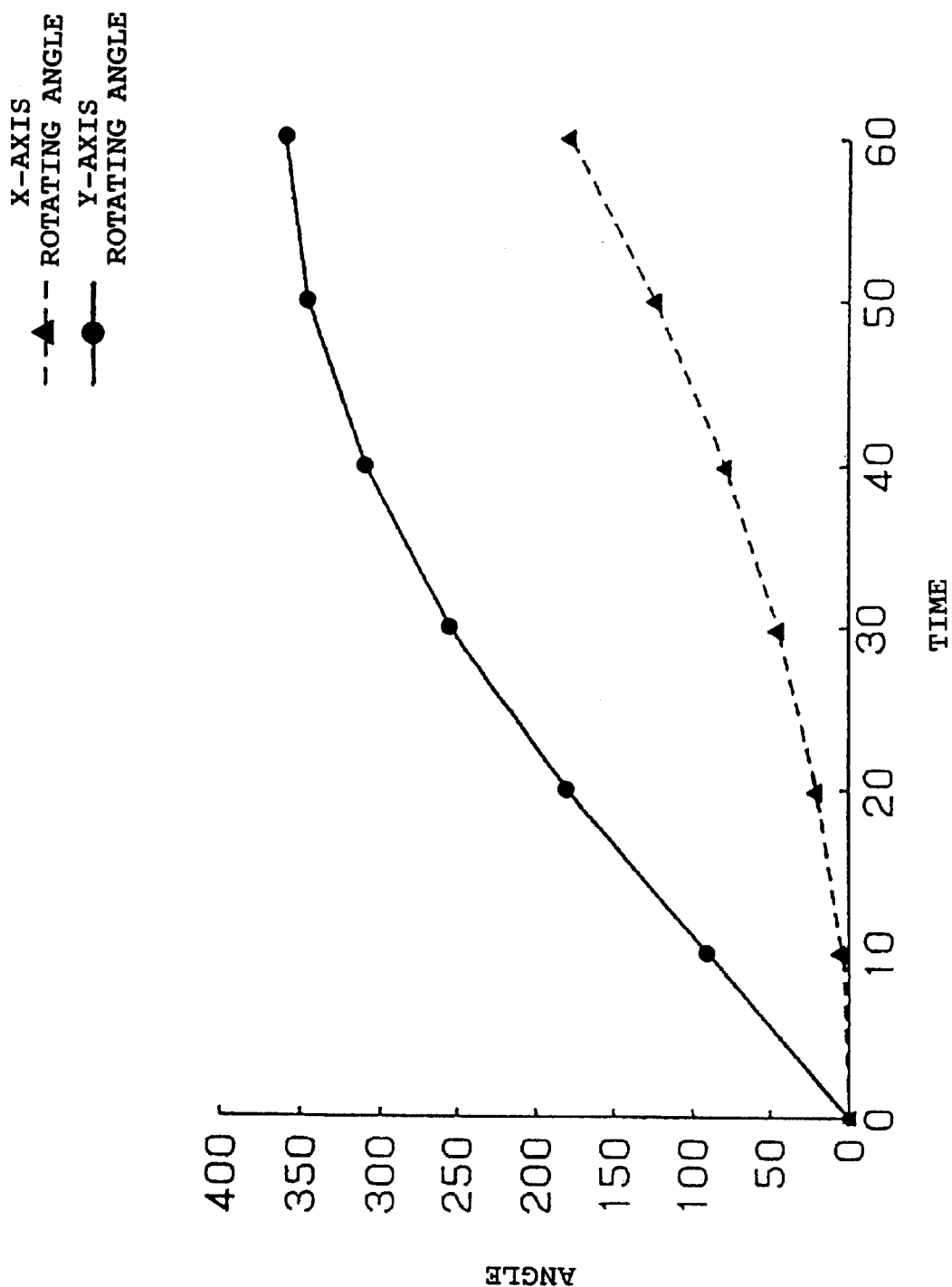
FIG. 4 is a motion graph of the motion Ma according to Embodiment 1.

The motion database 15 is a set of items that are generally defined as a set of key frames. FIG. 4 is a motion graph in which changes in motion are represented as a graph. The black circles and triangles in FIG. 4 indicate key frames.

The motion switching and drawing means 12 displays CG animations while sequentially switching motions based on the scenario data 61 received by the data reception means 11. Each motion is a set of key frames within a particular period of time (motion time).

For example, the motion Ma has seven key frames in 60 seconds. The one-dimensional linear interpolation can be executed to recover a motion graph such as that shown in FIG. 4.

Although this embodiment uses the one-dimensional linear interpolation for key frame interpolation, other known methods such as spline non-linear interpolation exist. Since any of these methods can be used to provide similar effects, this invention is not particularly limited to the one-dimensional linear interpolation method.

For example, the coordinates of a vertex a of the object A 45 seconds after the start of the motion Ma are calculated. First, the X- and Y-axis rotating angles are calculated using the linear interpolation. The X-axis rotating angle is 100° as calculated above, and the Y-axis rotating angle is calculated as follows.

$$300° = [((45-40)/(50-40)) \times (345-255) + 255]$$

First, the coordinates after rotation through 100° around the X axis are calculated. When the X-axis rotating angle is designated as xang, (x, y, z) can be calculated as follows.

$$(x, y \cdot \cos(xang) + z \cdot \sin(xang), -y \cdot \sin(xang) + z^* \cos(xang))$$

Thus, the values of a (3.0, 3.0, 1.0) can be determined as follows.

x=3.0 y=3.0·(−0.174)+1.0·0.984=0.462 z=−3.0 ·0.984+1.0·(−0.174)=−3.126

Next, the coordinates after rotation through 300° around the Y axis are calculated. When the Z-axis rotating angle is designated as yang, (x, y, z) can be calculated as follows.

$$(x \cdot \cos(yang) + z \cdot \sin(yang), y, -x \sin(yang) + z \cdot \cos(yang))$$

x=3.0·0.5+(−3.126)·(−0.866)=4.207 y=0.462 z=−3.0·(−0.866)+(−3.126)·0.5=1.035

Consequently, the vertex (a) will have moved to the position (4.207, 0.462, 1.035) 45 seconds after the start of the motion. The same calculation can be applied to the five other vertexes to calculate the coordinates of each vertex.

After this coordinate conversion, rendering can be executed to display frames. From start to end of a motion, the motion switching and drawing means 12 executes this series of processing like a chain based on a frame rate (that defines how many frames are drawn per second) in order to display CG animations. Once the CG animations within the motion time for which a single motion is defined have been finished, the display of the CG animations for the next motion defined in the scenario data is started. In this manner, the motions are sequentially switched to continuously display CG animations.

The automatic motion correcting means 13 corrects a motion when the motion switching and drawing means 12 switches it. If motions are continuously displayed, they may be discontinued at connections.

Figure 5:
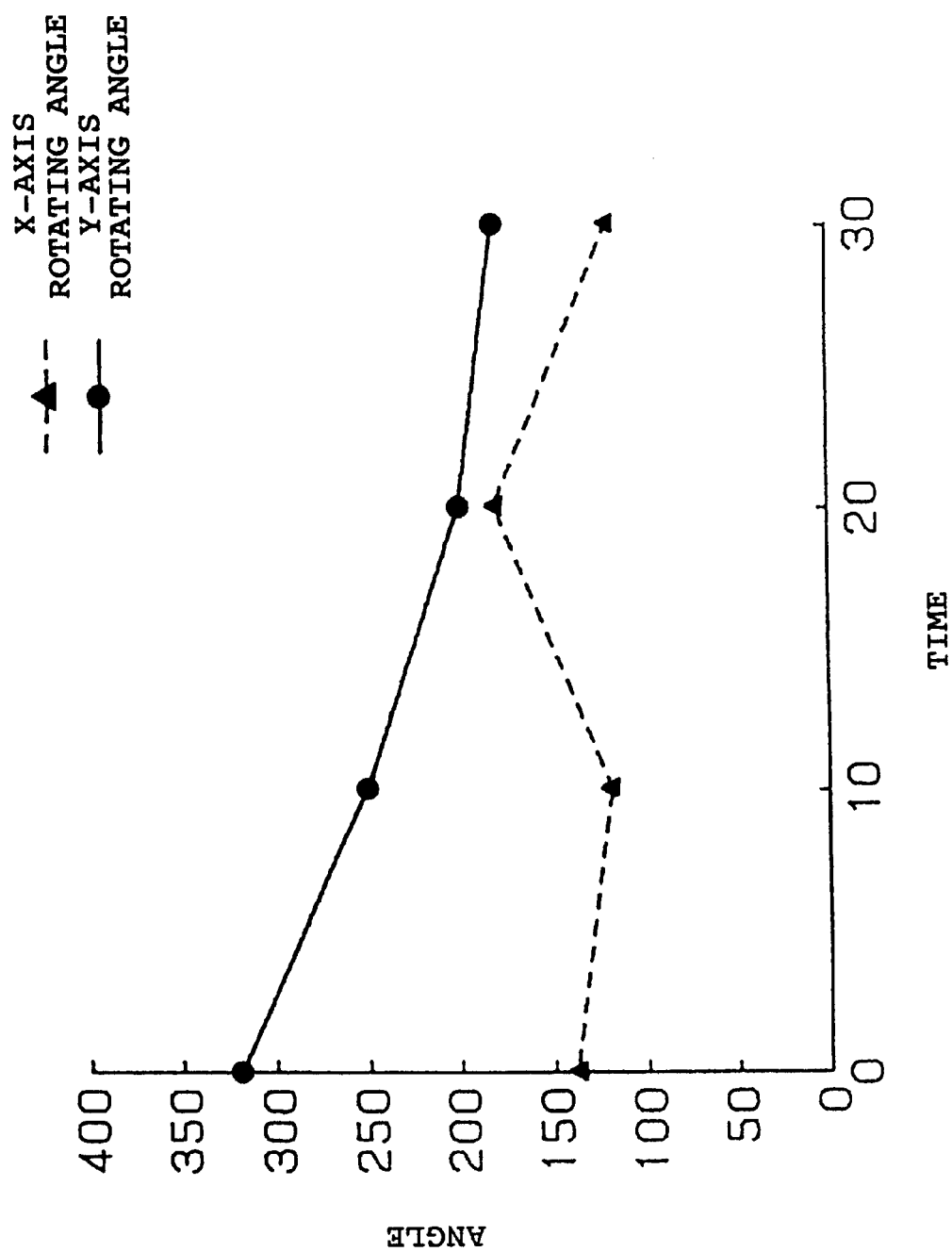
FIG. 5 is a motion graph of a motion Mb according to Embodiment 1.

For example, a motion Mb is assumed to be displayed after the motion Ma. FIG. 5 shows a motion graph for the motion Mb. Furthermore, FIG. 6 shows a combination of the motion graphs for Ma and Mb.

Figure 6:
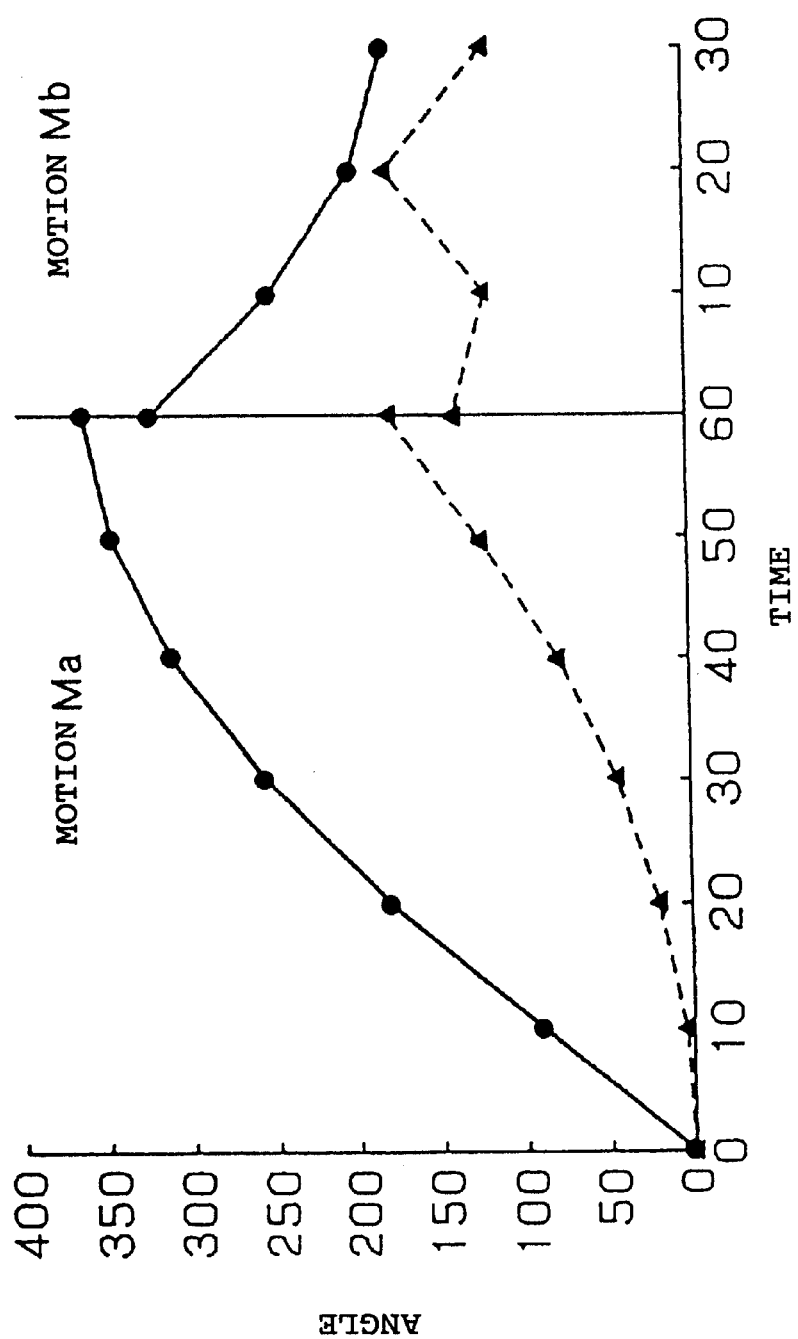
FIG. 6 is a motion graph of the motions Ma and Mb according to Embodiment 1.

As is apparent from FIG. 6, discontinuity occurs between a 60-second frame of the motion Ma and a 0-second frame of the motion Mb.

In this case, the discontinuity of the motions is avoided by setting the average of the values of the 60-second frame of the motion Ma and of the 0-second frame as a key frame upon motion switching. The key frame upon the switching between the motions Ma and Mb is calculated.

Figure 7:
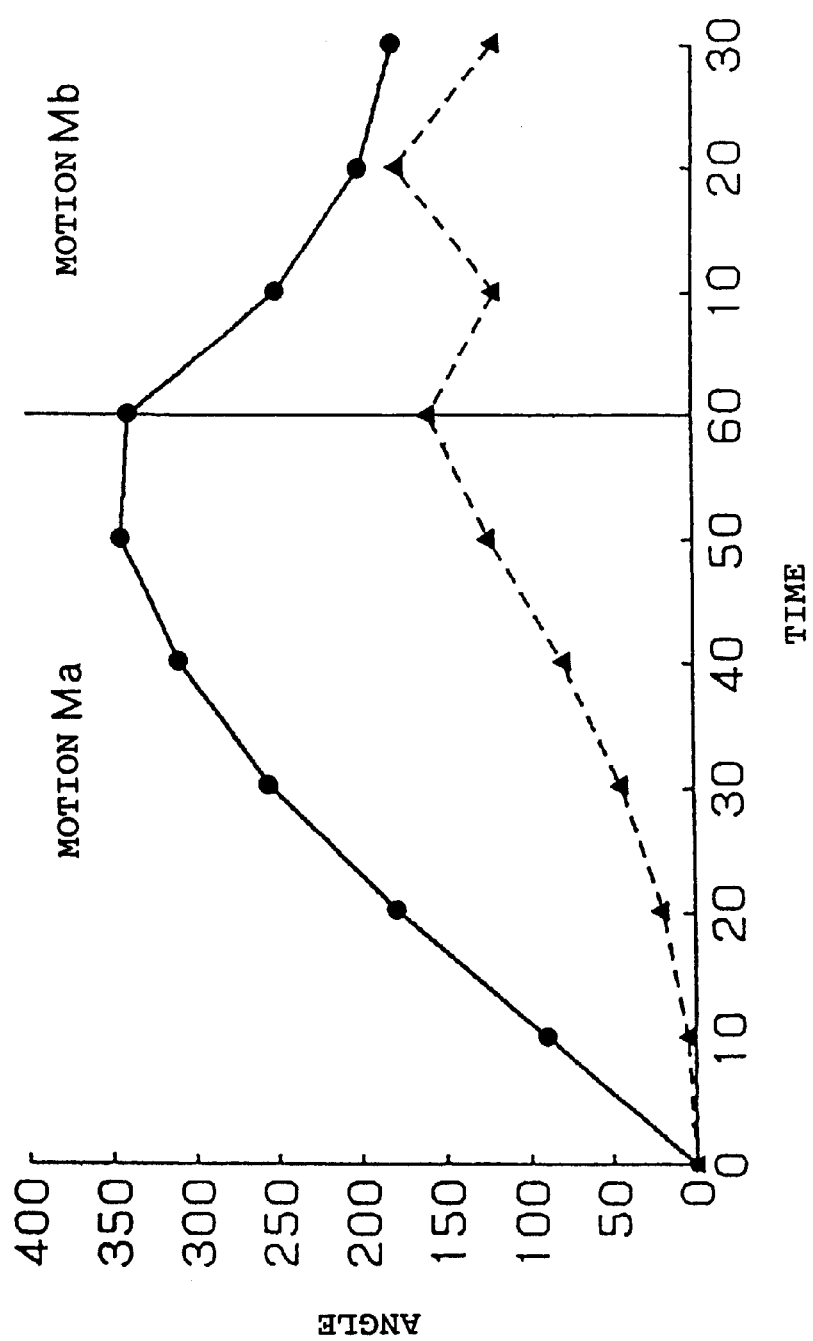
FIG. 7 is a corrected motion graph according to Embodiment 1.

The motion graphs in FIG. 7 can be connected together smoothly by setting the X-axis rotating angle 160°=(180°+140°)/2 and the Y-axis rotating angle 340°=(360°+320°)/2 as a key frame for switching.

When switching a motion, the automatic motion correcting means 13 calculates a key frame from the current and subsequent motions to automatically correct the motion. There are a plurality of such known correcting methods. Any of these methods can be used to provide similar effects, so this invention is not particularly limited to the above correcting method.

In this manner, only the scenario data defining a combination order of motions is transmitted to the terminal 52 through the network 53 and shape and motion data on three-dimensional characters that has a large data capacity is not transmitted. Thus, only a small amount of data is transferred to reduce the burden on the network.

In addition, since the automatic motion correcting means 13 at the terminal 52 corrects a motion when switching it, three-dimensional characters' motions displayed on the display means 16 of the terminal 52 are very smooth.

(Embodiment 2)

Figure 8:
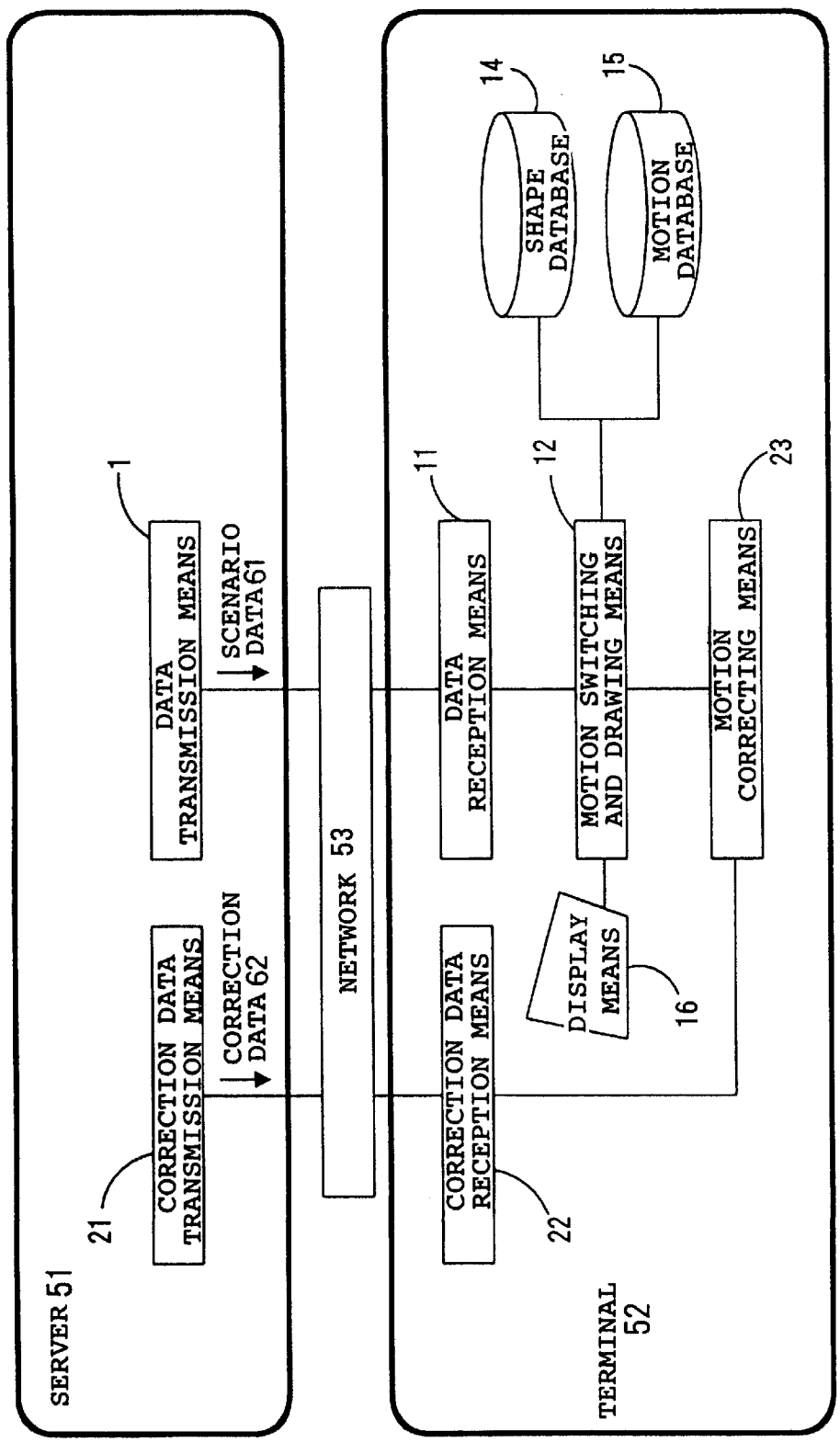
FIG. 8 is a block diagram of Embodiment 2.

FIGS. 8 and 9 show Embodiment 2.

In FIG. 8, the server 51 and the terminal 52 are connected together through the network 53. The server 51 is composed of the data transmission means and a correction data transmission means 21. The terminal 52 is composed of the data reception means 11; a correction data reception means 22; the motion switching and drawing means 12; the display means 16; a motion correcting means 23; the shape database 14; and a plurality of motion databases 15.

The components 1, 11, 12, 14, 15, and 16 are the same as in Embodiment 1, so their description is omitted.

The correction data transmission means 21 transmits correction data 62 that corrects the connections between the motions in the scenario data 61 transmitted by the data transmission means 1.

The correction data 62 is calculated beforehand using the same means as in the automatic motion correcting means 13 described in Embodiment 1 in order to smoothly move three-dimensional characters at the time of and following switching.

That is, the correction data 62 defines motions and their frame time. For example, FIG. 9 shows correction data 62 for the motions Ma and Mb.

After the motion Ma has been displayed, it is switched to the motion Mb. The 60-second key frame of the motion Ma (X-axis rotating angle: 180°; Y-axis rotating angle: 360°) and the 0-second key frame of the motion Mb (X-axis rotating angle: 140°; Y-axis rotating angle: 320°) are corrected so that the X-axis rotating angle will be 160° while the Y-axis rotating angle will be 340°.

The number of such correction data 62 must be equal to the number of motion switchings in the scenario data. For example, if the scenario data specifies five motions {Ma, Mb, Mc, Md, Me}, correction data is required for the four connections between the motions (Ma, Mb), (Mb, Mc), (Mc, Md), (Md, e) corresponding to motion switchings. The correction data transmission means 21 transmits the correction data 62 to the terminal 52.

The correction data reception means 22 receives the correction data 62 transmitted by the server.

When the motion switching and drawing means 12 switches a motion, the motion correcting means 23 corrects it to smooth the three-dimensional character's motion, based on the correction data 62 received by the correction data reception means 22.

If, for example, the correction data in FIG. 9 is being received, the 60-second key frame of the motion Ma and the 0-second key frame of the motion Mb are corrected to define the frame time shown in FIG. 7 before the motion switching and drawing means 12 switches from motion Ma to motion Mb. For example, the correction data for Ma and Mb is as shown in FIG. 9.

As described above, this embodiment transmits to the terminal 52 through the network 53, only the scenario data 61 defining a combination order of motions and the correction data 62 that is motion data at the time of and following switching, and does not send shape data on three-dimensional characters that has a large data capacity or all motions. Thus, this invention requires a small amount of data transferred and places a small burden on the network 53.

In addition, this invention corrects motions based on the transmitted correction data 62, so three-dimensional characters' motions displayed on the display means 16 of the terminal 52 are very smooth.

(Embodiment 3)

Figure 10:
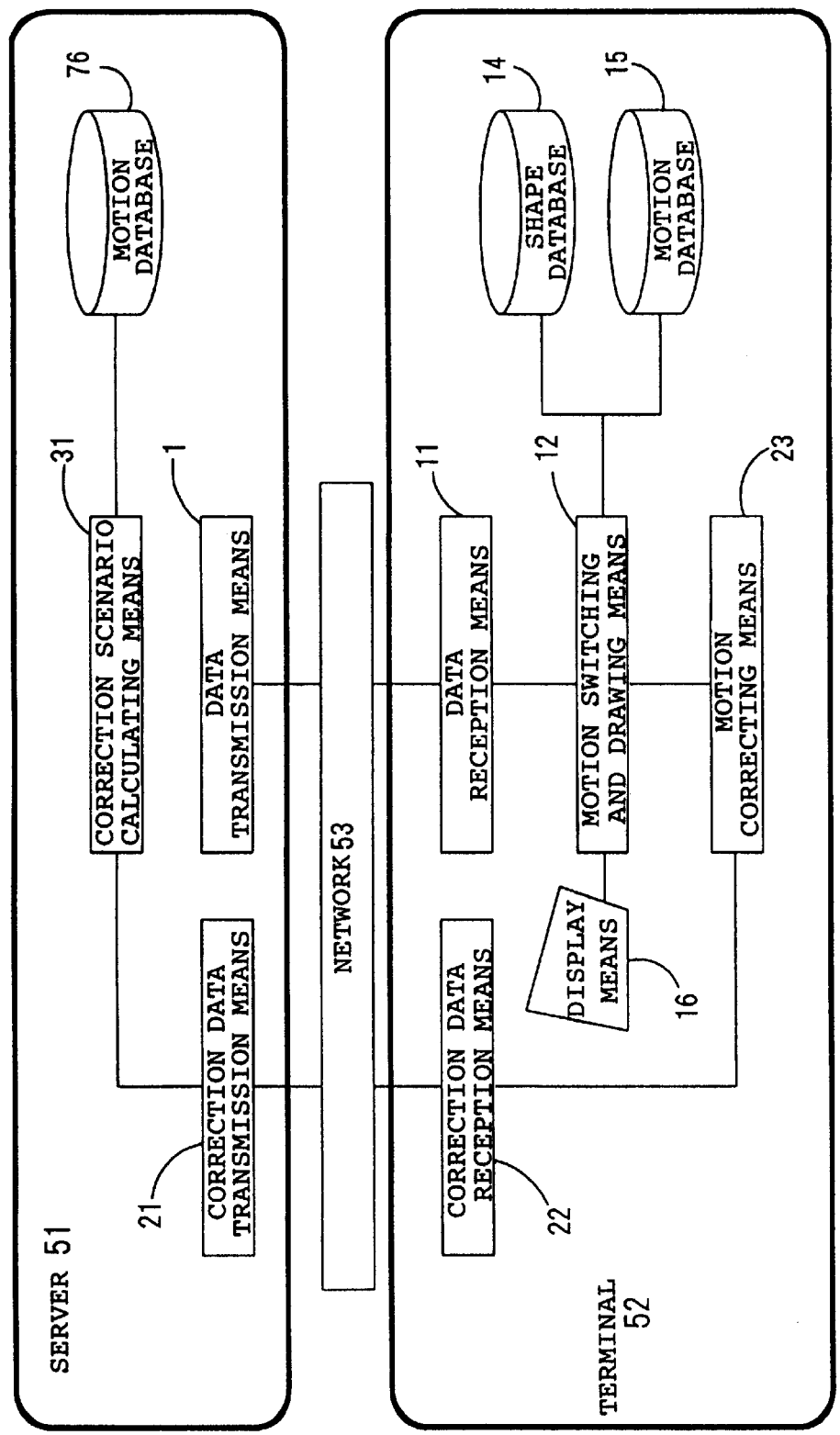
FIG. 10 is a block diagram of Embodiment 3.

FIG. 10 shows Embodiment 3.

In this figure, the server 51 and the terminal 52 are connected together through the network 53. The server 51 is composed of the data transmission means 1, a motion database 76, the correction data transmission means 21, and a correction scenario calculating means 31. The terminal 52 is composed of the data reception means 11; the correction data reception means 22; the motion switching and drawing means 12; the display means 16; the motion correcting means 23; the shape database 14; and the plurality of motion databases 15.

The components 1, 11, 12, 14, 15, 16, 21, 22, and 23 are the same as in Embodiments 1 and 2, so their description is omitted.

The correction scenario calculating means 31 calculates correction data that enables the smooth display of the connections between the motions in the scenario data transmitted by the scenario transmission means 1, based on the motion database 76, and transmits this data to the terminal using the correction data transmission means 22. The correction data calculating method is the same as in the automatic motion correction means 13 described in Embodiment 1, so its description is omitted.

As described above, this embodiment transmits to the terminal 52 through the network 53, only the scenario data defining a combination order of motions and the correction data calculated by the correction scenario calculating means 31 of the server 51, and does not send shape data on three-dimensional characters that has a large data capacity or all motions. Thus, this invention requires a small amount of data transferred and places a small burden on the network 53.

In addition, this invention corrects motions based on the transmitted correction data, so three-dimensional characters' motions displayed on the display means 16 of the terminal 52 are very smooth.

(Embodiment 4)

Embodiments 1 to 3 require motions to be corrected upon motion switching, but according to Embodiment 4, each motion has its home position and smooth motions are displayed by switching three-dimensional characters' motions each having a common pose when the scenario data is switched.

FIGS. 11 to 15 show Embodiment 4.

Figure 11:
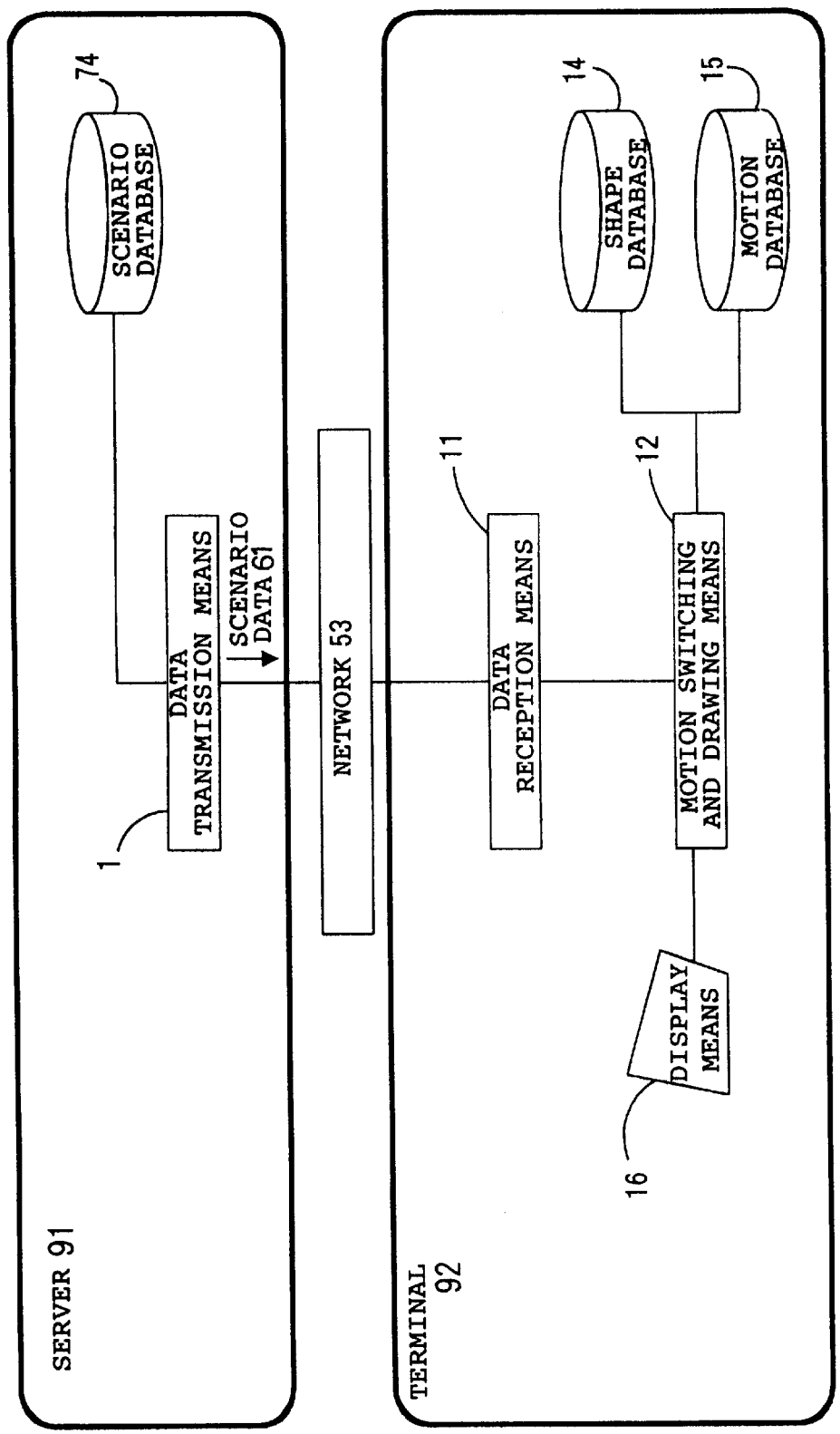
FIG. 11 is a block diagram of Embodiment 4.

In FIG. 11, the server 91 and the terminal 92 are connected together through the network 53. The server 91 is composed of the data transmission means 1 and a scenario database 74. The terminal 92 is composed of the data reception means 11; the motion switching and drawing means 12; the display means 16; the shape database 14; and the motion databases 15.

The components 1, 11, 12, 14, 15, 16, and 74 are the same as in Embodiments 1.

The shape database 14 of the terminal 92 stores various types of skeleton models of three-dimensional characters; polygon data on their heads, chests, waists, arms, hands, and legs; and texture data stuck to the surface of polygons.

As shown in FIG. 12, the motion database 15 stores motions M1, M2, M3, . . . for each scene, that is, a scene S1, a scene S2, a scene S3, . . . to constitute the motion database 12.

For simplification, changes in motion are described using skeleton data. Actual graphic display is provided by adding around each skeleton data a site composed of a polygon and sticking texture to each site as required.

Motions M1 and M2 shown in FIG. 12 have a motion home position HP1 for a common pose. Motions M2 and M3 have a motion home position HP2 for a common pose. The starting and end home positions of the motion M3 are the same (HP2).

The shape database 14 and motion database 15 can be each composed of, for example, a CD-ROM or DVD (Digital Video Disc), a hard disc, a rewritable semiconductor RAM, or a rewritable optical disc.

FIG. 13 shows the structure of the scenario data 61.

The scenario data 61 is composed of shape data identification information and motion specification information.

The shape data identification information consists of skeleton model identification information for identifying a skeleton model for a displayed three-dimensional character; three-dimensional-character polygon identification information for identifying polygons added to this skeleton model; and three-dimensional-character texture identification information for identifying texture stuck to the surface of the polygons. These pieces of shape data identification information identify a displayed three-dimensional character.

The motion data specification information specifies the order of motions used in the scenario data 61 and a time interval indicating the time from beginning to end of each motion. A single scene number is assigned to each single motion data.

The scenario data 61 specifies the order of motions beforehand so that when a motion Mi in a scene Si is switched to a motion Mi+1 in a scene Si+1, the pose at the end of the motion Mi (that is, a motion end home position) matches the pose at the beginning of the motion Mi+1 (that is, a motion start home position).

Specific examples are described with reference to FIGS. 12, 13, and 14.

Figure 14:
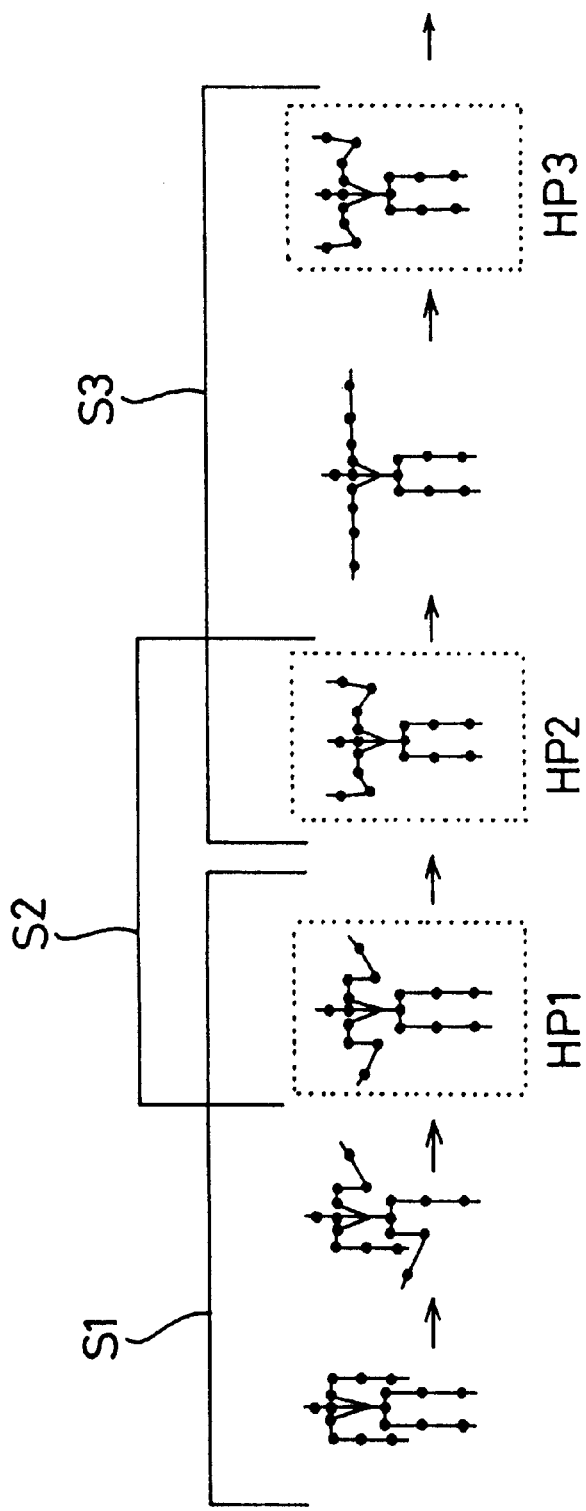
FIG. 14 is an explanatory drawing showing an example of motions connected according to the scenario data according to Embodiment 4.

FIG. 14 illustrates the motions of a three-dimensional character indicated in the scenario data 61 in FIG. 13, using skeleton data.

The scenario data 61 in FIG. 13 indicates the order of motions required to move the three-dimensional character and the time length (hereafter referred to as the "time interval") from beginning to end of each motion such that the motions M1 to M3 in FIGS. 12(a) to (c) are used to move the three-dimensional character in order to create the scenes S1, S2, S3, . . . , Si.

In the example in FIG. 14, the motion M1 in FIG. 12(a) is assigned to a time interval T1 in the scene S1, and the three-dimensional character spends a time interval T1 moving from the first to last (HP1) pose of the motion M1.

For explanation, FIG. 12 shows only representative poses of the motion, but actual motions include between these representative poses, other data, that is, slightly different poses that must be assumed by the three-dimensional character. In addition, if the motion includes no such pose as data, a CPU (a central processing unit) can perform well known operations such as the one-dimensional linear interpolation or spline interpolation to generate required poses.

The scenario data 61 then assigns the motion M2 to a time interval T2 in the scene S2. According to this scenario data, the three-dimensional character spends the time interval T2 moving from the first (HP1) to last (HP2) pose of the motion M2 in FIG. 12(b).

In this case, the scenario data is set so that in the motions M1 and M2 in the scenes S1 and S2 that are temporally adjacent to each other, the pose at the end of the motion M1 is the same home position (HP1) as the pose at the beginning of the next motion M2.

Thus, in FIG. 14, the three-dimensional character moves smoothly from the scene S1 to the scene S2.

Likewise, the scenario data in FIG. 13 is set so that in the motions M2 and M3 in the scenes S2 and S3 that are temporally adjacent to each other, the pose at the end of the motion M2 is the same home position (HP2) as the pose at the beginning of the next motion M3. Thus, in FIG. 14, the three-dimensional character moves smoothly from the scene S2 to the scene S3.

In this manner, in the scenario data, the order of motions is set so that between temporally adjacent scenes, the motion Mi used in one scene and the motion Mi+1 used in the next scene have a common home position, thereby preventing the motion of the three-dimensional character from becoming discontinuous at the connections between scenes to achieve smooth motions.

Although not shown in FIGS. 13 and 14, if the poses at the beginning and end of the motion are in the same home position (HP3) as in the motion M3 in FIG. 12(c), the scenario data can repeat specifying the same motion M3 any number of times. This feature can be used to repeat the same motion, for example, a motion in which the character steps forward alternately using its legs.

In this case, one motion is repeated a specified number of times, a smaller number of motions must be stored in the motion database 15 of the terminal 92 than in the case in which the same motion is provided in separate forms depending on the number of repetitions, for example, a twice repetition of the motion and a three-time repetition of the motion. Thus, this embodiment is economical.

Figure 15:
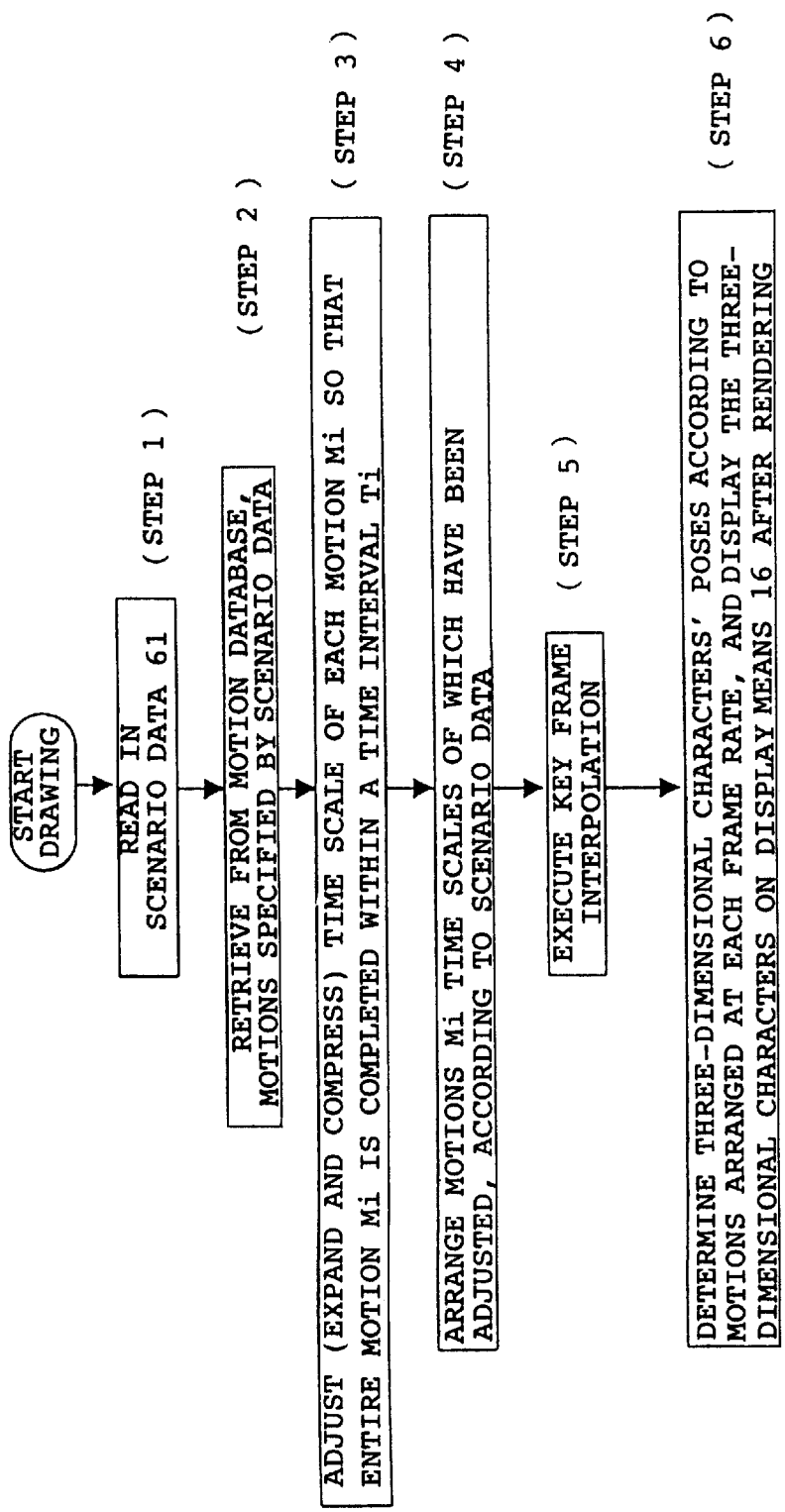
FIG. 15 is a flowchart of a motion switching and drawing means according to Embodiment 4.

The motion switching and drawing means 12 in FIG. 11 executes the process shown in FIG. 15.

In this figure, at step 1, the scenario data 61 is read, and at step 2, the motions specified by the scenario data are retrieved from the motion database. At step 3, the time scale of each motion Mi is adjusted so that the entire motion Mi is finished within a time interval Ti.

This adjustment means the extension and compression of the time scale of a motion.

At step 4, the motions Mi for which the time scale has been adjusted are sequentially arranged according to the scenario data. Since the motion inherently has a key frame as information, the data between a key frame and the subsequent key frame must be generated by means of interpolation.

Thus, at step 5, key frame interpolation is provided. There are many known key frame interpolation methods including the one-dimensional linear interpolation and spline non-linear interpolation. Any of these methods, however, can be used to provide similar effects, so this invention does not limit the interpolation method.

At step 6, the pose of the three-dimensional character is determined according to the motions arranged at a certain frame rate and is rendered to display the three-dimensional character on the display means 16.

This processing is continued until the last motion specified by the scenario data 61 is completed.

Thus, only the scenario data 61 is transmitted to the terminal 92 from the server 91, so only a small amount of data is transferred to reduce the burden on the network 53.

Furthermore, when the scene is switched, the switching is carried out with the timing of a common home position so as to allow the three-dimensional character to assume the same pose, so the graphic display is smooth in the connections between the scenes.

Although the above embodiment switches the scene by switching the motion pattern that is common to a motion pattern being executed and the next motion pattern to execute, in other words, the motion pattern that is executed with the timing of a completely matching home position, almost similar effects can be expected by configuring the terminal so as to determine the time for each scene so that the scene is switched by switching the motion pattern that runs with the timing of a position that is generally common to a motion pattern being executed and the next motion pattern to execute.

(Embodiment 5)

Figure 16:
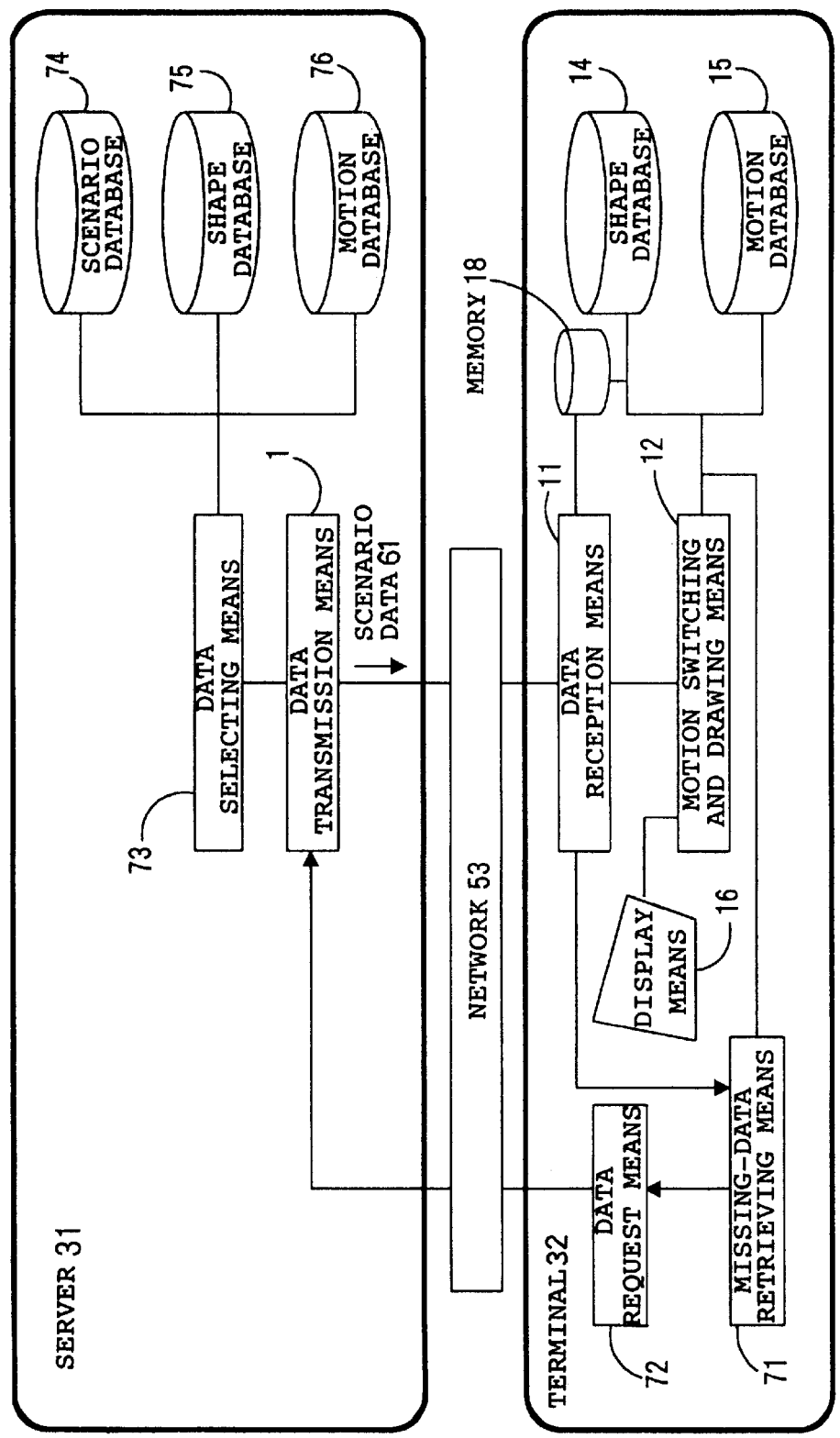
FIG. 16 is a block diagram of Embodiment 5.
Figure 17:
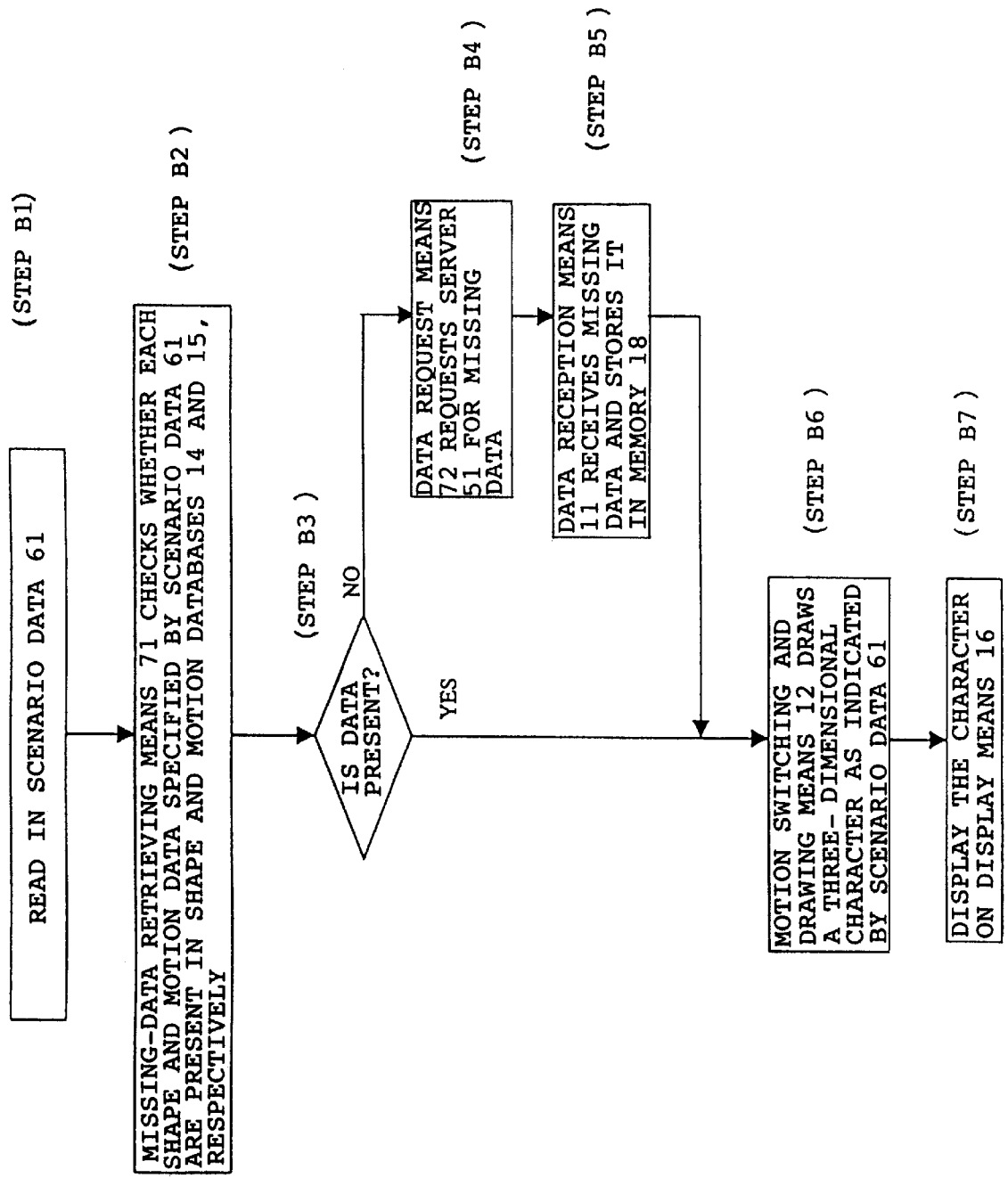
FIG. 17 is a flowchart of terminal missing-data processing according to Embodiment 4.
Figure 18:
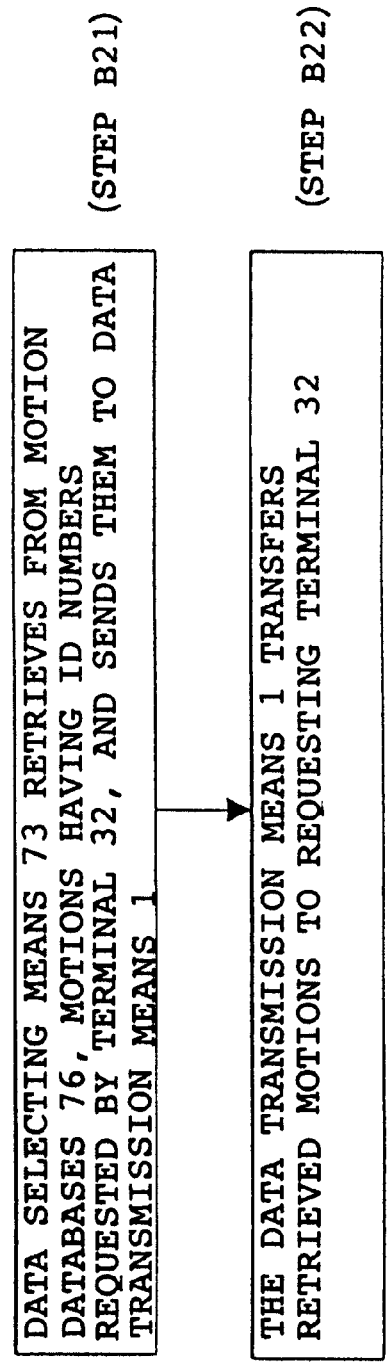
FIG. 18 is a flowchart of server missing-data processing according to Embodiment 4.

FIGS. 16 to 18 show Embodiment 5.

In FIG. 16, the terminal 32 is connected to the server 31 via the network 53. Reference numeral 14 designates the shape database of the terminal 32, 15 is the motion database; 18 is a memory; 74 is the scenario database of the server 31; 75 is the shape database; and 76 is the motion database.

The motion database 15 and shape database 14 of the terminal 32 can be each composed of, for example, a CD-ROM or DVD (Digital Video Disc), a rewritable semiconductor RAM, a hard disc, or a rewritable optical disc. In addition, the memory 18 is composed of a rewritable semiconductor RAM, a hard disc, or a rewritable optical disc.

The server 31 means an exclusive server machine of a client-server type but includes a peer-to-peer type that has both server and client functions in a single machine.

The shape databases 14 and 75 store data on various types of three-dimensional characters. A specific identification number is assigned to each data.

By way of example, these databases use identification numbers to store skeleton models of various three-dimensional characters; data on each site such as an arm, a leg, a face, or a body which corresponds to the skeleton model and which is composed of a polygon; and texture that is stuck to the surface of the polygon.

The data stored in the shape databases 14 and 75, however, are not always equal, and some data are stored in the shape database 75 of the server 31 but not in the shape database 14 of the terminal 32.

Likewise, the motion databases 15 and 76 store motion data corresponding to each three-dimensional character. Each motion is provided with a specific identification number and is stored and managed in the motion database 15. The data stored in these databases, however, are not always equal, and some data are stored in the motion database 76 of the server 31 but not in the motion database 15 of the terminal 32.

A missing-data retrieving means 71 checks whether the shape data and motions specified by the scenario data 61 transmitted by the server 31 are all contained in the shape and motion databases 14 and 15.

This check can be executed using the motion identification numbers (M1, M2, . . . , Mi) in the motion specification information in the scenario data 61 shown in FIG. 13.

If any data is not contained in the databases of the terminal 32, the missing-data retrieving means 71 informs a data request means 72 of this data. The data request means 72 communicates through the network 53 to a data selecting means 73 of the server 31 a request for downloading the missing data, identification information on that (those) data, and the identification number (for example, an IP address) of the terminal 32 that has issued the download request.

The data selecting means 73 finds the data in the shape or motion database 75 or 76 based on the download request and data identification information, and delivers it to the data transmission means 1 together with the identification number of the terminal 32 that has issued the download request.

The data transmission means 1 then transmits the received data through the network 53 to the terminal 32 having the received identification number.

The data reception means 11 of the terminal 32 stores the received data in the memory 18.

The motion switching and drawing means 12 uses the data stored in the shape and motion databases 14 and 15 and memory 18 to draw an image as indicated by the scenario data 61 in order to display a graphic on the display means 16.

FIG. 17 shows a flowchart of processing executed by the terminal 32. The scenario data 61 has already been transferred from the server 31 to the terminal 32 via the network 53.

In FIG. 17, at step B1, the scenario data 61 is read into terminal 32. At step B2, the missing-data retrieving means 71 searches the shape and motion databases 14 and 15 to check whether the shape data and motions specified by the scenario data 61 are each contained in the database, using the shape data and motion identification information. The determination is made at step B3.

If the result of the determination is negative at step B3, the data request means 72 issues to the server 31 a request for transferring the missing shape data and/or motion to the terminal 32 at step B4. In this case, the data request means transmits the request to the server 31 together with the identification number of the requesting terminal 32.

FIG. 18 shows processing executed by the server 31.

At step B21 in FIG. 18, the data selecting means 73 of the server 31 retrieves from the motion database 76 in the server 31 the motion having the identification number requested by the terminal 32, and transmits it to the data transmission means 1.

At step B22, the data transmission means 1 transfers this motion to the requesting terminal 32. In this case, the destination is identified using the identification number of the terminal 32.

Returning to FIG. 17, at step B5, the transferred motion (that is, the missing motion) is received by the data reception means 11 and held in the memory 18.

At step B6, the motion switching and drawing means 12 combines this motion with other motions as specified by the scenario data 61 to generate a series of motions in order to draw the three-dimensional character, and at step B7, the character is displayed on the display means 16. The rendering method is the same as in Embodiment 1.

According to this invention, the communication time is short because only the scenario data 61 having a small data capacity is transferred from the server 31 to the terminal 32. In addition, character or motion data is transferred only if any required character data or motion is not contained in the terminal 32, thereby enabling the communication time to be reduced compared to the conventional technique that transfers character data and motions each time.

Although, in Embodiment 5, motion data is missing, if shape data is missing, the terminal 32 can also requests the server 31 for data and the server 31 can retrieve the requested data from the database and send it to the terminal 32 via the network 53, thereby providing the terminal with the missing data to enable the display as specified by the scenario data.

(Embodiment 6)

Figure 19:
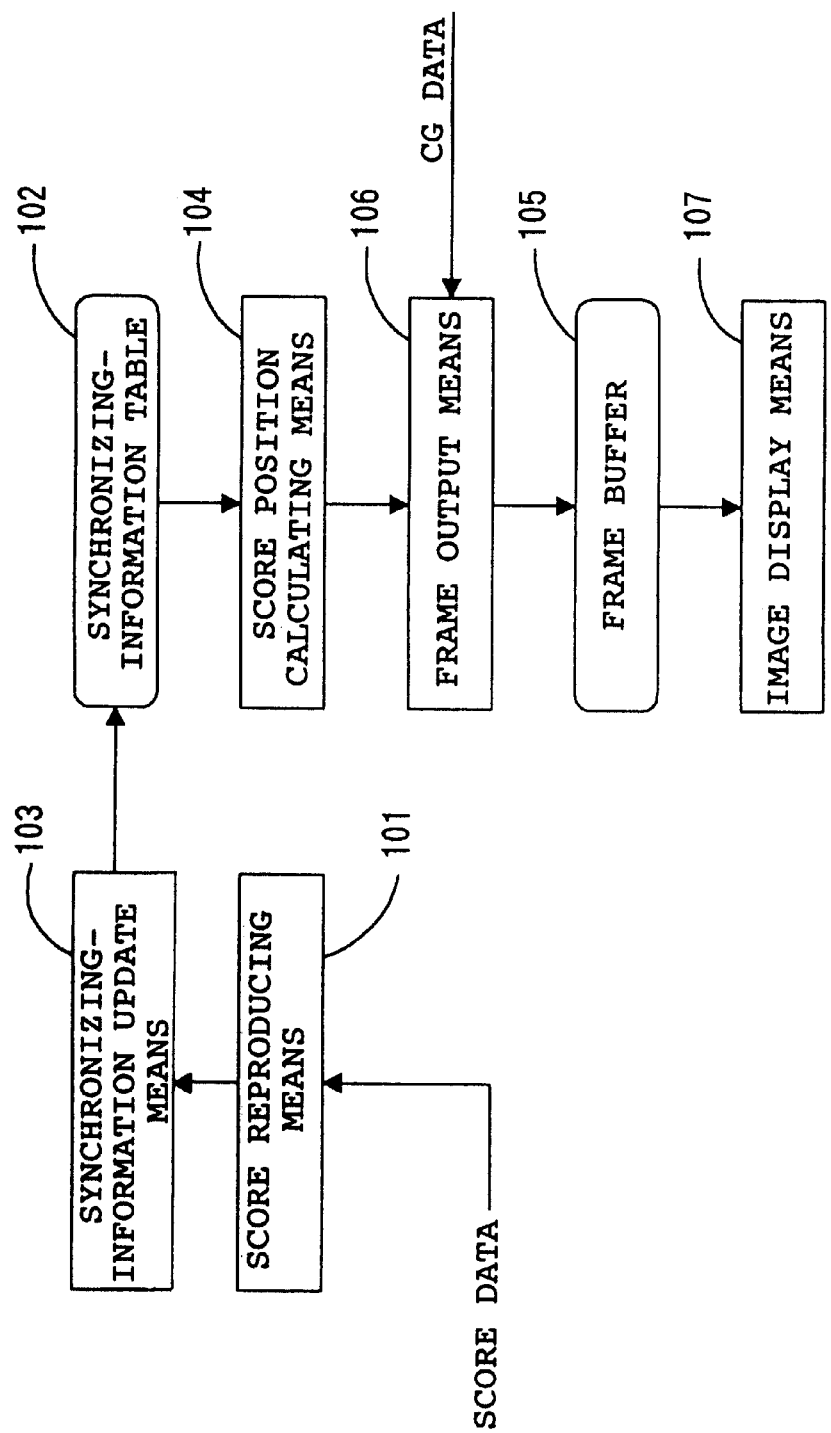
FIG. 19 is a block diagram of Embodiment 6.
Figure 20:
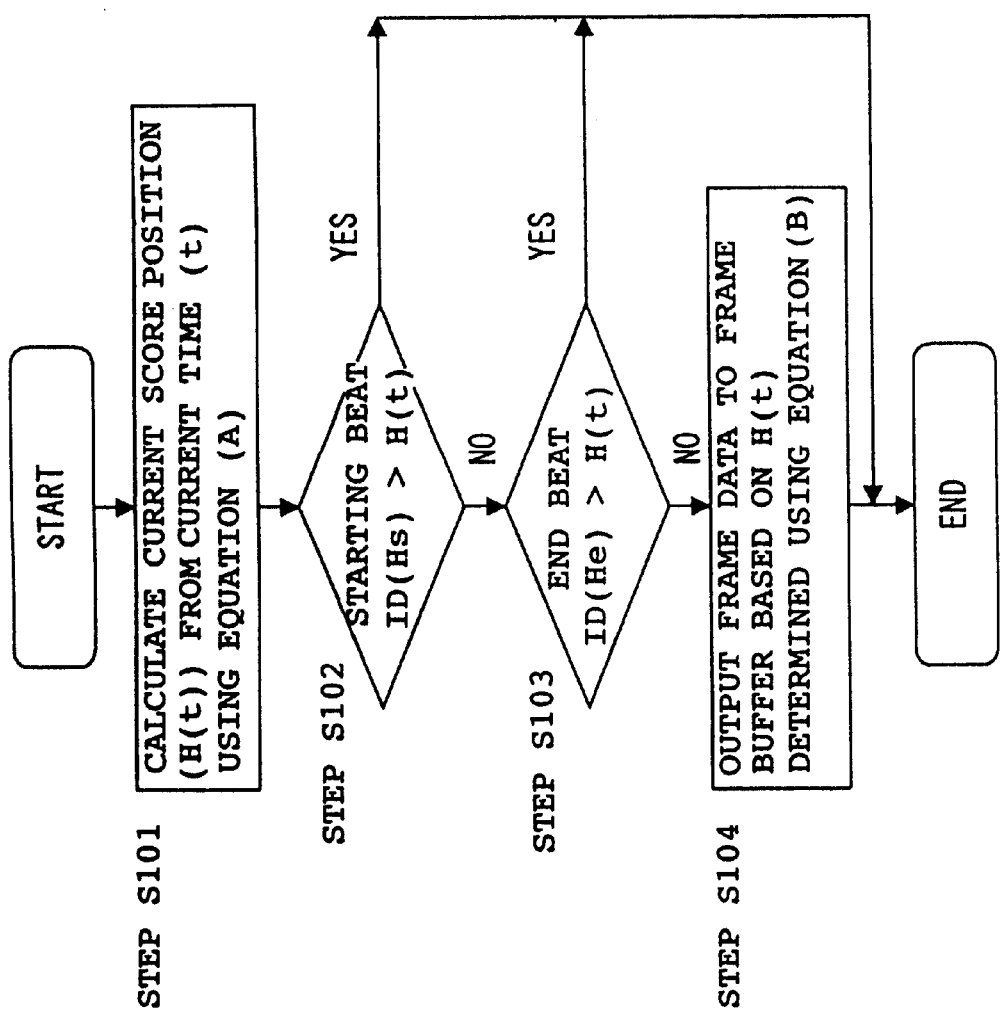
FIG. 20 is a flowchart of Embodiment 6.

FIGS. 19 and 20 show Embodiment 6.

FIG. 19 shows an AV synchronous reproduction apparatus according to this invention, wherein a score reproducing means 101 reads in score data and plays a score based on the data. The score data defines all the parameters for reproduction tempo, tone, and scale which are required to play music, as in MIDI (Musical Instrumental Digital Interface). The method for playing music using MIDI data is a known technique with which a large number of systems have been commercialized, so its description is omitted.

The score playing means 101 updates the currently reproduced score position in real time. According to this embodiment, the score position is identified by the number of beats counted from the beginning of the score. Any identifying method, however, can be used as long as the score position can be uniquely identified. The score position of the currently played tone is identified by determining the ordinal number relative to the beginning of the score, of the beat corresponding to that tone. Furthermore, the tempo information on which the reproduction according to this invention is based is defined by a beat unit time (hereafter defined as a "tempo time"). The tempo information may be any information as long as it controls the reproduction tempo.

A synchronizing-information table 102 associates a beat ID as a score position, tempo time as tempo information, and time at which the information was updated (hereafter defined as "synchronizing-information update time") to temporarily store them.

A synchronizing-information update means 103 allows the beat ID, tempo time, and update time by the score reproducing means 101 to be stored in the synchronizing-information table 102.

A score position calculating means 104 calculates the score position corresponding to the current time based on the current time and the synchronizing information in the synchronizing-information table 102. The score position is calculated by the following equation.

$$H(tc) = Ht + ((tc - t)/Pt) \quad (A)$$

$H(tc)$: Score position corresponding to the current time (beat ID)

$tc$: Current time $Ht$: Beat ID in the synchronizing-information table 102

$t$: Synchronizing-information update time in the synchronizing-information table 102

$Pt$: Tempo time in the synchronizing-information table

A frame output means 106 outputs frame data synchronized with score data being reproduced by the score reproducing means 101, based on a score position calculated by the score position calculating means 104, from CG data associated with the score data to a frame buffer 105 in which the frame data is temporarily stored.

The CG data need not necessarily be associated with the score position on a one-to-one basis. With only a plurality of key frame data, the frame interpolation technique can be used to calculate frame data corresponding to the score position. There are many known frame interpolation techniques including the spline interpolation and linear interpolation, so their description is omitted. Such a frame interpolation technique can be used to calculate frame data at a frame time Ft, (start time $\leq$ Ft $\leq$ end time) of any frame, from CG data defined by start and end times and key frame data.

Thus, the CG data associated with the reproduction data is generated by associating the start and end times with score positions (the associated score positions are hereafter referred to as a "start beat ID" and an "end beat ID"). With CG associated in this manner, the frame time Ft can be calculated using Equation (B).

$$Ft = Hs + ((H(tc) - Hs)/(He - Hs)) \quad (B)$$

$H(tc)$: Score position (beat ID) corresponding to the current time calculated by the score position calculating means 104

$Hs$: Start beat ID associated with start time $He$: End beat ID associated with end time Based on the forward position of the frame calculated in this manner, the frame data synchronized with reproduction by the score reproducing means 101 using the frame interpolation technique can always be output to the frame buffer 105.

An image display means 107 displays animations by sequentially displaying and updating frame data stored in the frame buffer 105.

FIG. 20 shows a specific flowchart of an AV synchronous reproduction apparatus configured in the above manner.

The AV synchronous reproduction apparatus repeats the above operation from start beat ID to end beat ID which are associated with the CG data. The processing for reproducing the data while synchronizing it with the start beat ID (Hs) and end beat ID (He) is explained below.

At step S101, the score position calculating means 104 calculates a score position (H(t)) corresponding to the current time (t) using Equation (A).

At step S102, if the score position (H(t)) does not exceed the start beat ID (Hs), the process is ended without performing nothing, and otherwise, the process proceeds to step S103.

At step S103, if the score position (H(t)) exceeds the end beat ID (He), the process is ended without performing nothing, and otherwise, the process proceeds to step S104.

At step S104, based on the frame time Ft calculated based on Equation (B), the frame output means 106 uses the frame interpolation technique to calculate frame data and then outputs it to the frame buffer 105.

(Embodiment 7)

Figure 21:
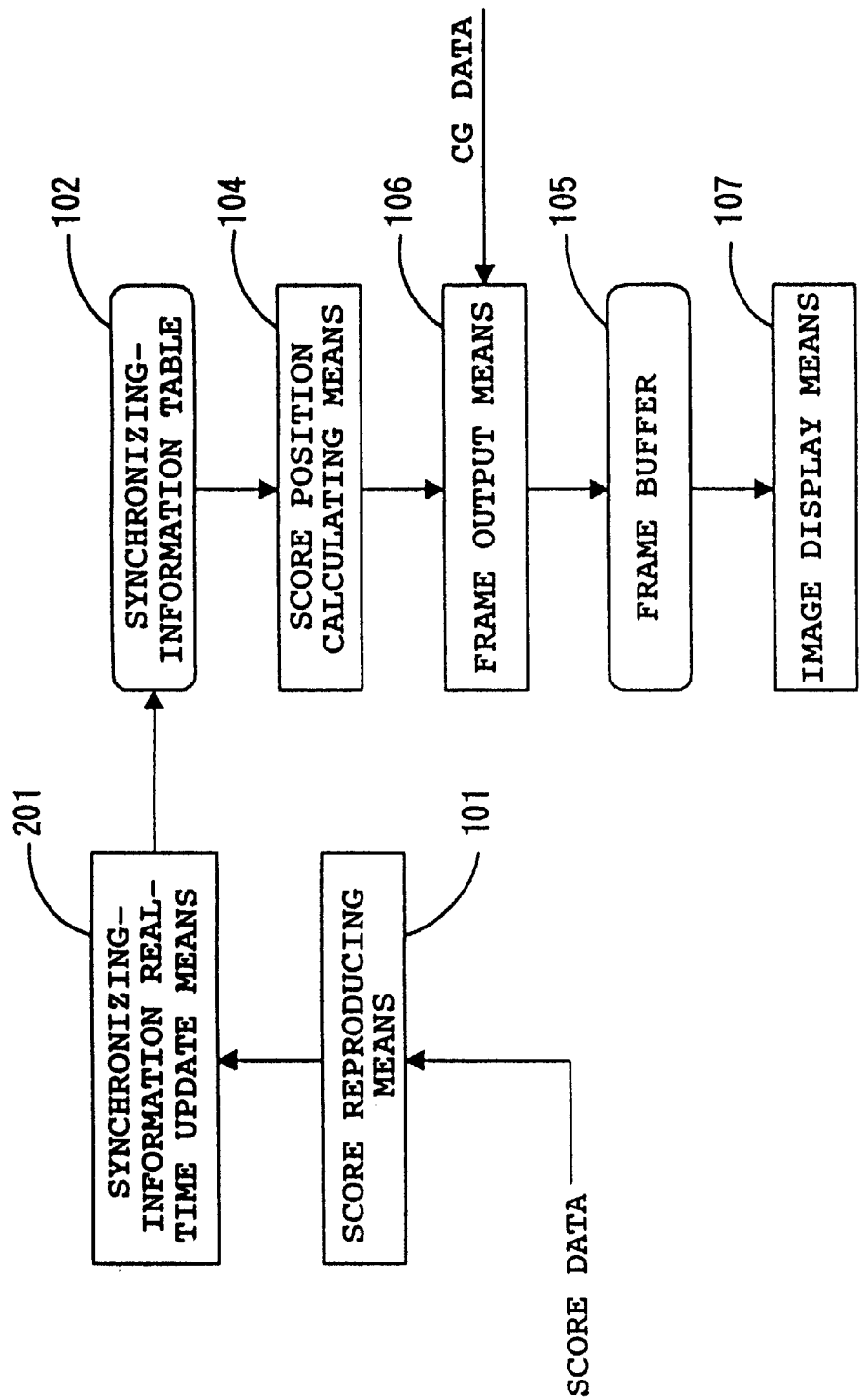
FIG. 21 is a block diagram of Embodiment 7.

FIG. 21 shows Embodiment 7. The components of this embodiment are the same as those of Embodiment 6 except a synchronizing-information real-time update means 201 is provided instead of the synchronizing-information update means 103 according to Embodiment 6 shown in FIG. 19.

The synchronizing-information real-time update means 201 updates the synchronizing information in the synchronizing-information table 102 only if the score reproducing means 101 updates data. For example, this occurs only if the tempo information or score position is changed. Thus, no update is executed unless the tempo information or score position is updated.

(Embodiment 8)

Figure 22:
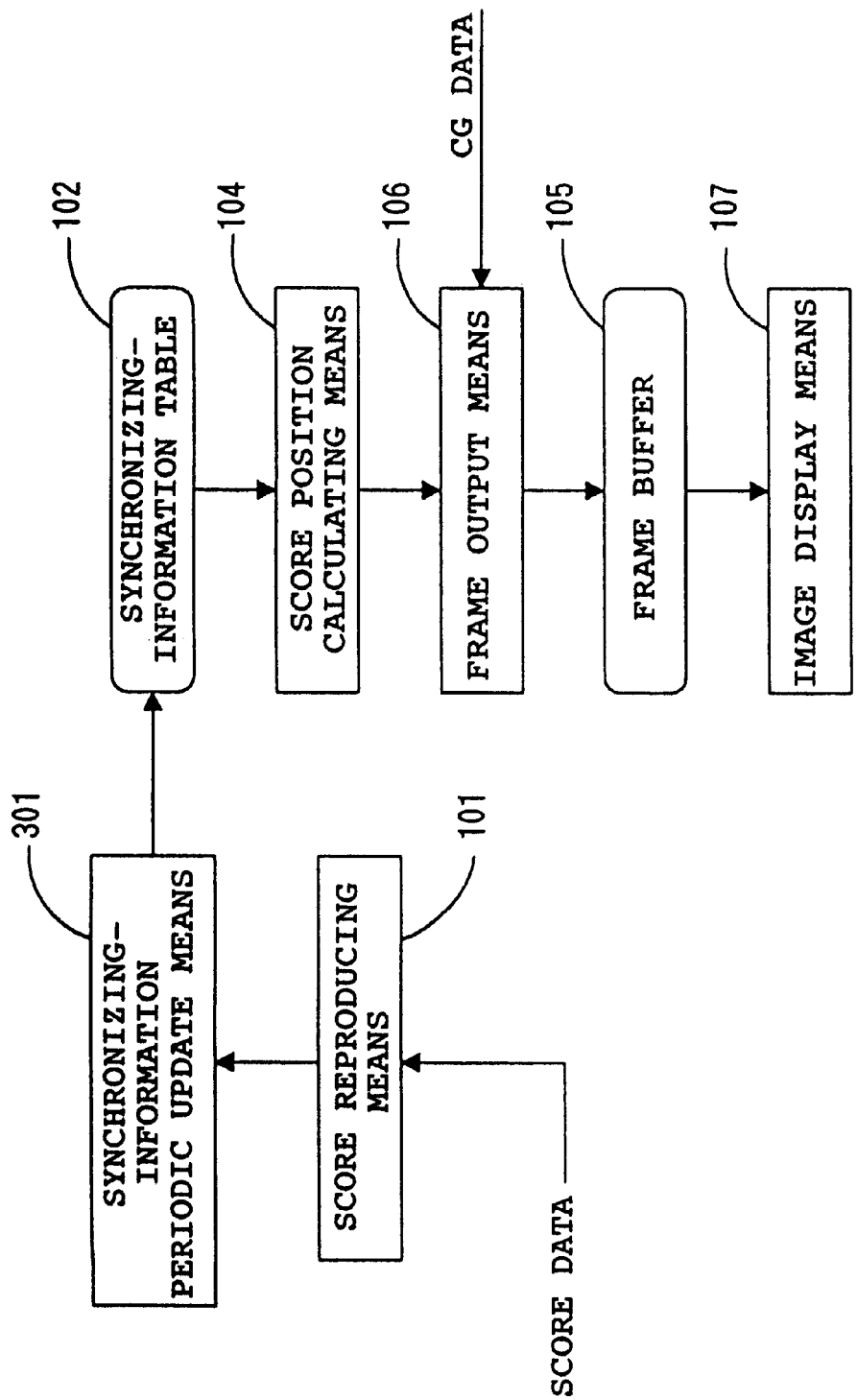
FIG. 22 is a block diagram of Embodiment 8.

FIG. 22 shows Embodiment 8. The components of this embodiment are the same as those of Embodiment 6 except that a synchronizing-information periodic-update means 301 is provided instead of the synchronizing-information update means 103 according to Embodiment 6 shown in FIG. 19.

The synchronizing-information periodic-update means 301 updates the synchronizing-information table 102 at a constant interval. The interval may be a score unit such as once a beat or a general unit such as every thirtieth-second.

(Embodiment 9)

Figure 23:
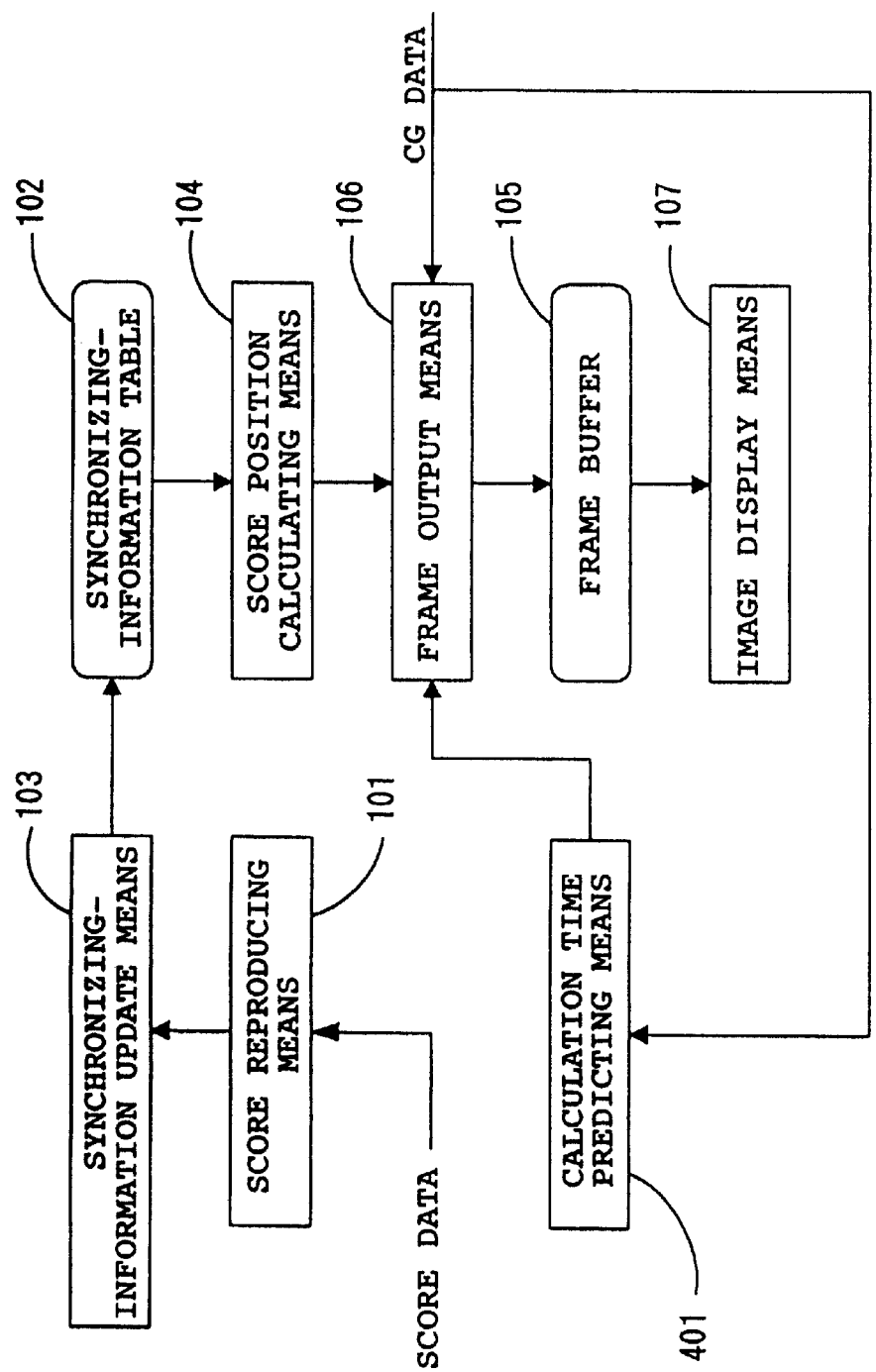
FIG. 23 is a block diagram of Embodiment 9.

FIG. 23 shows Embodiment 9. This embodiment comprises Embodiment 6 shown in FIG. 19 to which a calculation time predicting means 401 is added. The other components of this embodiment are the same as those of Embodiment 6.

The calculation time predicting means 401 predicts the time required for calculation, based on the numbers of polygons and vertexes in CG data. In general, the calculation time is proportional to the number of polygons or vertexes for calculation. The calculation time is always predicted from the number of next polygons or vertexes to calculate. Furthermore, the calculation time predicting means 401 carries out prediction taking into consideration the processing capability of the computer, that is, the CPU. Thus, if different frames have different numbers of polygons, the calculation time can be predicted depending on these numbers.

The frame output means 106 outputs to the frame buffer 105 frame data synchronized with a score position obtained by adding the calculation time predicted by the calculation time predicting means 401 to the score position calculated by the score position calculating means 104. The frame time is calculated using the following equation (C).

$$Ft=Hs+((H(tc)-Hs)/(He-Hs))+(Et/Pt) \qquad (C)$$

H(tc): Score position (beat ID) corresponding to the current time calculated by the score position calculating means 104

Hs: Start beat ID associated with the start time

He: End beat ID associated with the end time

Et: Calculation time predicted by the calculation time predicting means 401

Pt: Tempo time in the synchronizing-information table 102

Based on the frame time calculated as described above, the frame data thized with reproduction by the reproducing means 101 using the frame interpolation technique can always be output to the frame buffer 105.

(Embodiment 10)

Figure 24:
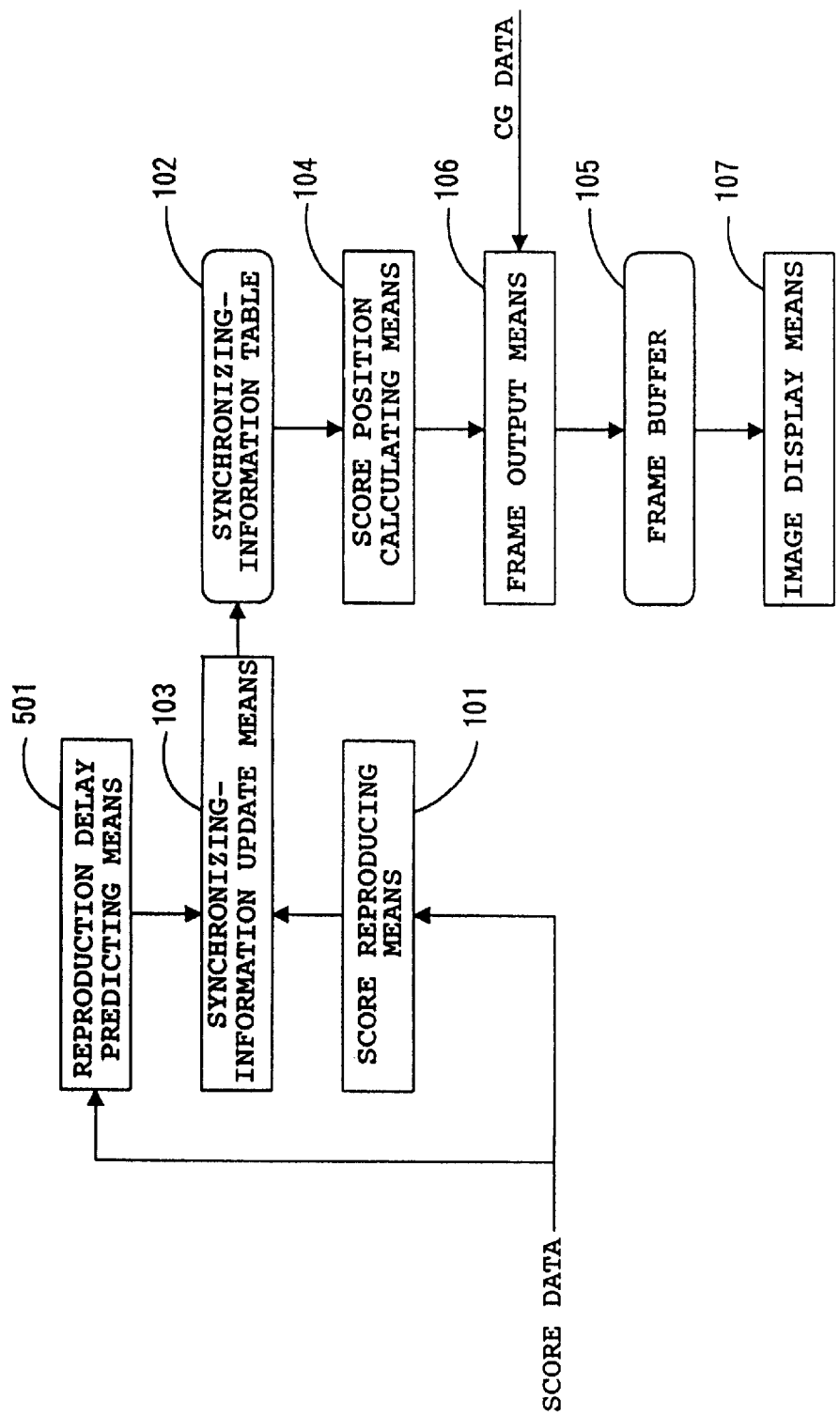
FIG. 24 is a block diagram of Embodiment 10.

FIG. 24 shows Embodiment 10. This embodiment comprises Embodiment 6 shown in FIG. 19 to which a reproduction delay predicting means 501 is added. The other components of this embodiment are the same as those of Embodiment 6.

Based on score data, the reproduction delay predicting means 501 predicts the reproduction delay time required before the score data can be actually output from an output apparatus such as a speaker. In general, the reproduction delay time is proportional to the number of sounds simultaneously generated at the score position. Furthermore, the processing capability of the computer, that is, the CPU is taken into consideration in carrying out prediction. Thus, by identifying a score position, the reproduction delay time at that score position can be predicted from the score data in real time.

The synchronizing-information update means 103 outputs to the synchronizing-information table 102 a value obtained by adding to the score position the reproduction delay time predicted by the reproduction delay predicting means 501.

(Embodiment 11)

Figure 25:
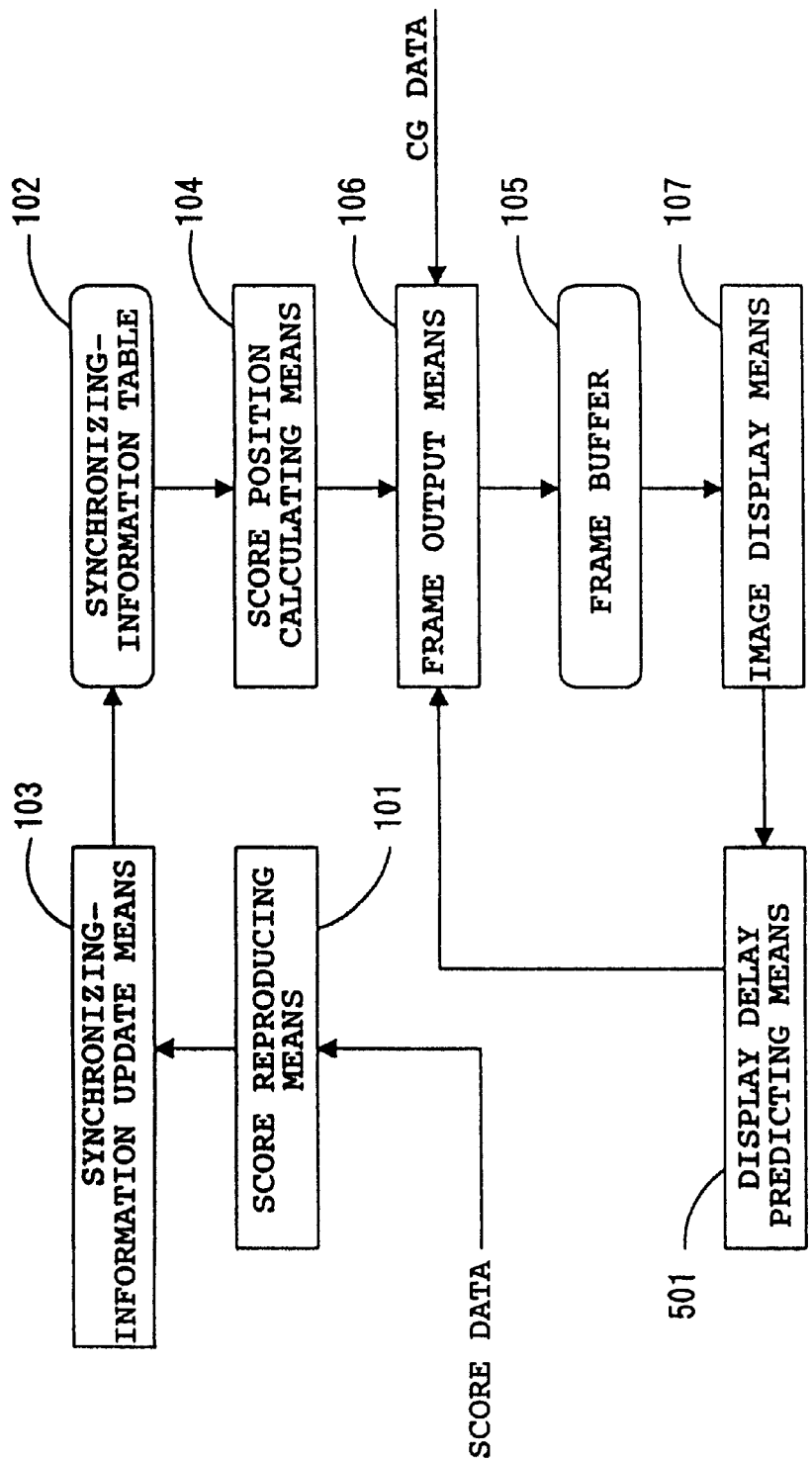
FIG. 25 is a block diagram of Embodiment 11.

FIG. 25 shows Embodiment 11. This embodiment comprises Embodiment 6 shown in FIG. 19 to which a display delay predicting means 501 is added. The other components of this embodiment are the same as those of Embodiment 6.

The display delay predicting means 501 predicts the display delay time required before the image display means 107 can actually display data from the frame buffer 105. This value can be predicted from the performance of the image display means 107 including its rendering capability.

The frame output means 106 calculates frame data corresponding to a value obtained by adding the display delay time predicted by the display delay predicting means 501 to the score position calculated by the score position calculating means 104. The value of the frame time is calculated using Equation (D).

$$Ft=Hs+((H(tc)-Hs)/(He-Hs))+(Dt/Pt) \qquad (D)$$

H(tc): Score position (beat ID) corresponding to the current time calculated by the score position calculating means 104

Hs: Start beat ID associated with the start time

He: End beat ID associated with the end time

Dt: Display delay time predicted by the display delay predicting means 601

Pt: Tempo time in the synchronizing-information table 102

Based on the frame time calculated as described above, the frame data synchronized with reproduction by the reproducing means 101 using the frame interpolation technique can always be output to the frame buffer 105.

(Embodiment 12)

Figure 26:
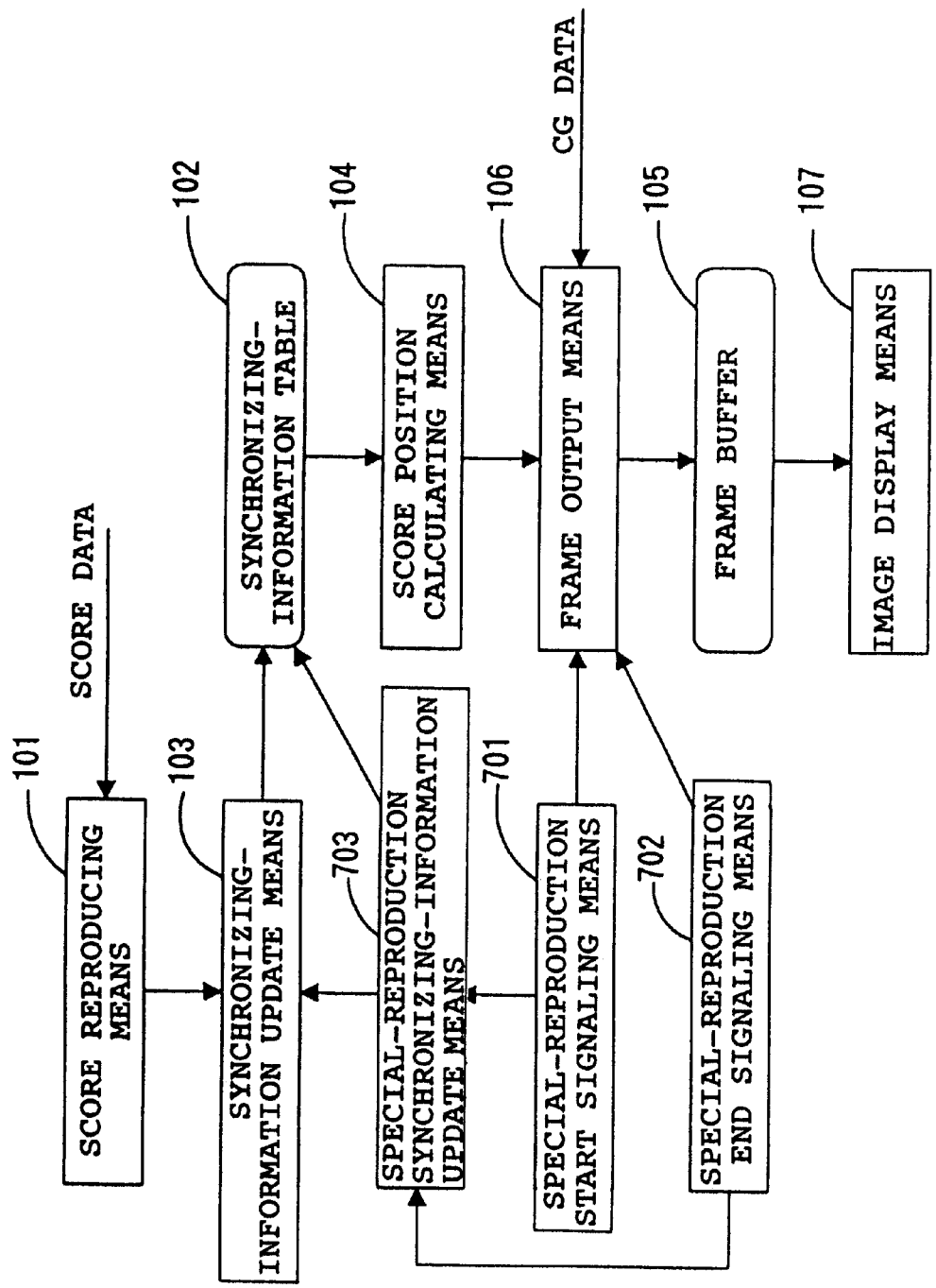
FIG. 26 is a block diagram of Embodiment 12.

FIG. 26 shows Embodiment 12. This embodiment comprises Embodiment 6 shown in FIG. 19 to which a special-reproduction start signaling means 701 and a special-reproduction end signaling means 702, and special-reproduction synchronizing-information update means 703 are added. The other components of this embodiment are the same as those of Embodiment 6.

When an operator starts special reproduction, the special-reproduction start signaling means 701 generates a special-reproduction start signal. If the operator ends the special reproduction, the special-reproduction end signaling means 702 generates a special-reproduction end signal.

During the special reproduction from the generation of the special-reproduction start signal by the special-reproduction start signaling means 701 until the generation of the special-reproduction end signal by the special-reproduction end signaling means 702, the special-reproduction synchronizing-information update means 703 updates the score position and tempo time in the synchronizing-information table 102 depending on the type of special reproduction. For example, in the case of double-speed reproduction, the normal tempo time is reduced to half to increase the speed to forward the beat IDs by twice.

(Embodiment 13)

FIGS. 27 to 32 show Embodiment 13.

In the following description, for example, three-dimensional CG graphic images that are drawn by means of the computer graphics function (hereafter referred to as "CG") are called "CG characters".

Figure 27:
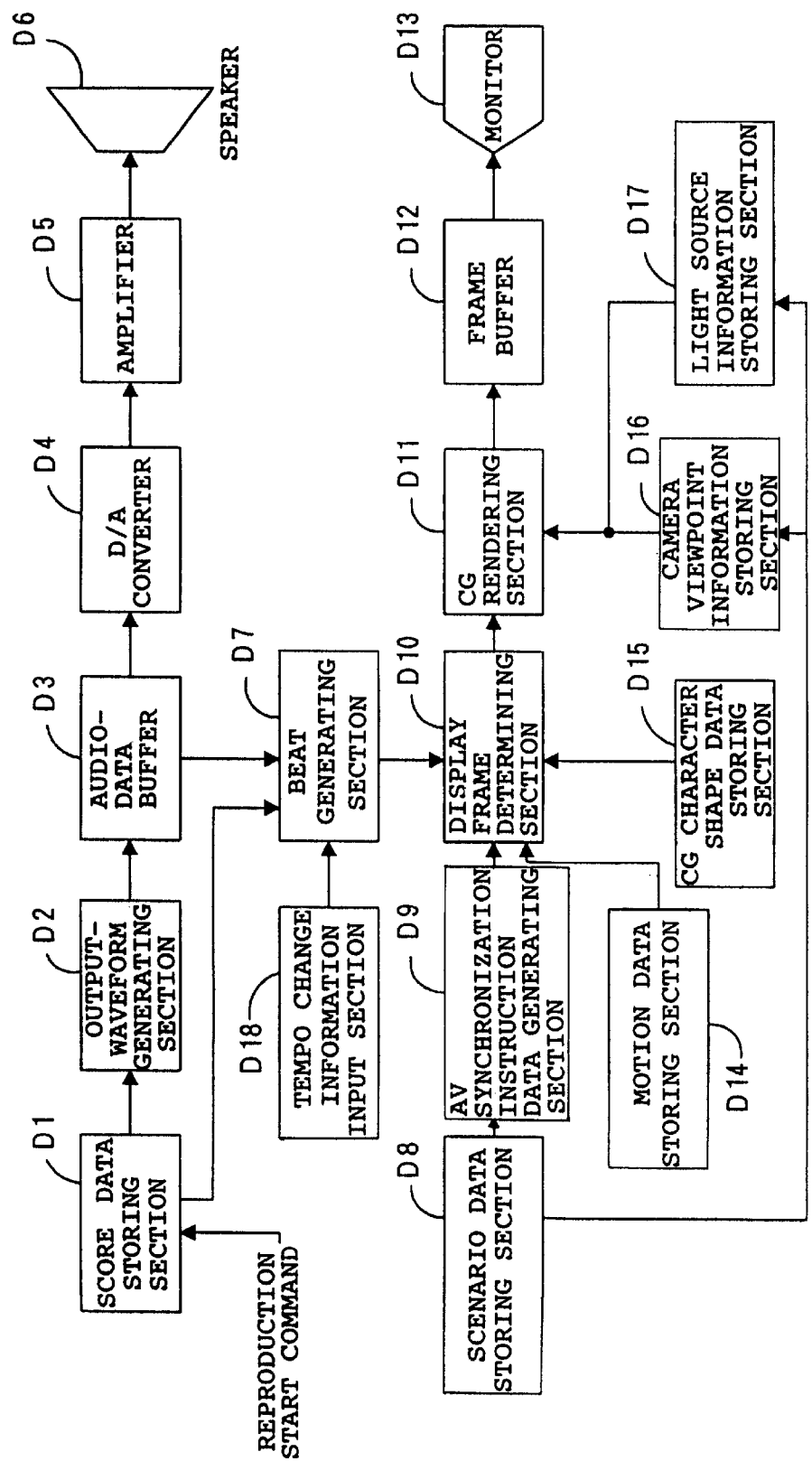
FIG. 27 is a block diagram of Embodiment 13.

The AV synchronous reproduction apparatus shown in FIG. 27 comprises a score data storing section D1 for receiving a reproduction start command from a user or an operator and storing score data; an output waveform generating section D2 for generating wave data on reproduced sound based on the score data output from the score data storing section D1; and an audio-data buffer D3 that temporarily stores a specified amount of wave data from the output-waveform generating section D2. Furthermore, the AV synchronous reproduction apparatus includes a D/A converter D4 that converts wave data from the audio-data buffer D3 into an analog audio signal; an amplifier D5 that amplifies the audio signal from the D/A converter D4; and a speaker D6 that reproduces the amplified audio signal from the amplifier D5 to generate sounds.

The score data storing section D1 is composed of a rewritable recording medium, for example, a RAM, and a CD-ROM, a DVD, or a similar recording medium, or a communication line is used to obtain score data on a desired score before the reproduction start command is input. The score data is the same as in Embodiment 6, so its description is omitted. The audio-data buffer D3 stores a specified amount of wave data to prevent reproduction by the speaker D6 from being discontinued.

In addition, a beat generating section D7 is connected to the score data storing section D1 to output a synchronizing message. Based on the tempo information contained in the score data from the score data storing section D1, the beat generating section D7 generates a synchronizing message consisting of the current score reproducing position (beat ID) and tempo time Temp(i) (see FIG. 29) each time a beat of a particular note, for example, a quarter note is reproduced.

The beat ID and tempo time are the same as in Embodiment 6, so their description is omitted.

The audio-data buffer D3 is connected to the beat generating section D7 so that each time wave data is output to the D/A converter D4 from the audio-data buffer D3, the output timing is communicated to the beat generating section D7 from the audio-data buffer D3. The audio generating section D7 is informed that wave data has been output at a cycle of, for example, 44.1 KHz.

This configuration allows the timing of the output from the audio-data buffer D3 to function as an 44.1-KHz internal clock for the beat generating section D7.

Furthermore, the AV synchronous reproduction apparatus has as devices for reproducing CG characters, a scenario data storing section D8 for storing scenario data; an AV synchronization instruction data generating section D9 connected to the scenario data generating section D8 to generate AV synchronization instruction data; the beat generating section D7; a display frame determining section D10 connected to the AV synchronization instruction data generating section D9; a CG rendering section D11; a frame buffer D12; and a monitor D13.

The display frame determining section D10 has connected thereto a data storing section D14 for storing motion data indicating CG characters' motions and a CG character shape data storing section D15 for storing CG character shape data indicating the shapes of CG characters.

The CG rendering section D11 has connected thereto a camera viewpoint information storing section D16 and a light source information storing section D17 for storing camera viewpoint information and light source information, respectively, that is used to render displayed CG characters.

The scenario data storing section D8, motion data storing section D14, CG character shape data storing section D15, camera viewpoint information storing section D16, and light source information storing section D17 are each composed of a rewritable recording medium, for example, a RAM. The scenario data storing section D8, motion data storing section D14, and CG character shape data storing section D15 receive and hold scenario data, motion data, and CG character shape data, respectively, using a CD-ROM, a DVD, or a similar recording medium, or a communication line before the reproduction start command is input.

The scenario data that is input to the scenario data storing section D8 is instruction data for associating and time-series-combining a plurality of motion data with score data to generate a series of motions of CG characters.

In addition, the scenario data includes camera viewpoint information and light source information and specifies motion data, CG character shape data, camera viewpoint information, and light source information for each displayed frame. The scenario data also includes camera viewpoint information and light source information.

At the same time when the scenario data is stored in the scenario data storing section D8, the camera viewpoint and light source information is output to and held in the camera viewpoint information storing section D16 and light source information storing section D17.

The camera viewpoint and light source information indicates photographing conditions for a virtual camera and irradiation conditions for a virtual light source, respectively. The camera viewpoint information is composed of the position of the camera, the photographing condition, and data specifying zooming, and the light source information is composed of the position of the light source, the irradiation direction, and data specifying effects.

For each divided motion data in the scenario data, the AV synchronization instruction data generating section D9 generates AV synchronization instruction data that associates the progress of score data with the progress of motion data for a CG character, using as reference one beat of a quarter note (the particular note). That is, the AV synchronization instruction data generating section D9 generates AV synchronization instruction data specifying a displayed frame each time the score progresses by one beat of a quarter note (the particular note).

(Scenario data)

The scenario data and AV synchronization instruction data are specifically described with reference to FIGS. 28(a) and (b).

Figure 28A:
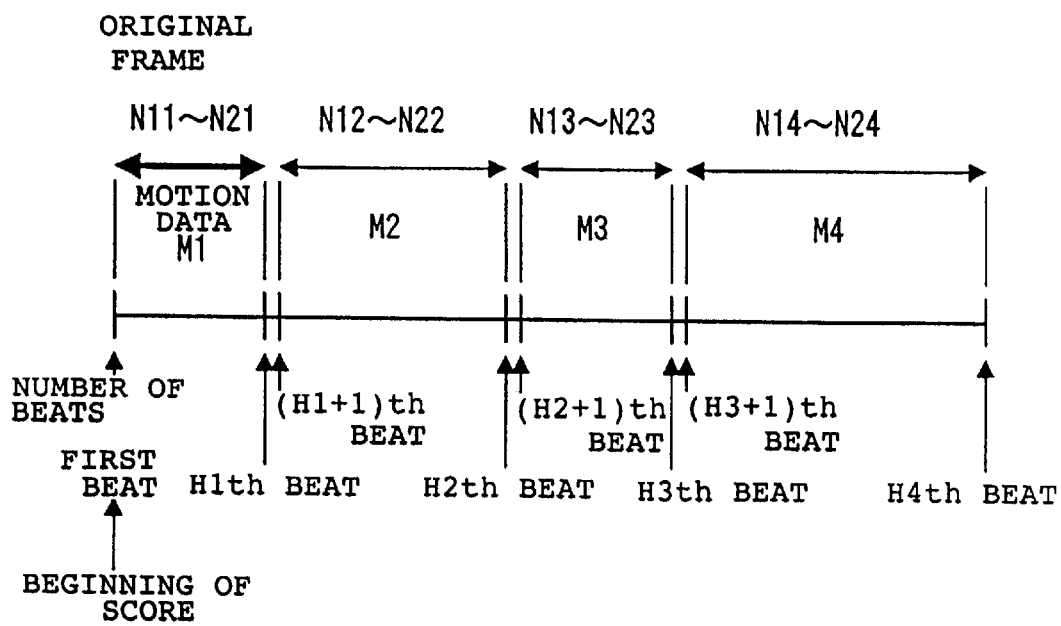
FIGS. 28(a) and 28(b) are explanatory drawings showing the relationship among the number of beats in a score, motion data, scenario data, and AV synchronization instruction data according to Embodiment 13.
Figure 28B:
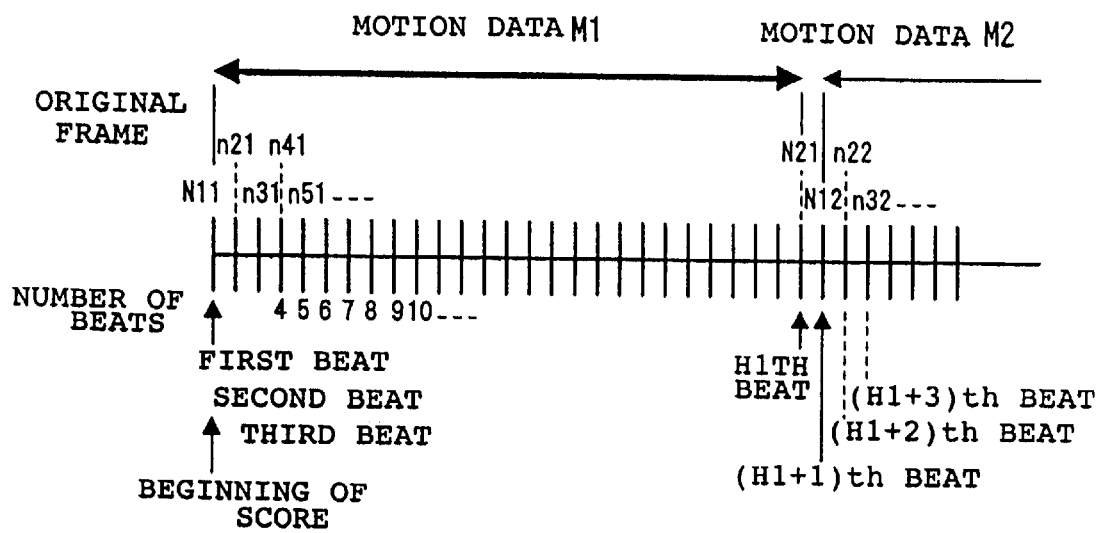

FIG. 28(a) shows the number of score beats and the relationship between motion data and scenario data, in the AV synchronous reproduction apparatus shown in FIG. 27, and FIG. 28(b) shows the number of score beats and the relationship between motion data and scenario data and AV synchronization instruction data, in the AV synchronous reproduction apparatus shown in FIG. 27.

In FIGS. 28(a) and (b), the horizontal axis indicates beat IDs. The particular note may be an arbitrary note but this embodiment uses a quarter note as the particular note used as reference for the number of score beats. FIG. 28(b) shows an enlarged view of the part from the first beat to the H1th beat in FIG. 28(a).

The scenario data associates the number of score beats in the score data stored in the score data storing section D1 with the original frame for the motion data stored in the motion data storing section D14 as shown in (a). For example, the score beat IDs 1 to H1 are associated with motion data M1 through the scenario data. Thus, the N11th original frame is specified for the first beat, and the N21th original frame is specified for the H1th beat. Likewise, the score beat IDs (H1+1) to H2 are associated with motion data M2 through the scenario data. Thus, the N12th original frame is specified for the (H1+1)th beat, and the N22th original frame is specified for the H2th beat. Likewise, the (H2+1)th score beat to the H3th score beat are associated with motion data M3 through the scenario data. Thus, the N13th original frame is specified for the (H2+1)th beat, and the N23th original frame is specified for the H3th beat.

The term "original frame" is used because frames actually displayed on the monitor D13 are determined by the display frame determining section D10 based on these original frames.

By associating motion data with a score as described above, for example, 100 frames of motion data can be forwarded during six or eight beats depending on the score. That is, single motion data can be used to achieve various motion forward speeds to reduce the storage capacity of the motion data storing section D14. Thus, this embodiment is economical.

(AV synchronization instruction data)

The AV synchronization instruction data associates the progress of score data with motion data for a CG character, as described above, and is generated by evenly dividing the original frame assigned to each motion data so that each divided piece of the frame corresponds to each beat of a quarter note (the particular note). By generating AV synchronization instruction data in this manner, the original frame from the beat IDs N11 to N21 assigned to the motion data M1 corresponds to the second, third, fourth, . . . beats in the score data as shown in FIG. 28(b), and is divided into frames n21, n31, n41, . . . that each indicate frame time displayed on the monitor D13.

Since the number of frames specified by the AV synchronization instruction data is not always an integer, some of the frames n21, n31, n41, . . . are not stored in the motion data storing section D14. There is, however, no problem because the frames that are not stored are determined from the frames stored in the motion data storing section D14, during CG character reproduction in the subsequent display frame determining means D10' using a well-known data interpolation method such as spline interpolation.

Likewise, in motion data M2, the original frame is divided into frames n22, n32, n42, . . . that indicate a frame time corresponding to each beat in the score data.

In each frame for a displayed CG character, the display frame determining section D10 shown in FIG. 27 calculates and determines the pose of the CG character in the next frame to display based on AV synchronization instruction data and a synchronizing message. Specifically, when the time interval ΔT during which the frame buffer D12 outputs an image to the monitor D13 that is an image display apparatus, the display frame determining section D10 determines the pose of the CG character that is written to the frame buffer D12, from a tempo time Temp(i) contained in a synchronizing message from the beat generating section D7, the frame time of the motion data for the CG character being written to the frame buffer D12 upon the input of the synchronizing message, the frame time of the motion data for the CG character specified by the AV synchronization instruction data for the timing of the input of the next synchronizing message, and the time interval ΔT.

The specific value of the time interval ΔT is 1/30 seconds if, for example, the monitor D13 displays the CG character 30 times per second.

(Calculation of a CG character's pose)

The specific method executed by the display frame determining section D10 to calculate a CG character's pose is described below.

First, the display frame determining section D10 compares the AV synchronization instruction data with the reproduced position (ith beat) in the score contained in the synchronizing message input from the beat generating section D7 in order to determine the frame time fi of the motion data for the CG character being written to the frame buffer D12 upon the input of the synchronizing message and the frame time Fi+1 specified by the AV synchronization instruction data for the next timing ((i+1)th beat) with which the next synchronizing message will be sent. During the time interval from the ith beat indicated by the tempo time Temp(i) in the input synchronizing message to the (i+1)th beat, the display frame determining section D10 calculates the frame time frame(j) of the CG character that is displayed and forwarded at the time interval of ΔT seconds described above, using the following Equation (1).

$$\text{frame}(j) = fi + (Fi+1 - fi) * (j * \Delta T / \text{Temp}(i)) \quad (1)$$

In Equation (1), (j) is a count value obtained by counting the number of frames written to the frame buffer D12 from the reception of one synchronizing message by the display frame determining section D10 until the reception of the next synchronizing message. That is, the value of (j) is set to zero when a synchronizing message is input, and is incremented each time the frame for the CG character progresses until (Temp(i)/ΔT). In addition, in Equation (1), (i) and Temp(i) are held at the same values until a synchronizing message is input at the next (i+1)th beat, and at this point, they are updated to the values in this synchronizing message.

Next, the display frame determining section D10 calculates and determines the CG character's pose in each displayed frame using a function P (frame time) for the motion data for the CG character that has been obtained by applying spline interpolation to the original frame for the motion data and that uses the frame time frame(j) as a variable.

After determining the CG character's pose, the display frame determining section D10 calculates from the determined pose of the CG character the vertex coordinate data on each polygon for the CG character. Furthermore, the display frame determining section D10 reads the CG character shape data specified by the scenario data, out from the CG character shape data storing section D15 and uses this CG character shape data and the calculated vertex coordinate data to create image data for the CG character. Then, the display frame determining section D10 outputs the created image data to the CG rendering section D11 together with the scenario data. To determine whether the scenario data has been finished, the display frame determining section D10 records the frame time fi sent to the CG rendering section D11.

The CG rendering section D11 renders the CG character in each frame based on the camera viewpoint and light source information contained in the scenario data. That is, based on the image data from the display frame determining section D10, the CG rendering section D11 creates image data for the CG character which is irradiated with light in photographing conditions for a specified camera or irradiation conditions for a specified light source such as a spot light or sunlight. The CG rendering section D11 outputs and writes the image data for the rendered CG character to the frame buffer D12. The frame buffer D12 outputs the image data for the CG character to the monitor D13, which then displays the CG character.

The relationship between the progress of score reproduction and the pose calculation carried out by the display frame determining section D10 for each frame and the rendering executed by the CG rendering section D11 is described with reference to the timing chart in FIG. 29.

Figure 29:
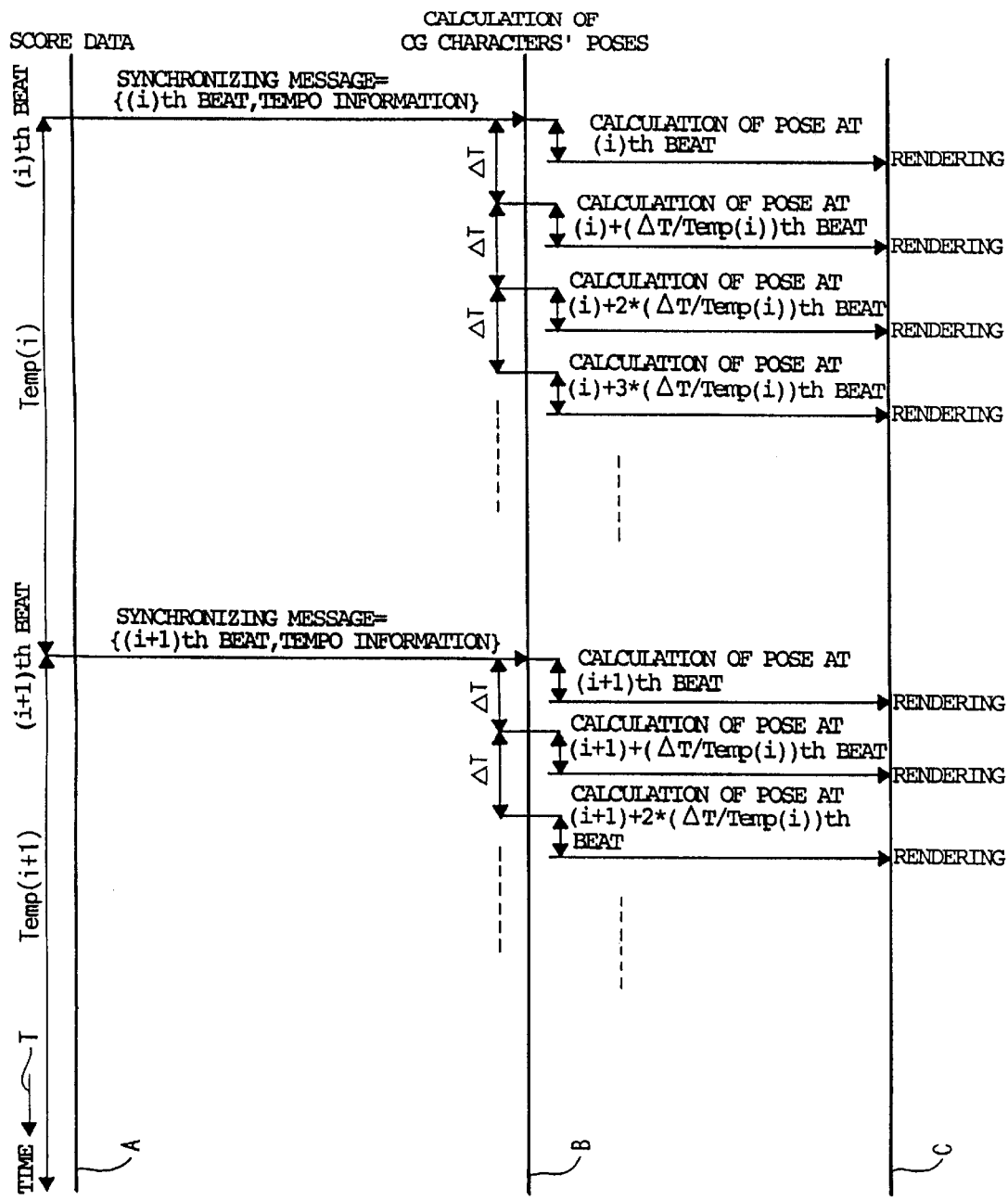
FIG. 29 is a timing chart showing the temporal relationship among score data, the calculation of the pose of a CG character, and rendering processing according to Embodiment 13.

FIG. 29 is a timing chart showing the temporal relationship between the score data and the calculation of the CG character's pose and rendering in the AV synchronous reproduction apparatus shown in FIG. 27. In FIG. 29, arrow "T" indicates the passage of time, and vertical lines "A", "B", and "C" indicate the progress of score reproduction based on the score data, the progress of the calculation of the CG character's pose executed by the display frame determining section D10, and the progress of rendering executed by the CG rendering section D11.

As shown in FIG. 29, when score reproduction based on the score data reaches the (i)th beat from the beginning of the score, as shown in FIG. 29, the beat generating section D7 outputs a synchronizing message to the display frame determining section D10. The synchronizing message includes the (i)th beat that is the current reproduced position in the score and the score tempo time Temp(i), as described above.

The display frame determining section D10 calculates the frame time frame(j) of the CG[]character that is forwarded every ΔT seconds, using the synchronizing message and Equation (1) described above. The display frame determining section D10 uses the function P (frame time) for the motion data to determine the CG character's pose in order to calculate vertex coordinate data for each polygon constituting the CG character. In the figure, the time required to calculate the pose (including the time required to calculate vertex coordinate data) is indicated as the calculation of the pose at the (i)th beat, the calculation of the pose at the (i)+(ΔT/Temp(i))th beat, . . . Subsequently, the display frame determining section D10 instantaneously creates image data based on the calculated vertex coordinate data and the CG character shape data specified in the scenario data.

Each time image data is created, it is output to the CG rendering section D11 from the display frame determining section D10 to start the rendering of the CG character.

(Score reproduction)

First, score reproduction is described with reference to FIG. 30.

Figure 30:
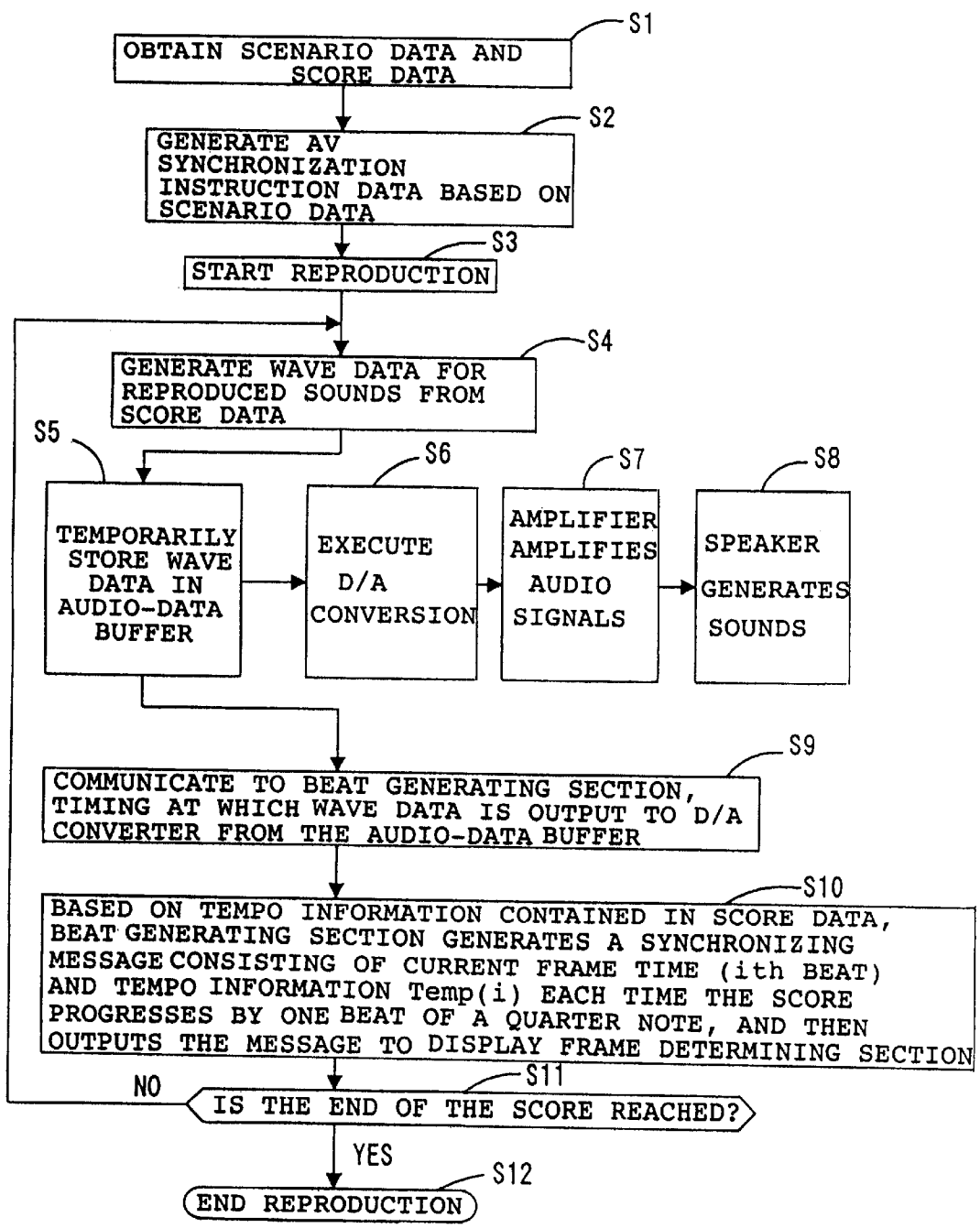
FIG. 30 is a flowchart showing reproduction processing according to Embodiment 13.

FIG. 30 shows a flowchart of score reproduction. Before starting to reproduce a score, the score data storing section D1 and scenario data storing section D8 obtain score data and scenario data through a recording medium or a communication network (step S1).

Subsequently, the AV synchronization instruction data generating section D9 generates AV synchronization instruction data based on the scenario data from the scenario data storing section D8 (step S2).

Figure 31:
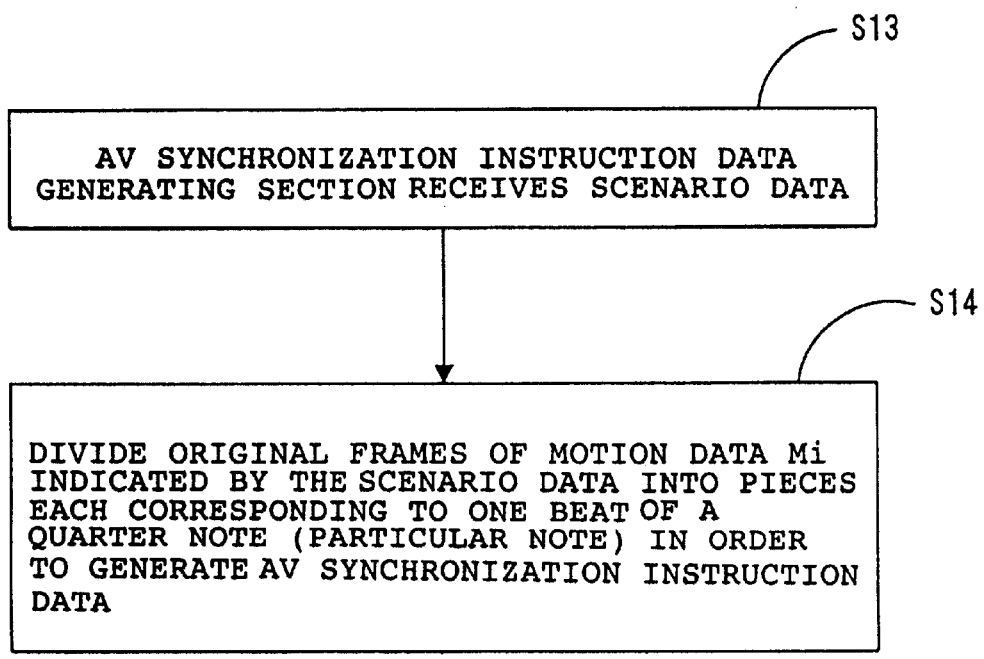
FIG. 31 is a flowchart showing AV synchronization instruction data generation processing according Embodiment 13.

FIG. 31 shows a procedure for creating AV synchronization instruction data in the AV synchronization instruction data generating section D9. As shown in this figure, upon receiving the scenario data from the scenario data storing section D8 (step S13), the AV synchronization instruction data generating section D9 divides the original frame for motion data Mi specified by the scenario data into pieces each corresponding to one beat of a quarter note (the particular note) in order to generate AV synchronization instruction data (step S14).

Returning to FIG. 30, at step S3, upon receiving a reproduction start command, the score data storing section D1 sequentially outputs the stored score data to the output-waveform generating section D2.

The output-waveform generating section D2 generates wave data for reproduced sounds in a digital form based on the score data (step S4) to sequentially output it to the audio-data buffer D3. The audio-data buffer D3 temporarily stores a specified amount of wave data (step S5). Then, the wave data is output to the D/A converter D4 from the audio-data buffer D3.

The D/A converter D4 converts the input wave data into an audio signal in an analog form (step S6). The D/A converter D4 outputs the audio signal to the amplifier D5, which then amplifies the audio signal (step S7). Subsequently, the speaker D6 outputs as reproduction the audio signal from the amplifier D5 (step S8).

Each time the audio-data buffer D3 outputs wave data to the D/A converter D4, it communicates this timing to the beat generating section D7 (step S9).

Subsequently, based on the tempo time contained in the score data, the beat generating section D7 generates a synchronizing message consisting of the current score reproduction position (ith beat) and the tempo time Temp(i) each time the score progresses by one beat of a quarter note. The beat generating section then outputs the message to the display frame determining section D10 (step S10).

Next, the beat generating section D7 determines whether the end of the score is reached (step S11). If not, the process returns to the processing shown in step S4.

Otherwise, the reproduction is finished (step S12).

(Reproduction of a CG character)

Next, the reproduction of the CG character is described with reference to FIG. 32.

Figure 32:
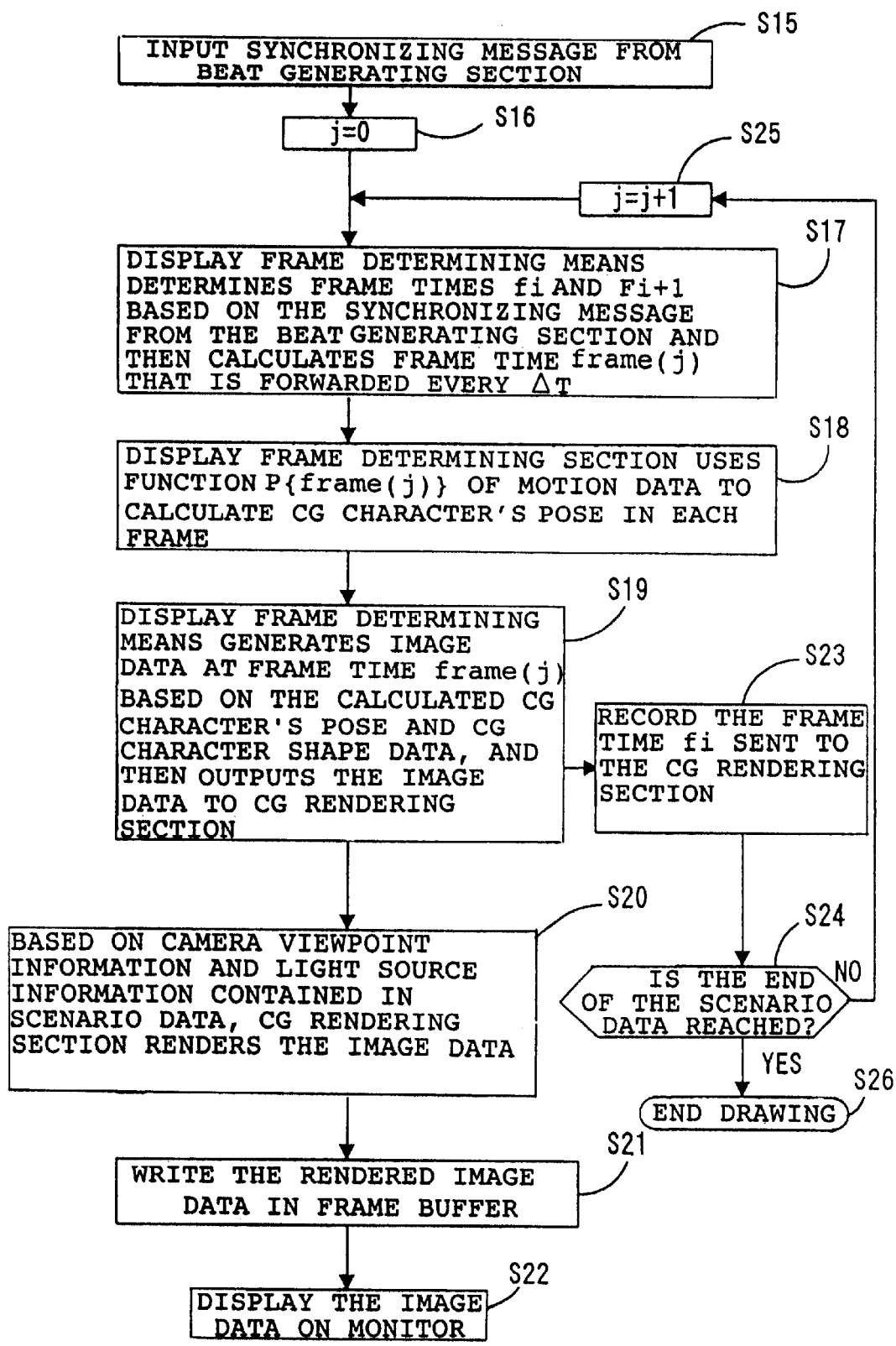
FIG. 32 is a flowchart showing ACG character reproduction processing according to Embodiment 13.

FIG. 32 shows the reproduction of the CG character. Upon receiving a synchronizing message from the beat generating section D7 (step S15), the display frame determining section D10 sets the value of (j) to zero (step S16). As described above, (j) is a count value obtained by counting the number of frames written to the frame buffer D12 from the reception of one synchronizing message by the display frame determining section D10 until the reception of the next synchronizing message.

Subsequently, the display frame determining section D10 compares the AV synchronization instruction data with the reproduced position in the score contained in the synchronizing message input from the beat generating section D7 in order to determine the frame times fi and Fi+1 of the motion data for the CG character at the current point (ith beat) and at the point ((i+1)th beat) at which the next synchronizing message is input. During the time interval from the ith beat indicated by the tempo time Temp(i) in the input synchronizing message to the (i+1)th beat, the display frame determining section D10 calculates the frame time frame(j) of the CG character that is displayed and forwarded at the time interval of $\ddot{A}T$ seconds described above, using Equation (1) described above (step S17).

Next, the display frame determining section D10 calculates the CG character's pose in each displayed frame using the function P (frame time) for the motion data for the CG character that uses the frame time frame(j) as a variable (step S18).

Subsequently, based on the calculated pose of the CG character and the CG character shape data specified by the scenario data, the display frame determining section D10 generates the image data at the frame time frame(j) to output it to the CG rendering section D11 (step S19).

The CG rendering section D11 renders the input image data based on the camera viewpoint and light source information contained in the scenario data (step S20).

Subsequently, the CG rendering section D11 writes the rendered image data to the frame buffer D12 (step S21). The monitor D13 (FIG. 27) displays the image data from the frame buffer D12 (step S22).

In addition, when executing the processing shown in step S19, the display frame determining section D10 records the frame time fi output to the CG rendering section D11 (step S23). Based on the recorded frame time fi, the display frame determining section D10 determines whether the end of the scenario data has been displayed (step S24).

If not, the display frame determining section D10 increments the value of (j) by one (step S25) and then returns to the processing shown in step S17.

Otherwise, the drawing of the CG character is finished (step S26).

(Embodiment 14)

Figure 33:
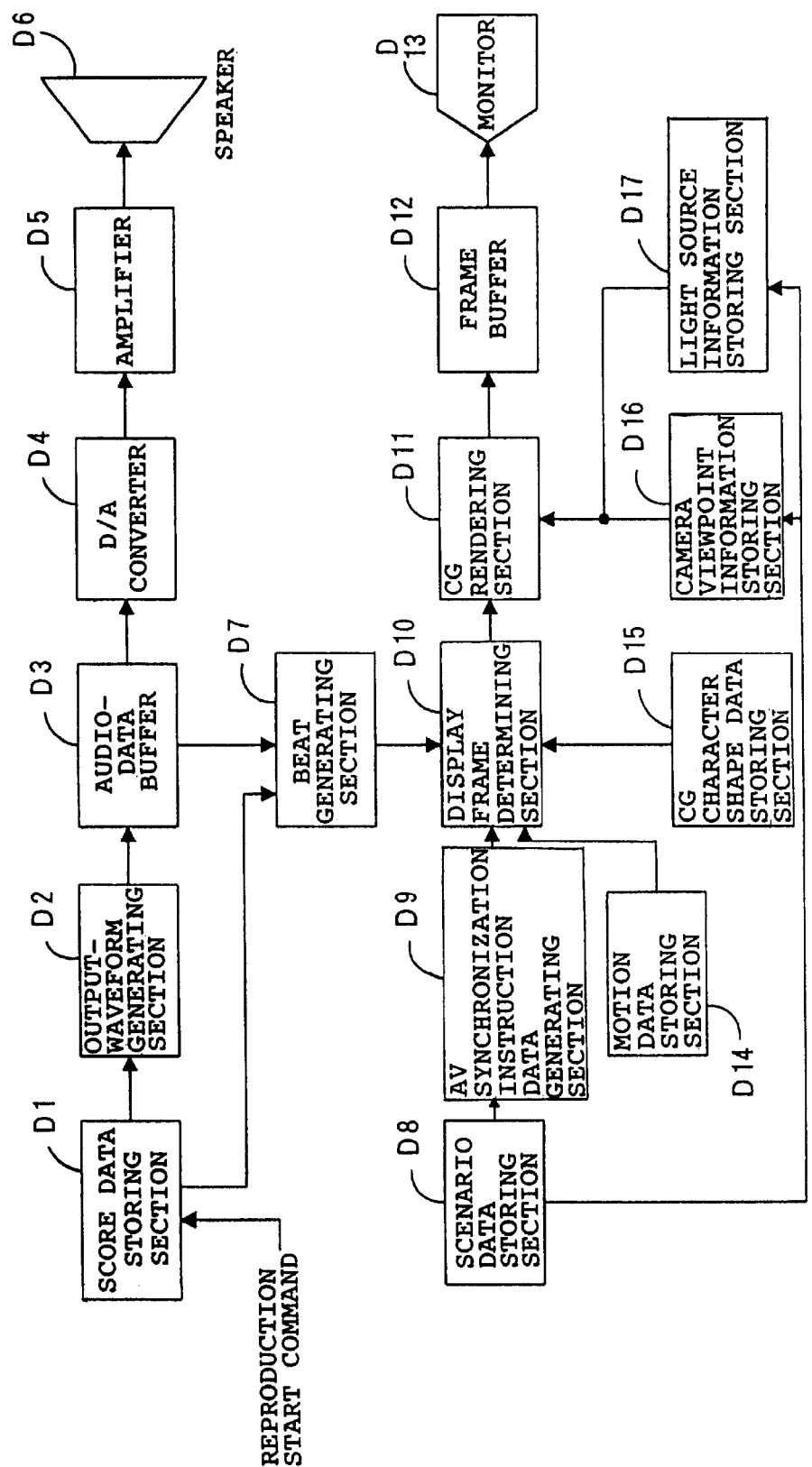
FIG. 33 is a block diagram of Embodiment 14.
Figure 34:
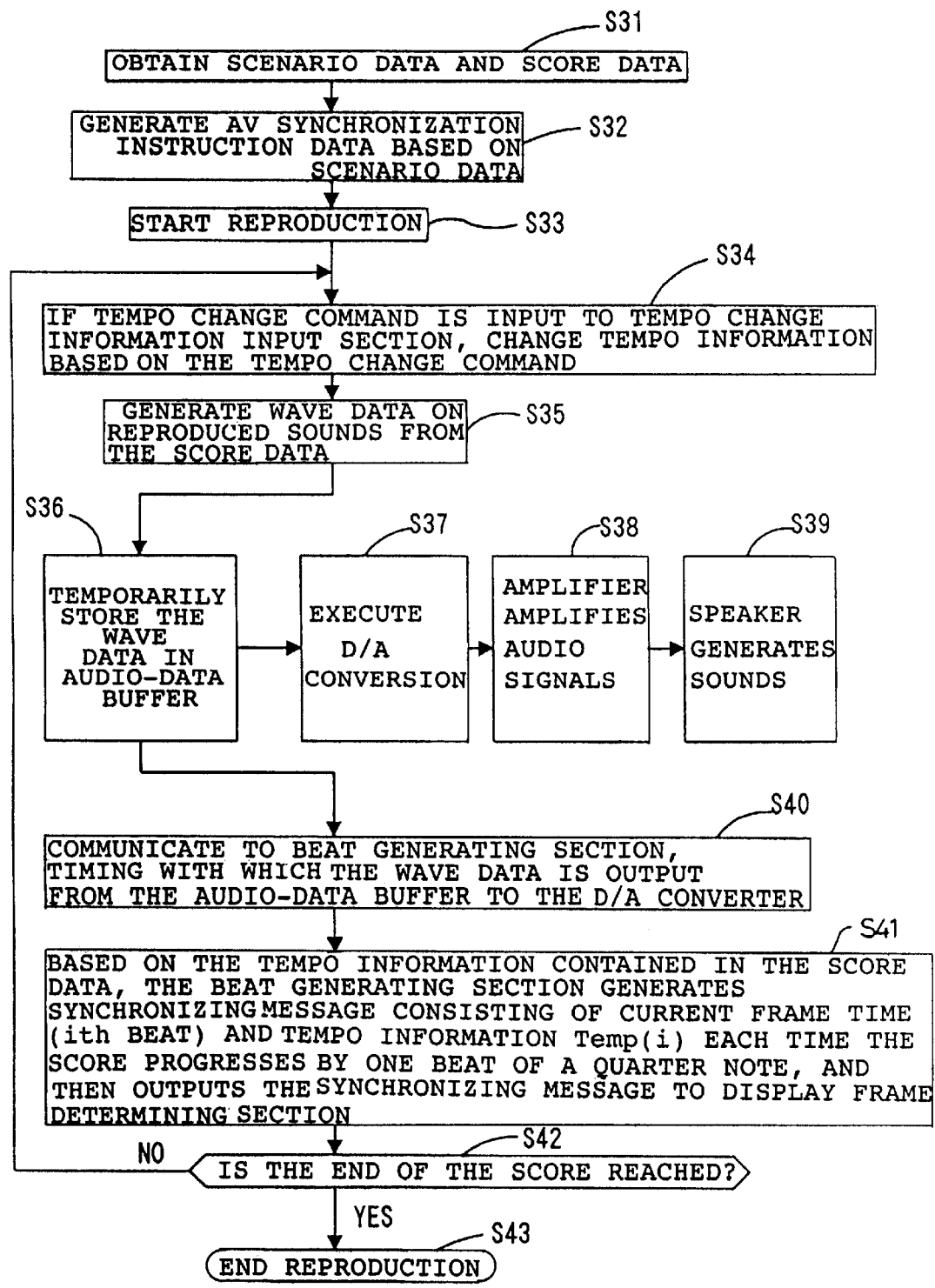
FIG. 34 is a flowchart showing score reproduction processing according Embodiment 14.

FIGS. 33 and 34 show Embodiment 14.

This embodiment comprises Embodiment 13 shown in FIG. 27 to which is added a temp change information input section D18 for inputting a score tempo change command to change the tempo time in a synchronizing message output from the beat generating section. The other components of this embodiment are the same as those of Embodiment 13.

As shown in FIG. 33, the tempo change information input section D18 is connected to the beat generating section D7. If a user or an external apparatus inputs the score tempo change command during the reproduction of a score (ith beat), the tempo change information input section D18 multiplies a proportion constant Cs into the original tempo time Tep(i) contained in the score data stored in the score data storing section D1 to determine new tempo time Temp(i), as shown in the following Equation (2).

New tempo time Temp(i)=original tempo time Temp(i)*Cs (2)

The new tempo time Temp (i) is output to the beat generating section D7 from the tempo change information input section D18 and is used as the tempo time in a synchronizing message output from the beat generating section D7. When obtaining the score data reproduced by the score data storing section D1, the tempo change information input section D18 simultaneously obtains the original tempo time Temp(i) through a recording medium or a communication line.

Next, score reproduction by the AV synchronous reproduction apparatus is explained. The procedure for creating AV synchronization instruction data and the reproduction of CG characters are the same as those of Embodiment 13 shown in FIGS. 31 and 32, so their duplicate description is omitted.

FIG. 34 shows score reproduction by the AV synchronous reproduction apparatus shown in FIG. 33.

First, at step S31, before starting score reproduction, the score data storing section D1 and scenario data storing section D8 obtain score and scenario data through a recording medium or a communication line.

Subsequently, at step S32, the AV synchronization instruction data generating section D9 generates AV synchronization instruction data based on the scenario data from the scenario data storing section D8.

When the score data storing section D1 receives a reproduction start command (step S33), the tempo change information input section D18 checks whether a tempo change command has been input. If so, the tempo change information input section D18 changes the tempo time in a synchronizing message output from the beat generating section D7 based on the input tempo change command (step S34).

The score data storing section D1 sequentially outputs the stored score data to the output-waveform generating section D2. The output-waveform generating section D2 generates wave data for reproduced sounds in a digital form based on the score data (step S35) to sequentially output it to the audio-data buffer D3. The audio-data buffer D3 temporarily stores a specified amount of wave data (step S36). Then, the wave data is output to the D/A converter D4 from the audio-data buffer D3.

The D/A converter D4 converts the input wave data into an audio signal in an analog form (step S37). The D/A converter D4 outputs the audio signal to the amplifier D5, which then amplifies the audio signal (step S38). Subsequently, the speaker D6 outputs as reproduction the audio signal from the amplifier D5 (step S39).

Each time the audio-data buffer D3 outputs wave data to the D/A converter D4, it communicates this timing to the beat generating section D7 (step S40).

Subsequently, based on the tempo time contained in the score data, the beat generating section D7 generates a synchronizing message consisting of the current score reproduction position (ith beat) and the tempo time Temp(i) each time the score progresses by one beat of a quarter note. The beat generating section then outputs the message to the display frame determining section D10 (step S41).

Next, the beat generating section D7 determines whether the end of the score is reached (step S42). If not, the process returns to the processing shown in step S34. Otherwise, the reproduction is finished (step S43).

As described above, in the AV synchronous reproduction apparatus according to Embodiment 14, the display frame determining section can use the frame interpolation method to generate image data on animations synchronized with the score data, and always automatically synchronize the reproduction of animations with the reproduction of a score.

(Embodiment 15)

Figure 35:
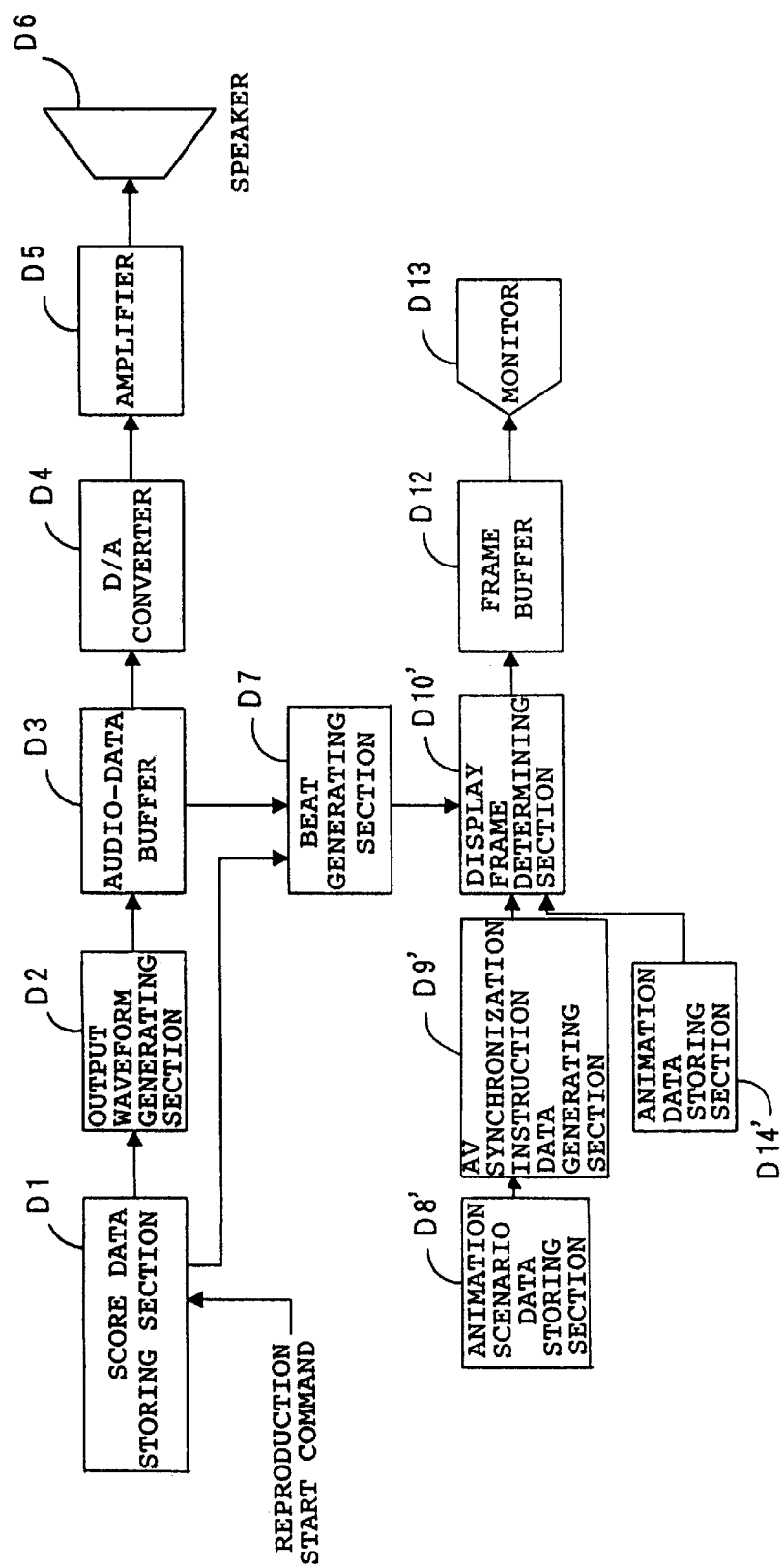
FIG. 35 is a block diagram of Embodiment 15.
Figure 36A:
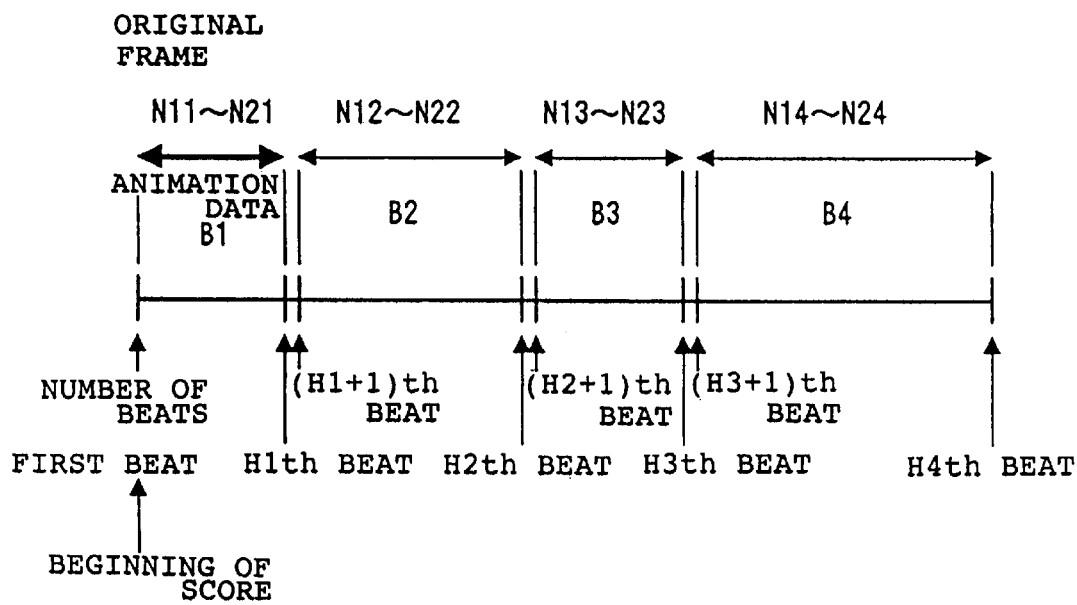
FIGS. 36(a) and 36(b) are explanatory drawings showing the relationship among the number of beats in a score, motion data, scenario data, and AV synchronization instruction data according to Embodiment 15.
Figure 36B:
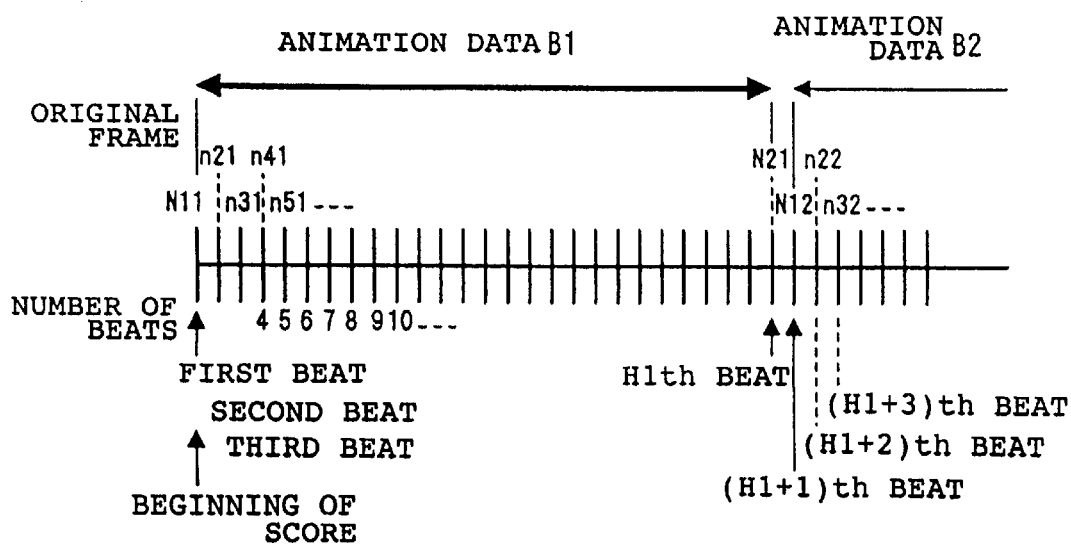
Figure 37:
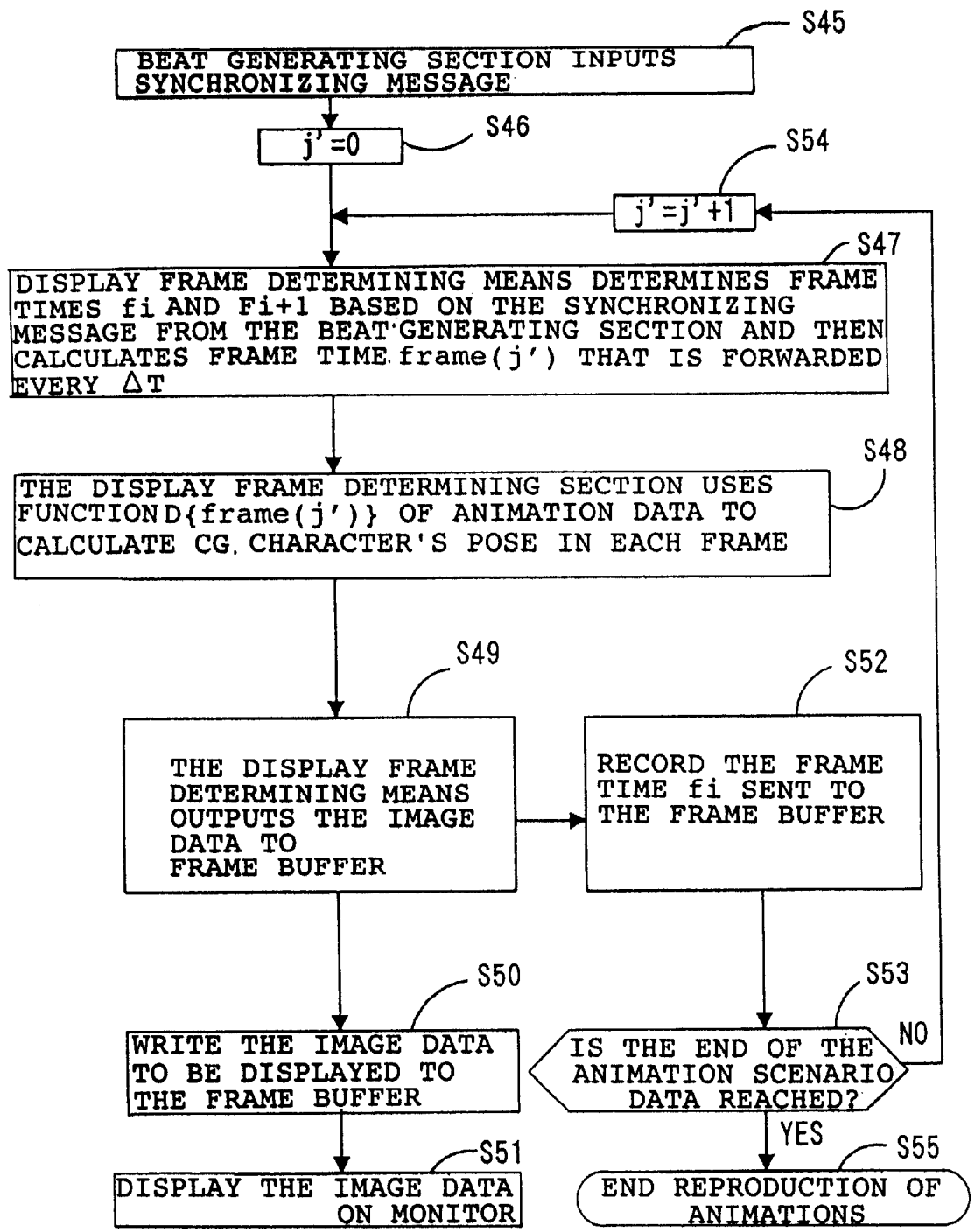
FIG. 37 is a flowchart showing animation reproduction processing according to Embodiment 15.

FIGS. 35 to 37 show an AV synchronous reproduction apparatus according to Embodiment 15.

According to this embodiment, instead of executing the reproduction of the CG character in FIG. 27 showing Embodiment 13, a series of animation data having a variable frame data length is synchronized with the reproduction of a score. The other elements of this embodiment are the same as those of Embodiment 13, so their duplicate description is omitted.

A specific example of such animation data is animation data based on a compression method that is not independent of frames in conformity with the MPEG (Moving Picture Experts Group) standards, or animation data for which the frame does not have a fixed length.

As shown in FIG. 35, apparatuses for reproducing animations include an animation scenario data storing section D8' for storing animation scenario data; an AV synchronization instruction data generating section D9' connected to the animation scenario data storing section D8' for generating AV synchronization instruction data based on the animation scenario data; and a display frame determining section D10' connected to the beat generating section D7 and AV synchronization instruction data generating section D9'. An animation data storing section D14, for storing animation data is connected to the display frame determining section D10'.

In addition, the display frame determining section D10' determines animation data synchronized with score data for each displayed frame based on the animation data and outputs it to the frame buffer D12.

The animation scenario data storing section D8' and animation data storing section D14' are composed of rewritable recording media, for example, RAMs, and receive and hold animation scenario data and animation data through a CD-ROM, a DVD, or a similar recording medium, or a communication line before the reproduction start command is input.

The animation scenario data and AV synchronization instruction data are specifically described with reference to FIGS. 36(a) and (b).

FIG. 36(a) is an explanatory drawing showing the number of score beats and the relationship between animation data and animation scenario data, in the AV synchronous reproduction apparatus shown in FIG. 35. FIG. 36(b) shows the number of score beats and the relationship between animation data and animation scenario data and AV synchronization instruction data, in the AV synchronous reproduction apparatus shown in FIG. 35.

In FIGS. 36(a) and (b), the horizontal axis indicates the number of beats of the particular note counted from the start of score reproduction. FIG. 36(b) shows an enlarged view of the part from the first beat to the H1th beat in FIG. 36(a).

The animation scenario data, as shown in FIG. 36(a), associates the number of score beats in the score data stored in the score data storing section D1 with the original frame for the motion data stored in a motion data storing section D14'. For example, the first to H1th score beats are associated with motion data Bi through the animation scenario data. Thus, the N11th original frame is specified for the first beat, and the N21th original frame is specified for the H1th beat. Likewise, the (H+1)th score beat to the H2th score beat are associated with motion data B2 through the animation scenario data.

Thus, the N12th original frame is specified for the (H1+1)th beat, and the N22th original frame is specified for the H2th beat. Likewise, the (H2+1)th score beat to the H3th score beat are associated with motion data B3 through the animation scenario data. Thus, the N13th original frame is specified for the (H2+1)th beat, and the N23th original frame is specified for the H3th beat.

The term "original frame" is used because frames actually displayed on the monitor D13 are determined by the display frame determining section D10' based on these original frames.

By associating motion data with a score as described above, for example, 100 frames of motion data can be forwarded during six or eight beats depending on the score. That is, single motion data can be used to achieve various motion forward speeds to reduce the storage capacity of the motion data storing section D14'. Thus, this embodiment is economical.

The AV synchronization instruction data associates the score data with the progress of the motion data divided by the animation scenario data, using one beat of a quarter note (the particular note) as reference, and is generated by evenly dividing the original frame assigned to each motion data so that each divided piece of the frame corresponds to each beat of a quarter note (the particular note).

By generating AV synchronization instruction data in this manner, the original frame from Nil to N21 correspond to the second, third, fourth, . . . beats in the score data as shown in FIG. 36(b), and is divided into frames n21, n31, n41, . . . that indicate frame times displayed on the monitor D13.

Since the number of frames specified by the AV synchronization instruction data is not always an integer, some of the frames n21, n31, n41, . . . are not stored in the motion data storing section D14'. There is, however, no problem because the frames that are not stored are determined from the frames stored in the motion data storing section D14', during CG character reproduction in the subsequent display frame determining section D10' using a well-known data interpolation method such as spline interpolation. Likewise, in motion data B2, the original frame is divided into frames n22, n32, n42, . . . that indicate the frame time corresponding to each beat in the score data.

The specific calculation method used by the display frame determining section D10' to calculate from animation data, image data displayed in each frame is described below.

First, the display frame determining section D10' compares the score reproduction position (ith beat) in the synchronizing message with the AV synchronization instruction data to determine the frame time fi of animation data being written to the frame buffer D12 upon the input of the synchronizing message and the frame time Fi+1 specified by the AV synchronization instruction data for the timing ((i+1)th beat) with which the next synchronizing message will be sent.

Furthermore, the display frame determining section D10' uses the following Equation (3) to calculate the frame time frame(j') of animation data displayed and forwarded at the interval of ΔT seconds described above during the time interval between the ith and (i+1)th beats indicated by the score tempo time Temp(i) in the input synchronizing message.

$$\mathrm{frame}(j')=\mathrm{fi}+(\mathrm{Fi}+1-\mathrm{fi})*(j'*\Delta T/\mathrm{Temp}(i)) \quad (3)$$

In Equation (3), (j') is a count value obtained by counting the number of frames written to the frame buffer D12 from the reception of one synchronizing message by the display frame determining section D10' until the reception of the next synchronizing message. That is, the value of (j') is set to zero when a synchronizing message is input, and is incremented each time the frame for the animation data progresses until (Temp(i)/ΔT). In addition, in Equation (1), (i) and Temp(i) are held at the same values until a synchronizing message is input at the next (i+1)th beat, and at this point, they are updated to the values in this synchronizing message.

Next, the display frame determining section D10' calculates and determines the animation data for each displayed frame using a function D (frame time) for the motion data that has been obtained by applying spline interpolation to the original frame for the motion data and that uses the frame time frame(j') as a variable. Then, the display frame determining D10 outputs and writes the created image data to the frame buffer D12. The frame buffer D12 outputs the image data to the monitor D13, which then displays the animations.

To determine whether the animation scenario data has been finished, the display frame determining section D10' records the frame time fi sent to the frame buffer D12.

Next, the reproduction of animations is described with reference to FIG. 37. The score reproduction after the input of the reproduction start command and the generation of a synchronizing message by the beat generating section D7 are the same as in Embodiment 13 shown in FIG. 31, so their description is omitted.

FIG. 37 shows the reproduction of animations by the AV synchronous reproduction apparatus shown in FIG. 35.

In FIG. 37, upon receiving a synchronizing message from the beat generating section D7 (step S45), the display frame determining section D10' sets the value of j' to zero (step S46). As described above, (j') is a count value obtained by counting the number of frames written to the frame buffer D12 from the reception of one synchronizing message by the display frame determining section D10' until the reception of the next synchronizing message.

Subsequently, the display frame determining section D10' compares the AV synchronization instruction data with the score reproduction position in the synchronizing message input by the beat generating section D7 in order to determine the frame times fi and Fi+1 of animation data at the current point (ith beat) and at the point ((i+1)th beat) at which the next synchronizing message will be input. Then, the display frame determining section D10' uses the following Equation (3) to calculate the frame time frame(j') of animation data displayed and forwarded at the interval of ÄT seconds described above during the time interval between the ith and (i+1)th beats indicated by the score tempo time Temp(i) in the input synchronizing message (step S47).

Next, the display frame determining section D10' calculates and determines the animation data for each displayed frame using the function D (frame time) for the motion data that uses the frame time frame(j') as a variable (step 48).

Subsequently, the display frame determining D10' outputs the created image data to the frame buffer D12 (step 49), and the image data for display is written to the frame buffer D12 (step S50). The monitor D13 then displays the image data from the frame buffer D12 (step S51).

In addition, when executing the processing shown in step S49, the display frame determining section D10' records the frame time fi output to the frame buffer D12 (step S52).

Based on the recorded frame time fi, the display frame determining section D10' determines whether the display of the animation scenario data has reached its end (step S53).

If not, the display frame determining section D10' increments the value of j' by one (step S54) to return to the processing shown in step S47. Otherwise, the reproduction of animations is finished (step S55).

As described above, the AV synchronous reproduction apparatus according to claim 15 includes the tempo change information input section for inputting the score tempo change command to change the tempo message in a synchronizing message output from the beat generating section. Thus, even if a user changes the tempo of the score during reproduction, the reproduction of the score can be synchronized with the reproduction of the images.

(Embodiment 16)

Figure 38:
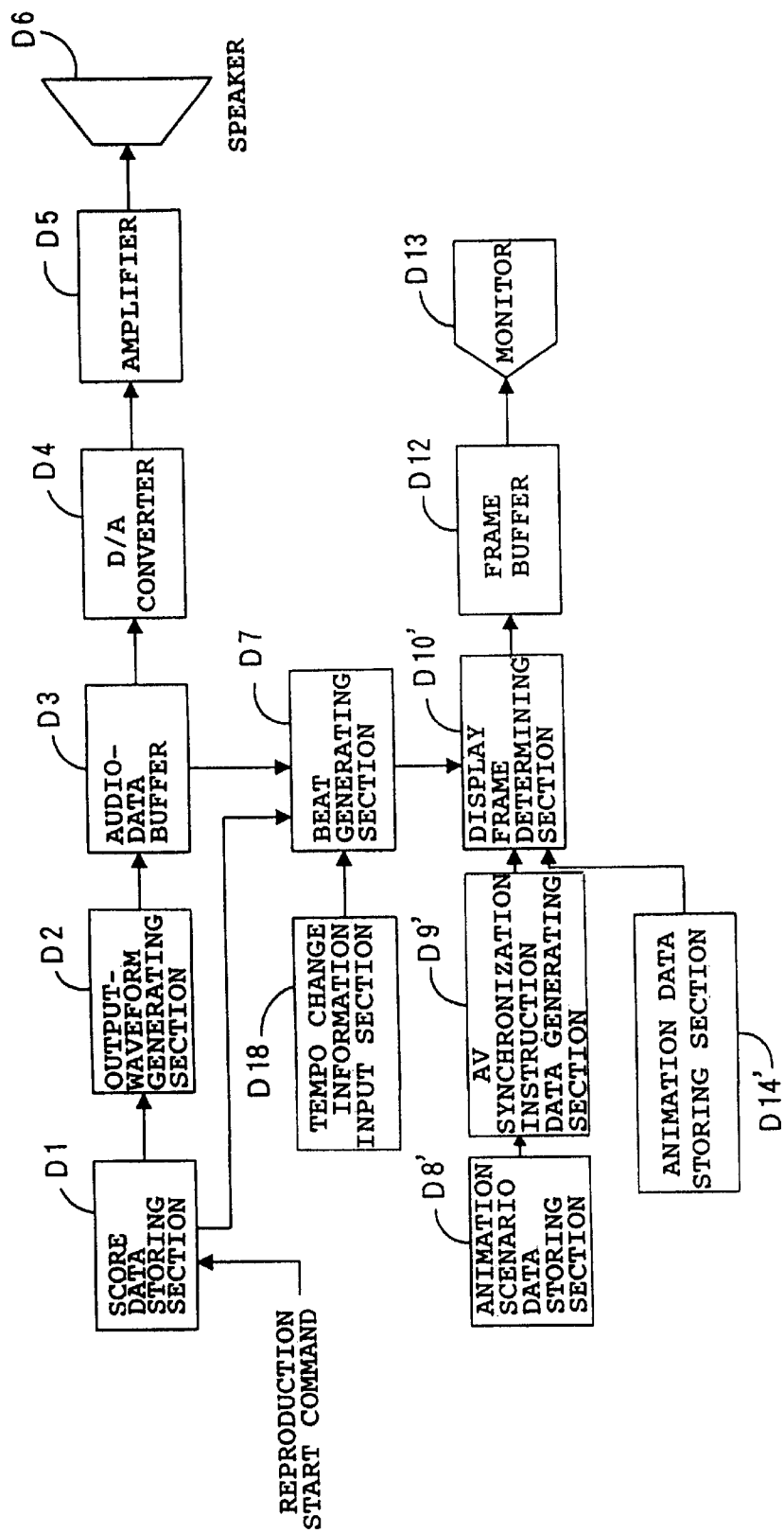
FIG. 38 is a block diagram of Embodiment 16.
Figure 39:
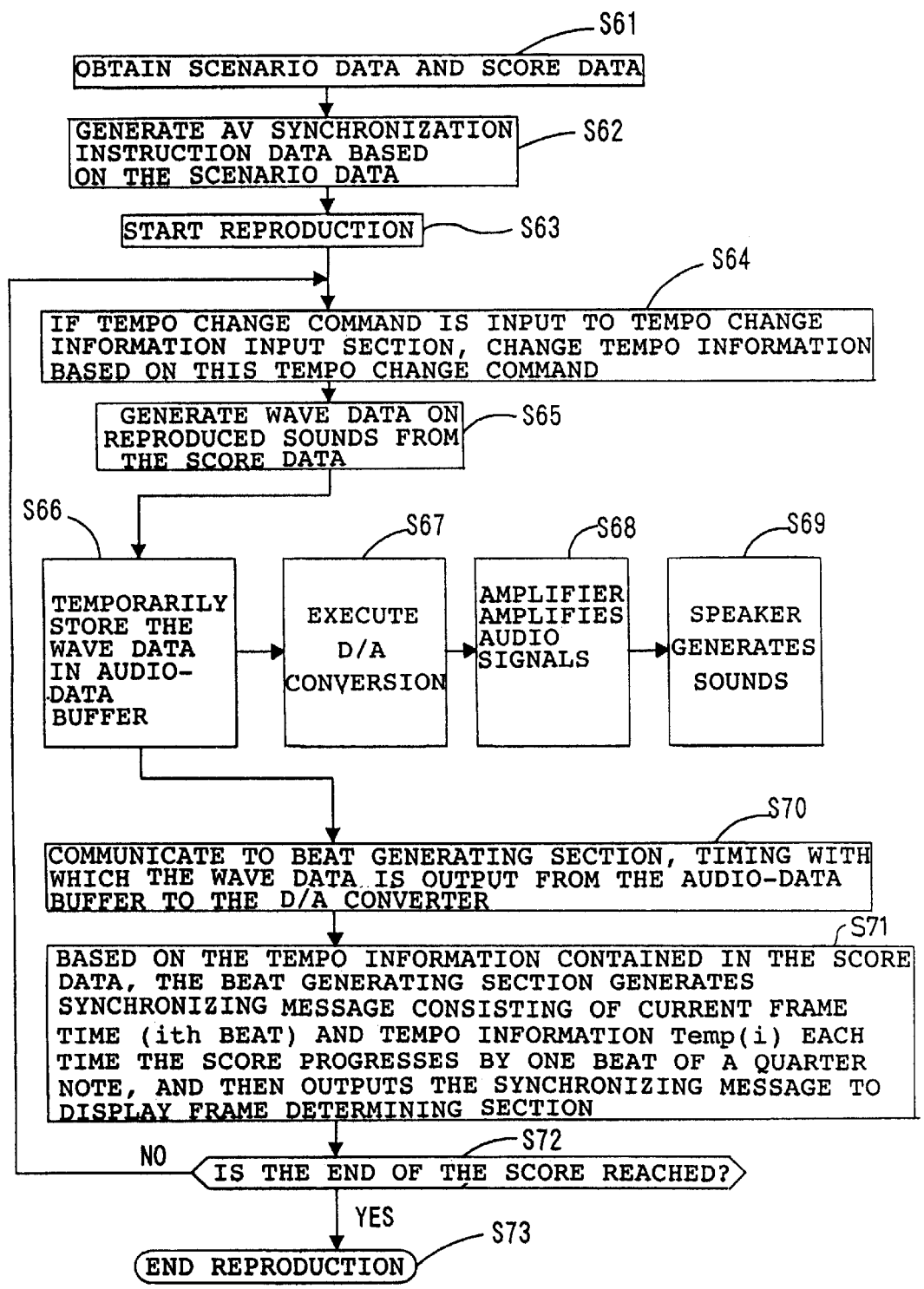
FIG. 39 is a flowchart showing score reproduction processing according to Embodiment 16.
Figure 40:
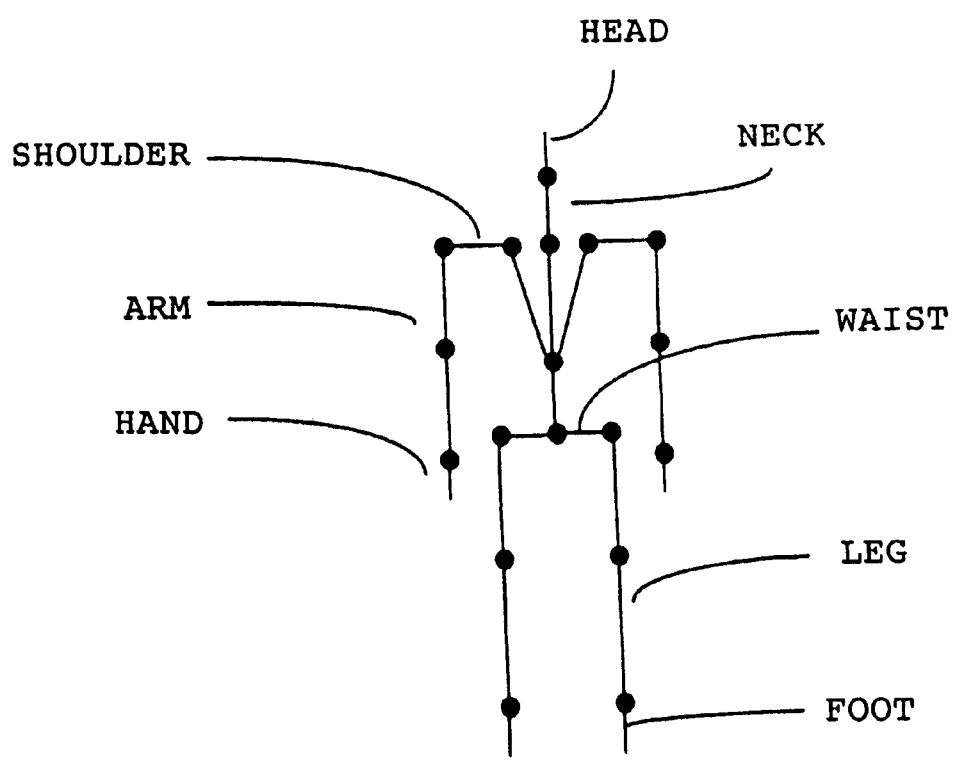
FIG. 40 is an explanatory drawing of skeleton data for a three-dimensional character.

FIGS. 38 and 39 show Embodiment 16.

This embodiment includes the tempo change information input section D18 for inputting the score tempo change command to change the tempo time in a synchronizing message output from the beat generating section D7. The other components of this embodiment are the same as those of Embodiment 15 shown in FIG. 35, so their duplicate description is omitted.

As shown in FIG. 38, the tempo change information input section D18 is connected to the beat generating section D7. If a user or an external apparatus inputs the score tempo change command during the reproduction of a score (ith beat), the tempo change information input section D18 multiplies the proportion constant Cs' into the original tempo time Temp(i) contained in the score data stored in the score data storing section D1 to determine new tempo time Temp(i), as shown in the following Equation (4).

$$\text{New tempo time Temp(i)} = \text{original tempo time Temp(i)} * Cs' \quad (4)$$

The new tempo time Temp (i) is output to the beat generating section D7 from the tempo change information input section D18 and is used as the tempo time in a synchronizing message output from the beat generating section D7. When obtaining the score data reproduced by the score data storing section D1, the tempo change information input section D18 simultaneously obtains the original tempo time Temp(i) through a recording medium or a communication line.

Next, score reproduction by the AV synchronous reproduction apparatus according to this embodiment is explained with reference to FIG. 39. The procedure for creating AV synchronization instruction data and the reproduction of animations are the same as those of Embodiments 13 and 15 shown in FIGS. 31 and 37, respectively, so their duplicate description is omitted.

FIG. 39 shows score reproduction by the AV synchronous reproduction apparatus shown in FIG. 38.

As shown in FIG. 39, at step S61, before starting score reproduction, the score data storing section D1 and scenario data storing section DB' obtain score data and animation scenario data through a recording medium or a communication line.

Subsequently, at step S62, the AV synchronization instruction data generating section D9' generates AV synchronization instruction data based on the scenario data from the scenario data storing section D8'.

When the score data storing section D1 receives a reproduction start command (step S63), the tempo change information input section D18 checks whether a tempo change command has been input.

If so, the tempo change information input section D18 changes the tempo time in a synchronizing message output from the beat generating section D7 based on the input tempo change command (step S64).

The score data storing section D1 sequentially outputs the stored score data to the output-waveform generating section D2. The output-waveform generating section D2 generates wave data for reproduced sounds in a digital form based on the score data (step S65) to sequentially output it to the audio-data buffer D3.

The audio-data buffer D3 temporarily stores a specified amount of wave data (step S66). Then, the wave data is output to the D/A converter D4 from the audio-data buffer D3.

The D/A converter D4 converts the input wave data into an audio signal in an analog form (step S67). The D/A converter D4 outputs the audio signal to the amplifier D5, which then amplifies the audio signal (step S68). Subsequently, the speaker D6 outputs as reproduction the audio signal from the amplifier D5 (step S69).

Each time the audio-data buffer D3 outputs wave data to the D/A converter D4, it communicates this timing to the beat generating section D7 (step S70).

Subsequently, based on the tempo time contained in the score data, the beat generating section D7 generates a synchronizing message consisting of the current-score reproducing position (ith beat) and the tempo time Temp(i) each time the score progresses by one beat of a quarter note. The beat generating section then outputs the message to the display frame determining section D10' (step S71).

Next, the AV synchronous reproduction apparatus determines whether the end of the score is reached (step S72). If not, the process returns to the processing shown in step S64. Otherwise, the reproduction is finished (step S73).

The AV synchronous reproduction apparatus according to this invention includes the tempo change information input section D18 for inputting the score tempo change command to change the tempo message in a synchronizing message output from the beat generating section D7. Thus, in, for example, Karaoke, even if a user changes the tempo of the score to a desired value during reproduction, synchronism can be maintained between the reproduction of the score and the reproduction of the animations.

Since the reproduction by the AV synchronous reproduction apparatus according to each embodiment can be computer-programmed, the present AV synchronizing method can be provided in a recording medium that can be operated by a computer. Such recording media includes floppy discs, CD-ROMS, DVDs (digital video discs), photomagnetic discs, and removable hard discs.

What is claimed is:

1. A graphic display apparatus having a server and a terminal on a network to provide graphic displays at the terminal, said server comprising:
 a character data database defining the shapes of three-dimensional characters;
 a motion database defining said characters' motions; and
 scenario data specifying said character data and a time-series combination with one or more of said motions;

said terminal comprising:
 a character database in which said character data is stored;
 a motion database in which said motions are stored;
 a data retrieving means for determining whether any character data specified by said scenario data is present in said character database; and
 a data request means for requesting said server for character data that is not present in said character database.

2. A graphic display apparatus having a server and a terminal on a network to provide graphic display at the terminal, said server comprising:
  a character data database defining the shapes of three-dimensional characters;
  a motion database defining the characters' motions; and
  scenario data specifying the character data and a time-series combination with one or more of the motions; and
said terminal comprising:
  a character database in which said character data is stored;
  a motion database in which said motions are stored;
  a data retrieving means for determining whether any motion specified by said scenario data is present in said motion database; and
  a data request means for requesting said server for a motion that is not present in said motion database.

3. An AV synchronous reproduction apparatus comprising:
  a score reproducing means for reproducing a score based on score data;
  a synchronizing-information table that temporarily stores a score position that specifies a position on a score, tempo information on which the reproduction tempo is based, and a time at which the score position and tempo information are updated, after associating them together;
  a synchronizing-information update means for updating said synchronizing-information table based on the reproduction by said score reproducing means;
  a score position calculating means for calculating from the current time and the contents of said synchronizing-information table the score position being currently reproduced by said score reproducing means;
  a frame buffer that temporarily stores frame data;
  a frame output means for calculating frame data that synchronizes with the reproduction by said score reproducing means based on the score position calculated by the score position calculating means from the CG data associated with the score data and then outputting the frame data to said frame buffer; and
  an image display means for displaying as animations the frame data stored in said frame buffer.

4. An AV synchronous reproduction apparatus according to claim 3, wherein the synchronizing-information update means is configured so that the score reproduction means updates the synchronizing-information table each time the score position or tempo information changes.

5. An AV synchronous reproduction apparatus according to claim 3, wherein the synchronizing-information update means is configured to update the synchronizing-information table during a particular cycle.

6. An AV synchronous reproduction apparatus according to claim 3, further including a calculation time predicting means for predicting from the amount of CG data the calculation time required by the frame data output means, whereby the frame output means is configured to output to the frame buffer, frame data that synchronizes with a score position determined by delaying the score position calculated by the score position calculating means by the time predicted by said calculation time predicting means.

7. An AV synchronous reproduction apparatus according to claim 3, further including a reproduction delay predicting means for predicting from score data the time until the sound at the current score position is output as an actual sound, whereby the synchronizing-information update means is configured to output to the synchronizing-information table, the tempo information, the update time, and the score position delayed by the synchronizing-information update means by the time predicted by said reproduction delay predicting means.

8. An AV synchronous reproduction apparatus according to claim 3, further including an image display delay predicting means for predicting from the amount of CG data the display delay time required before the image display means can actually display data from the frame buffer, whereby the frame output means is configured to output to the frame buffer, the frame data that synchronizes with the score position obtained by delaying the score position calculated by the score position calculating means by the time predicted by said image display delay predicting means.

9. An AV synchronous reproduction apparatus according to claim 3, including a special-reproduction start signaling means for generating a special-reproduction start signal when the score reproducing means starts special reproduction, a special-reproduction end signaling means for generating a special-reproduction end signal when the score reproducing means ends special reproduction, and a special-reproduction synchronizing-information update means for outputting a score position to the synchronizing-information table in real time during special reproduction, whereby the frame output means is configured to output frame data to the frame buffer, during special reproduction, based on the synchronizing-information table updated by said special-reproduction synchronizing-information update means.

10. An AV synchronous reproduction apparatus for reproduction by synchronizing score data with animation data, comprising:
  a beat generating circuit that is operative, during the reproduction of score data, to output as synchronizing message a score position identifying the current position on a score and tempo information on which the reproduction tempo is based, each time the score progresses for a specified amount of notes;
  an AV synchronization instruction data generating circuit that generates AV synchronization instruction data in which the progress of the score data is associated with the progress of the animation data using said specified amount of notes as reference; and
  a display frame determining circuit that determines animation data to be written in a frame buffer, when the time interval during which the frame buffer outputs an image to an image display circuit is designated as $\Delta T$, based on tempo information contained in a synchronizing message input from said beat generating circuit, the frame time of animation data being written in the frame buffer at the time of the input of the synchronizing message, the frame time of animation data specified by said AV synchronization instruction data when the next synchronizing message is input, and said time interval $\Delta T$.

11. An AV synchronous reproduction according to claim 10, including a tempo change input circuit that inputs a change in the tempo information.

12. An AV synchronous reproduction apparatus for reproduction by synchronizing score data with motion data for a CG character, comprising:
  a beat generating circuit that is operative, during the reproduction of score data, to output as synchronizing message, score position information identifying the current position on a score and tempo information on which the reproduction tempo is based, each time the score progresses for a specified amount of notes;

an AV synchronization instruction data generating circuit that generates AV synchronization instruction data in which the progress of the score data is associated with the progress of the motion data for the CG character using said specified amount of notes as reference; and a character pose calculating circuit that determines the pose of the CG character to be written in the frame buffer, when the time interval during which the frame buffer outputs an image to an image display circuit is designated as$\Delta T$, based on tempo information contained in a synchronizing message input from said beat generating circuit, the frame time of the motion data for the CG character being written in the frame buffer at the time of the input of the synchronizing message, the frame time of the motion data for the CG character specified by said AV synchronization instruction data when the next synchronizing message is input, and said time interval $\Delta T$.

13. An AV synchronous reproduction method wherein, to synchronize a score with an image, a score position identifying a position on the score using specified notes as reference and tempo information on said score are communicated from a score sound generating section to an image generating section, each time said score progresses for the amount of said specified notes.

14. An AV synchronous reproduction method comprising the steps of:

outputting as synchronizing message, during the reproduction of score data, score position information identifying the current position on a score and tempo information on which the reproduction tempo is based, each time the score progresses for a specified amount of notes;

generating AV synchronization instruction data in which the progress of the score data is associated with the progress of animation data using said specified amount of notes as reference; and determining animation data to be written in the frame buffer, when the time interval during which the frame buffer outputs an image to an image display circuit is designated as $\Delta T$, based on the tempo information contained in the synchronizing message input from said beat generating circuit, the frame time of the animation data being written in the frame buffer at the time of the input of the synchronizing message, the frame time of the animation data specified by said AV synchronization instruction data when the next synchronizing message is input, and said time interval $\Delta T$.

15. An AV synchronous reproduction method according to claim 14, further comprising the steps of inputting a change in the tempo information and changing the tempo information in the synchronizing message to the input tempo information.

16. A recording medium on which a computer program that realizes the AV synchronous reproduction method set forth in claim 14 has been recorded.

17. An AV synchronous reproduction method comprising the steps of:

outputting as synchronizing message, during the reproduction of score data, score position information identifying the current position on a score and tempo information on which the reproduction tempo is based, each time the score progresses for a specified amount of notes;

generating AV synchronization instruction data in which the progress of the score data is associated with the progress of motion data for a CG character using said specified amount of notes as reference; and determining the pose of the CG character to be written in the frame buffer, when the time interval during which the frame buffer outputs an image to an image display circuit is designated as $\Delta T$, based on the tempo information contained in the synchronizing message input from said beat generating circuit, the frame time of the motion data for the CG character being written in the frame buffer at the time of the input of the synchronizing message, the frame time of the motion data for the CG character specified by said AV synchronization instruction data when the next synchronizing message is input, and said time interval $\Delta T$.

18. A graphic display apparatus, comprising a server having data transmission means for transmitting scenario data describing a combination order of motions including shape data identification information and motion data specification information to a terminal through a network; and said terminal having data reception means for receiving scenario data transmitted by said data transmission means, a shape database required to display a three-dimensional character or characters, a motion database required to move said three-dimensional character or characters, and motion-switching and drawing means for switching the motions of said three-dimensional character or characters in the order described in said scenario data, characterized in that said shape database comprises various types of skeleton models of three-dimensional characters, polygon data on their heads, chests, waists, arms, hands, and legs, and texture data on the surface of polygons;

said motion database stores a plurality of motion data having motion positions for common poses;

said shape data identification information of said server comprises skeleton model identification information for identifying a skeleton model for a displayed three-dimensional character, three-dimensional-character polygon identification information for identifying polygons added to this skeleton model, and three-dimensional-character texture identification information for identifying texture on the surface of the polygons;

said motion data specification information of said server specifies the order of motions used in the scenario data and a time interval indicating the time from beginning to end of each motion; and said motion-switching and drawing means switches motion patterns with the time interval with such timing that a position previously provided for a motion pattern being displayed and a position previously provided for a motion pattern to be displayed next are substantially common to each other, thereby switching scenes.

* * * * *

UNITED STATES PATENT AND TRADEMARK OFFICE
CERTIFICATE OF CORRECTION

PATENT NO. : 6,331,851 B1
DATED : December 18, 2001
INVENTOR(S) : Seiichi Suzuki et al.

It is certified that error appears in the above-identified patent and that said Letters Patent is hereby corrected as shown below:

<u>Title page,</u>
Item [86], PCT No.:, change "PCT/JP09/02175" to -- PCT/JP98/02175 --.

Signed and Sealed this

Third day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,331,851 B1                                Page 1 of 1
DATED         : December 18, 2001
INVENTOR(S)   : Seiichi Suzuki et al.

It is certified that error appears in the above-identified patent and that said Letters Patent is hereby corrected as shown below:

<u>Title page,</u>
After Item [87], insert:
-- [30] Foreign Application Priority Data
May 19, 1997   (JP) .......... 9-127717
May 22, 1997   (JP) .......... 9-131521
May 30, 1997   (JP) .......... 9-141927
June 25, 1997  (JP) .......... 9-167802
Oct. 22, 1997  (JP) .......... 9-290026
Jan. 14, 1998  (JP) .......... 10-005632 --.

Signed and Sealed this

Fourth Day of February, 2003

JAMES E. ROGAN
*Director of the United States Patent and Trademark Office*